United States Patent
Ori

(10) Patent No.: US 7,068,429 B1
(45) Date of Patent: Jun. 27, 2006

(54) ZOOM OPTICAL SYSTEM WITH A VIBRATION CORRECTION FUNCTION AND IMAGING DEVICE USING THE ZOOM OPTICAL SYSTEM

(75) Inventor: Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/329,138

(22) Filed: Jan. 11, 2006

(30) Foreign Application Priority Data

Jan. 12, 2005 (JP) ............................. 2005-005313

(51) Int. Cl.
    *G02B 15/14* (2006.01)
(52) U.S. Cl. ............... 359/557; 359/683; 359/684; 359/685; 359/686; 359/715; 359/740; 359/772; 359/774
(58) Field of Classification Search ................ 359/554, 359/557, 676, 678, 683–685, 686–687, 715, 359/740, 772, 774
    See application file for complete search history.

(56) References Cited

U.S. PATENT DOCUMENTS

| | | | |
|---|---|---|---|
| 5,677,792 A * | 10/1997 | Hamano | 359/557 |
| 6,473,231 B1 * | 10/2002 | Hamano et al. | 359/557 |
| 6,650,475 B1 * | 11/2003 | Hamano | 359/557 |
| 6,718,132 B1 * | 4/2004 | Nishina | 359/684 |
| 6,771,432 B1 * | 8/2004 | Mihara | 359/687 |
| 6,781,755 B1 * | 8/2004 | Yoneyama | 359/554 |
| 6,999,240 B1 * | 2/2006 | Yamada et al. | 359/683 |
| 2002/0024732 A1 * | 2/2002 | Hamano et al. | 359/557 |

FOREIGN PATENT DOCUMENTS

| | | |
|---|---|---|
| JP | 2004-151552 | 5/2004 |
| JP | 2004-212737 | 7/2004 |

\* cited by examiner

*Primary Examiner*—Evelyn A. Lester
(74) *Attorney, Agent, or Firm*—Arnold International; Jon W. Henry; Bruce Y. Arnold

(57) ABSTRACT

A zoom optical system with a vibration correction function includes, from the object side, a first lens group having positive refractive power and that is stationary during zooming, a second lens group having negative refractive power and that moves along the optical axis during zooming, a third lens group having positive refractive power that includes a stop, and a fourth lens group having positive refractive power. Two of the second, third, and fourth lens groups move along the optical axis during zooming. A fifth lens group may be included. At least part of one of the third, fourth, or fifth lens groups that does not move along the optical axis during zooming is movable in a direction that intersects the optical axis in order to correct for blurring of an image due to vibration of the zoom optical system. An imaging device uses the zoom optical system.

20 Claims, 26 Drawing Sheets

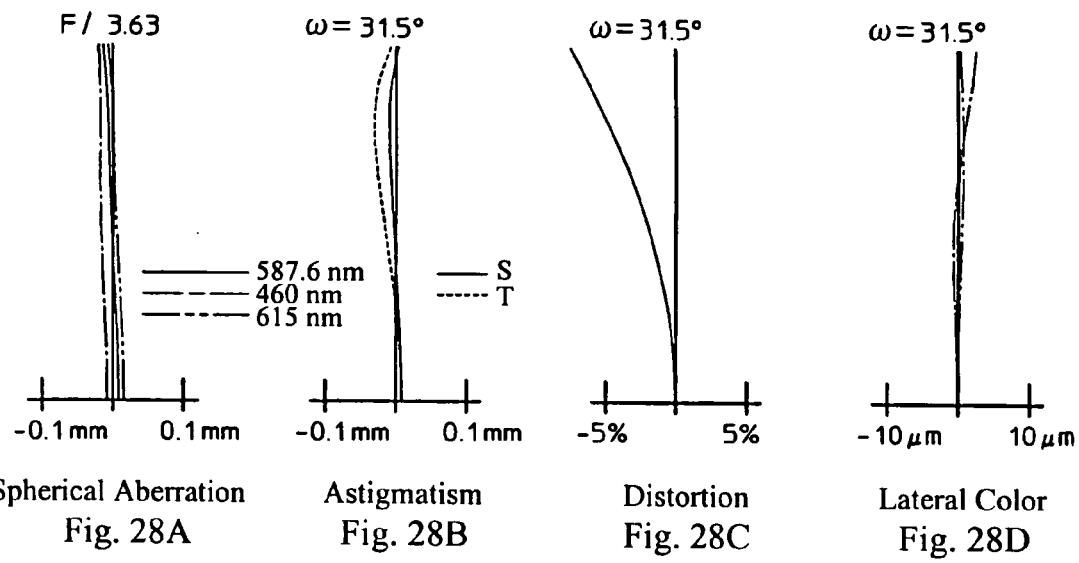
Spherical Aberration
Fig. 28A
Astigmatism
Fig. 28B
Distortion
Fig. 28C
Lateral Color
Fig. 28D
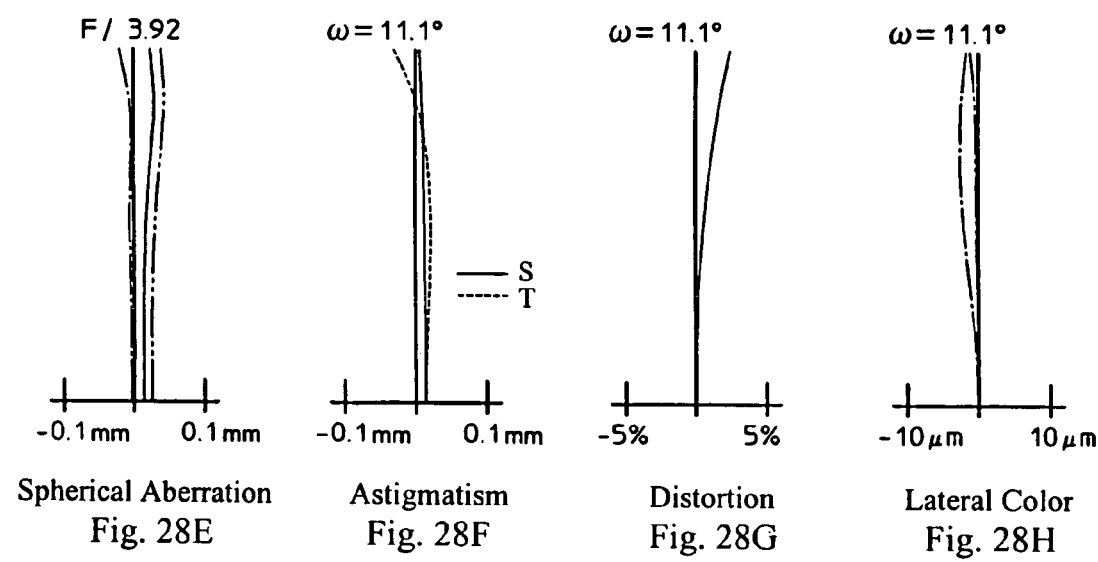
Spherical Aberration
Fig. 28E
Astigmatism
Fig. 28F
Distortion
Fig. 28G
Lateral Color
Fig. 28H

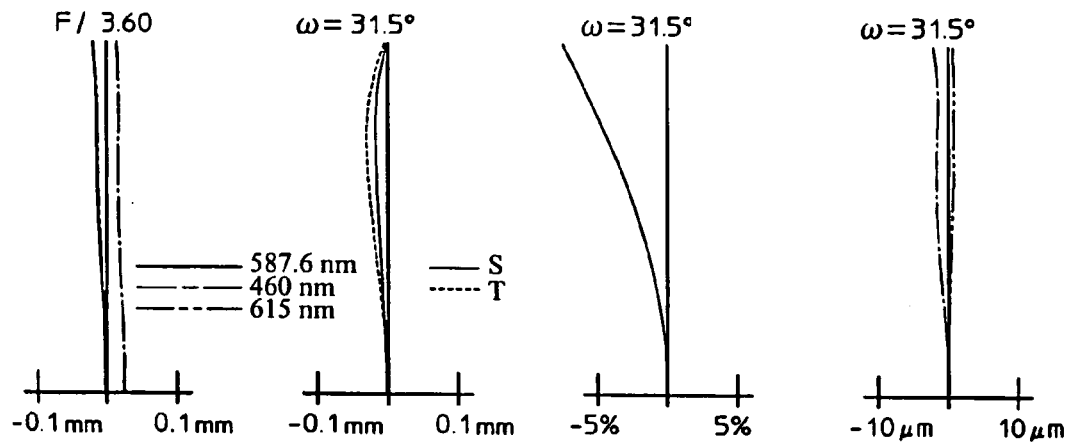
Spherical Aberration
Fig. 29A
Astigmatism
Fig. 29B
Distortion
Fig. 29C
Lateral Color
Fig. 29D
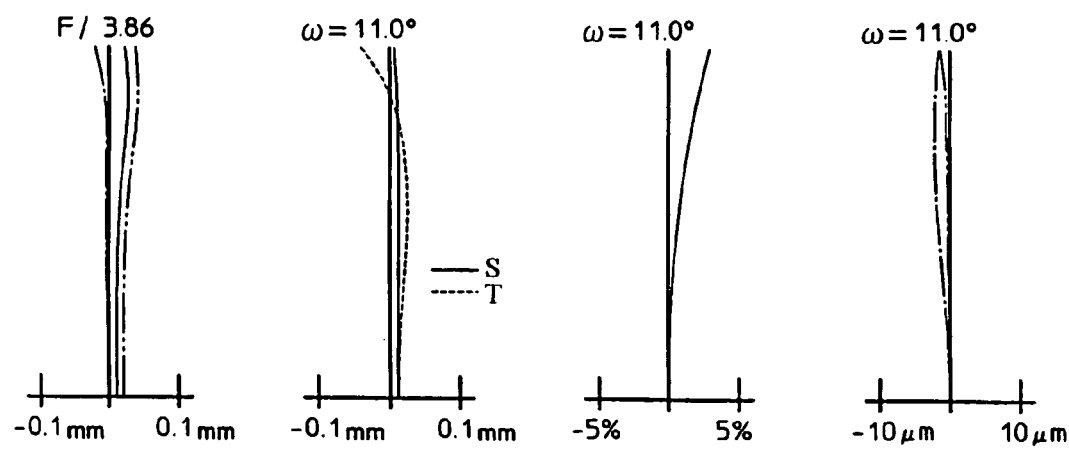
Spherical Aberration
Fig. 29E
Astigmatism
Fig. 29F
Distortion
Fig. 29G
Lateral Color
Fig. 29H

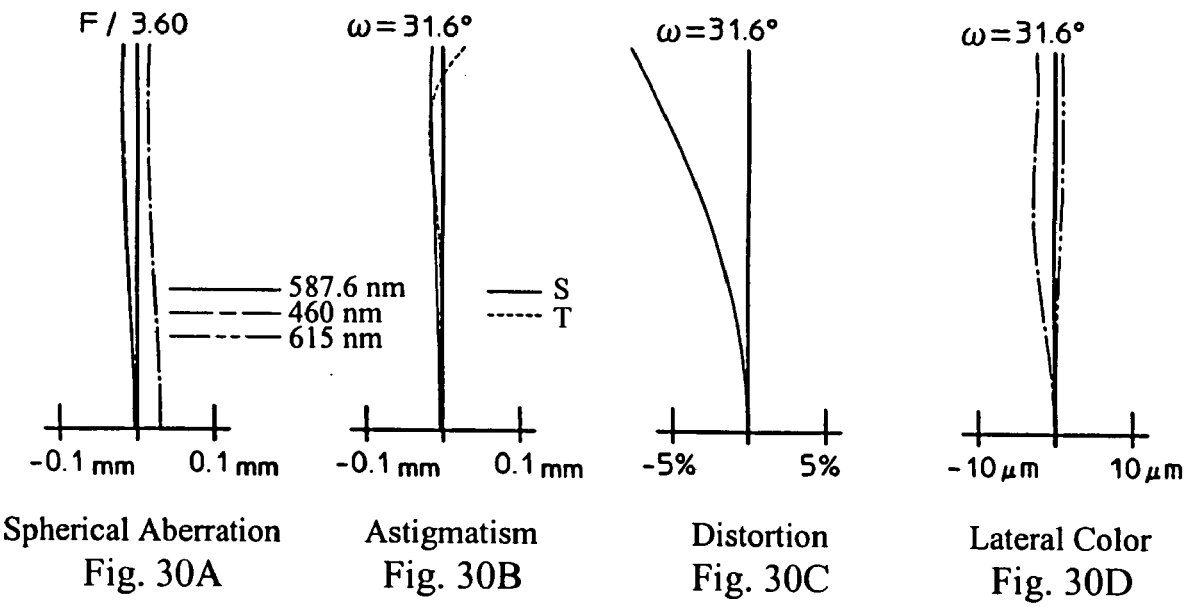
Spherical Aberration
Fig. 30A
Astigmatism
Fig. 30B
Distortion
Fig. 30C
Lateral Color
Fig. 30D
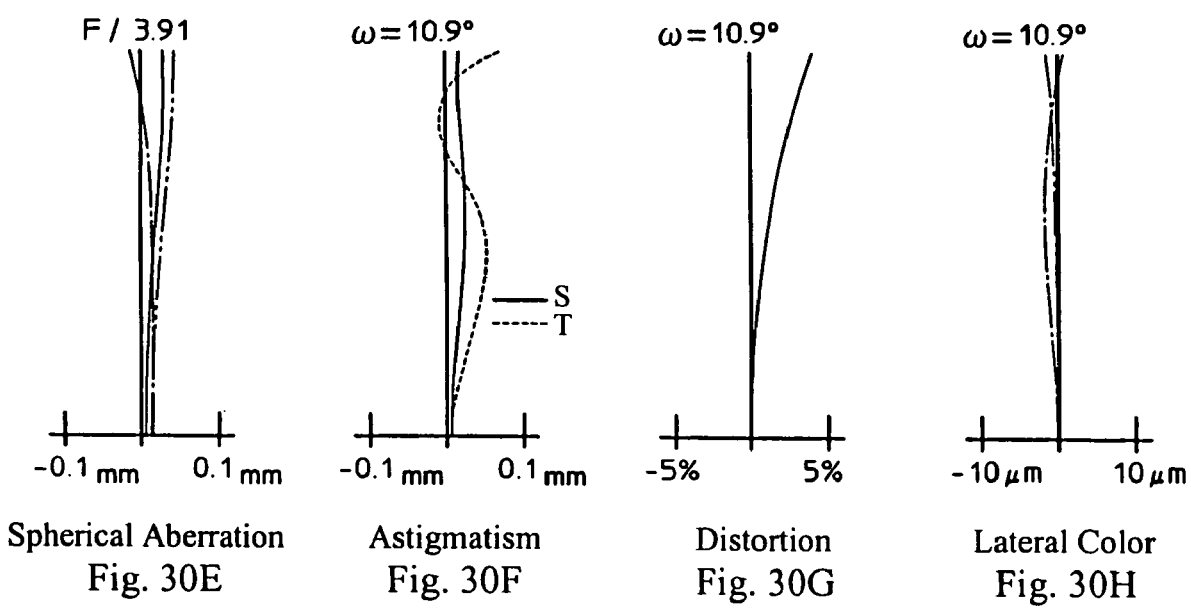
Spherical Aberration
Fig. 30E
Astigmatism
Fig. 30F
Distortion
Fig. 30G
Lateral Color
Fig. 30H Spherical Aberration Astigmatism Distortion Lateral Color Spherical Aberration Astigmatism Distortion Lateral Color

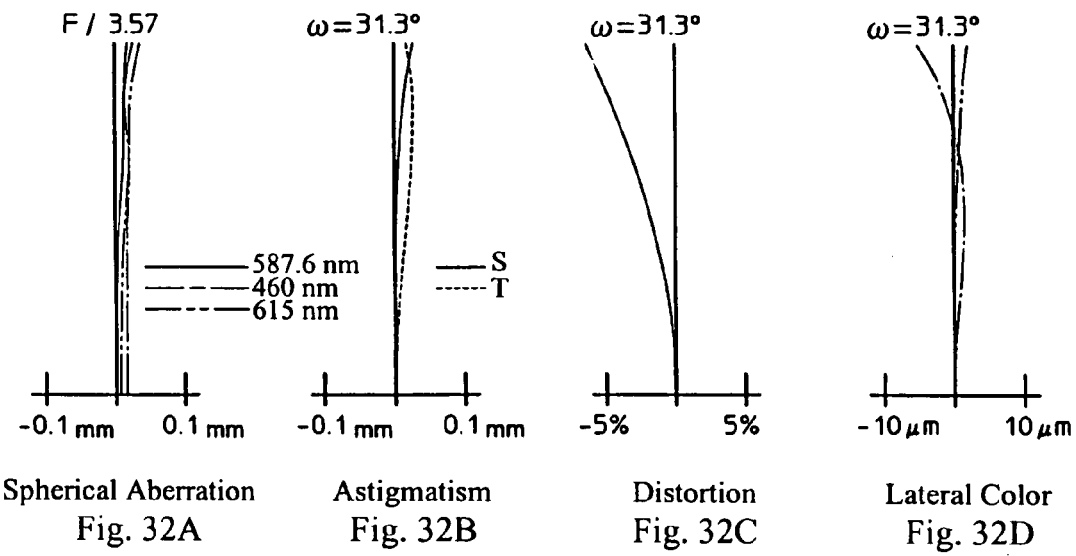
Spherical Aberration
Fig. 32A
Astigmatism
Fig. 32B
Distortion
Fig. 32C
Lateral Color
Fig. 32D
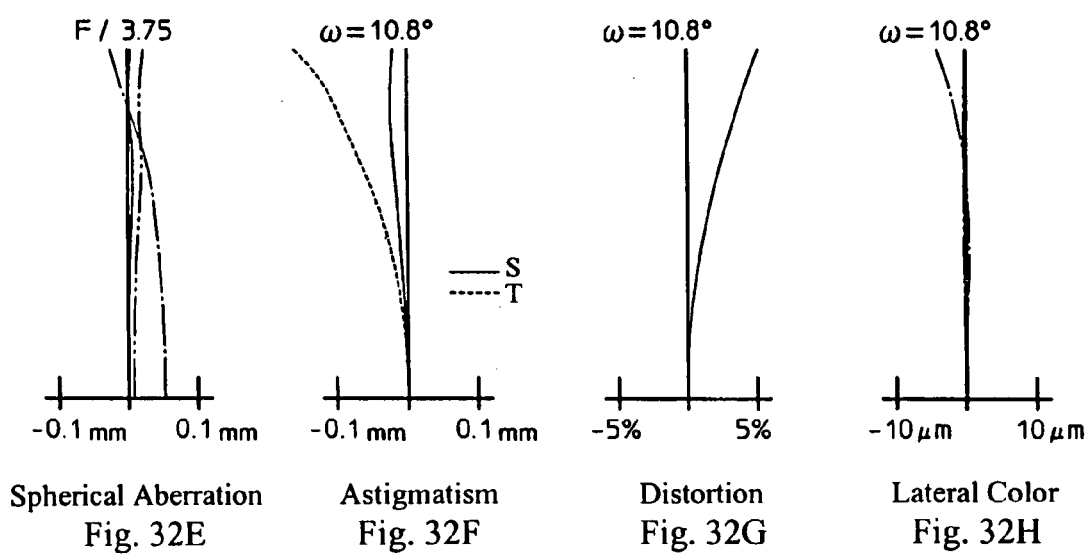
Spherical Aberration
Fig. 32E
Astigmatism
Fig. 32F
Distortion
Fig. 32G
Lateral Color
Fig. 32H

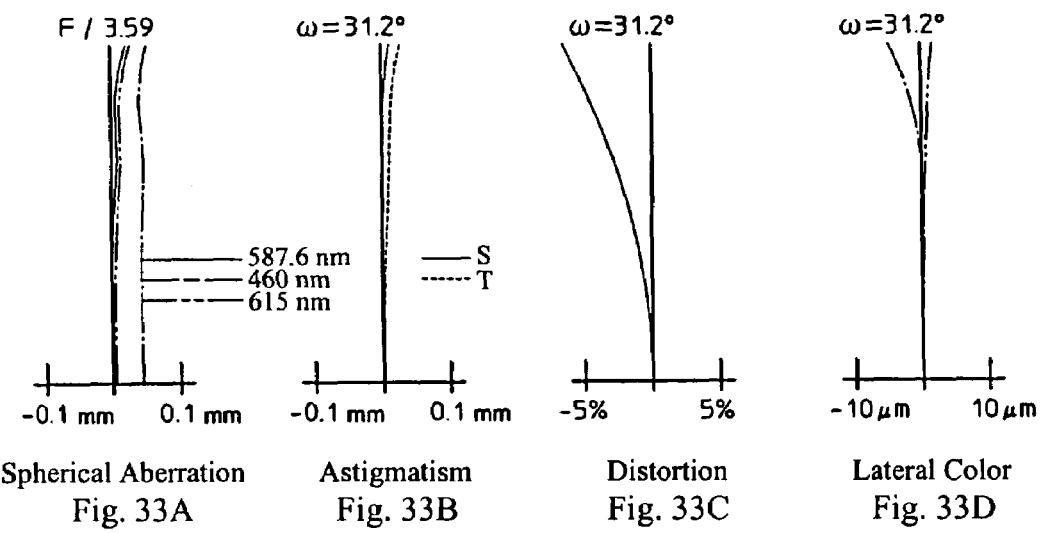
Spherical Aberration
Fig. 33A
Astigmatism
Fig. 33B
Distortion
Fig. 33C
Lateral Color
Fig. 33D
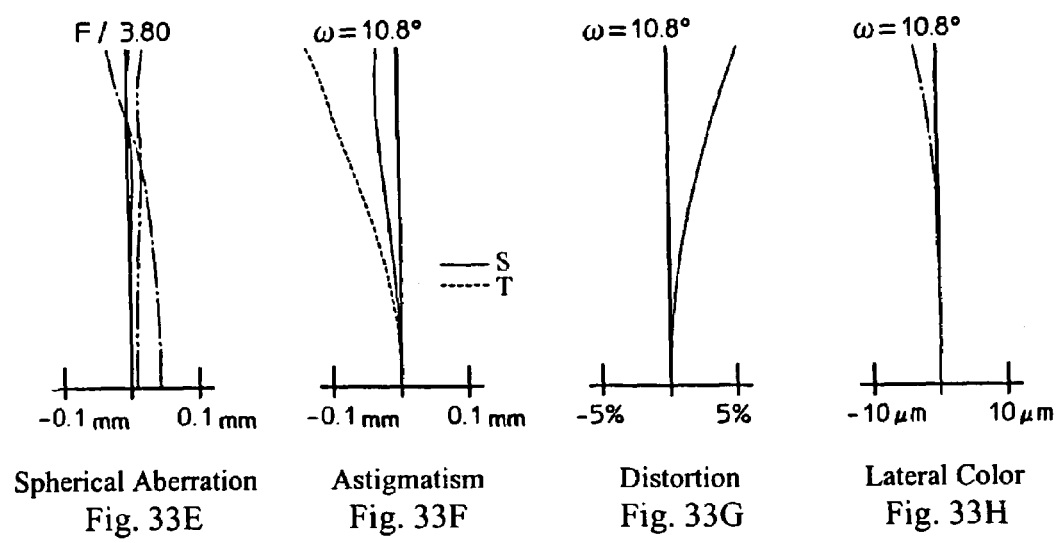
Spherical Aberration
Fig. 33E
Astigmatism
Fig. 33F
Distortion
Fig. 33G
Lateral Color
Fig. 33H

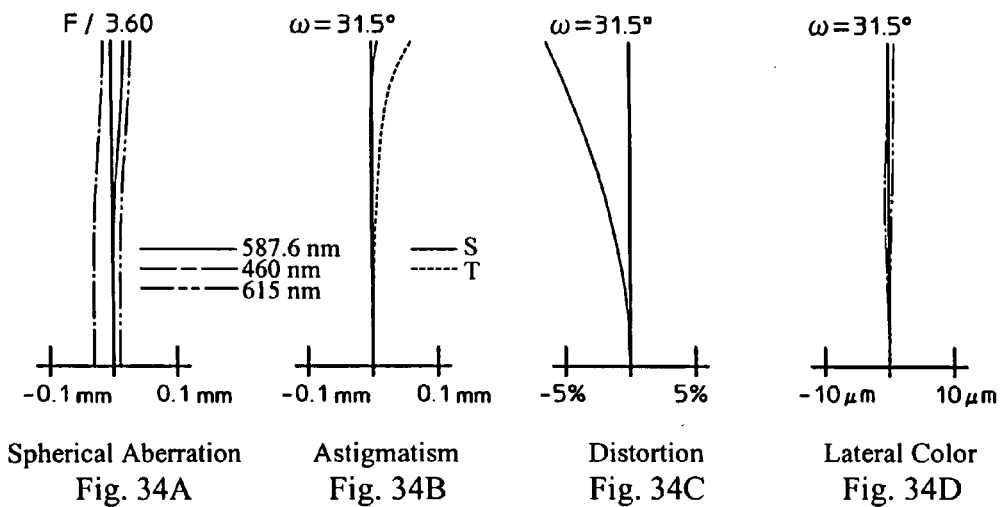
Spherical Aberration
Fig. 34A
Astigmatism
Fig. 34B
Distortion
Fig. 34C
Lateral Color
Fig. 34D
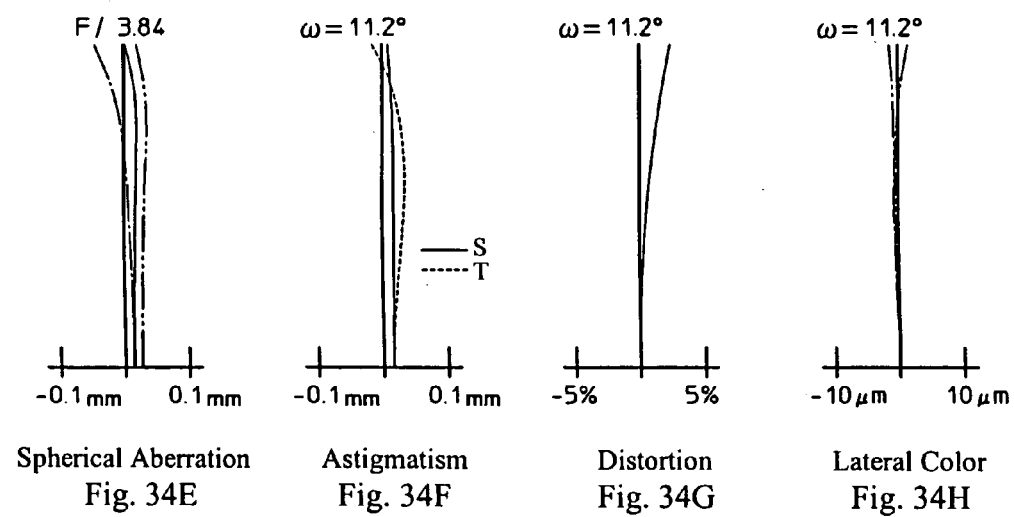
Spherical Aberration
Fig. 34E
Astigmatism
Fig. 34F
Distortion
Fig. 34G
Lateral Color
Fig. 34H

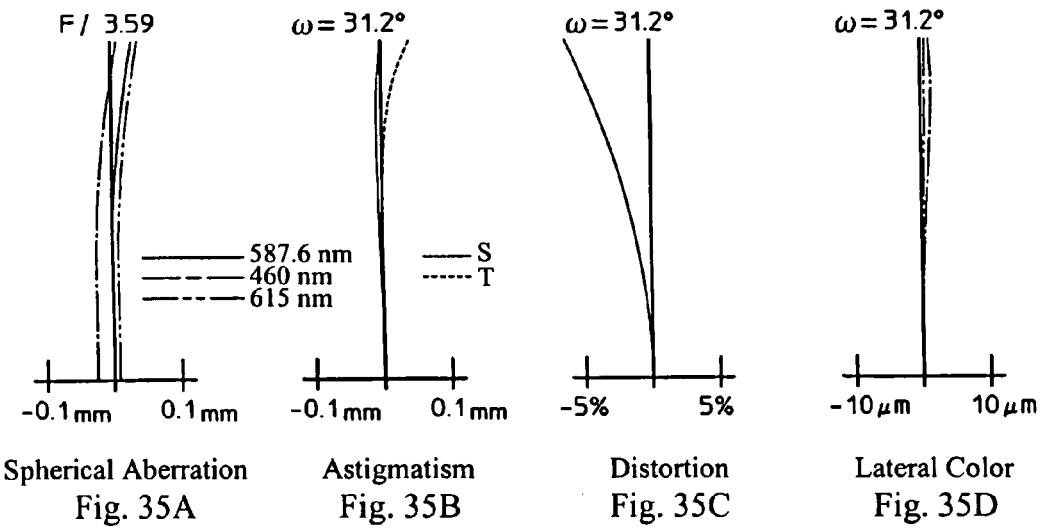
Spherical Aberration
Fig. 35A
Astigmatism
Fig. 35B
Distortion
Fig. 35C
Lateral Color
Fig. 35D
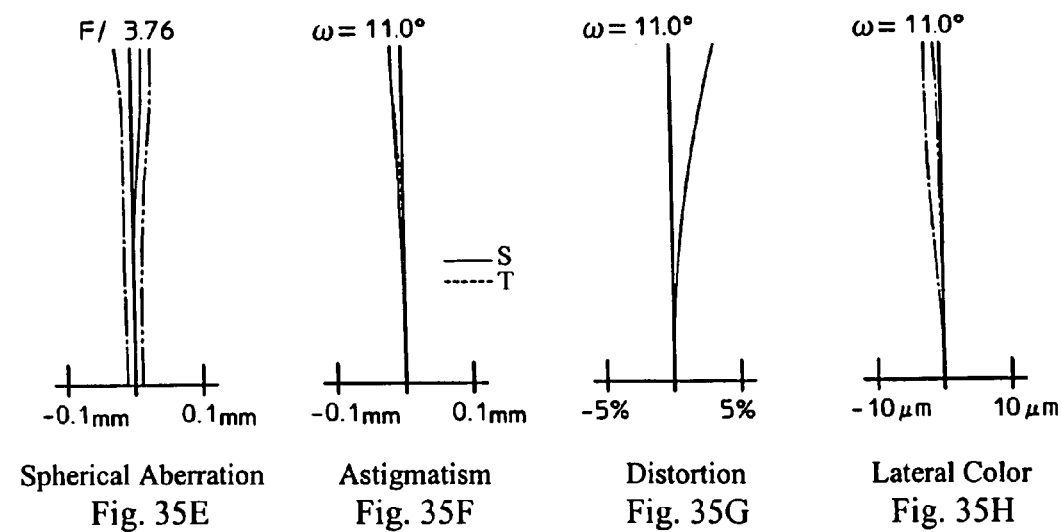
Spherical Aberration
Fig. 35E
Astigmatism
Fig. 35F
Distortion
Fig. 35G
Lateral Color
Fig. 35H

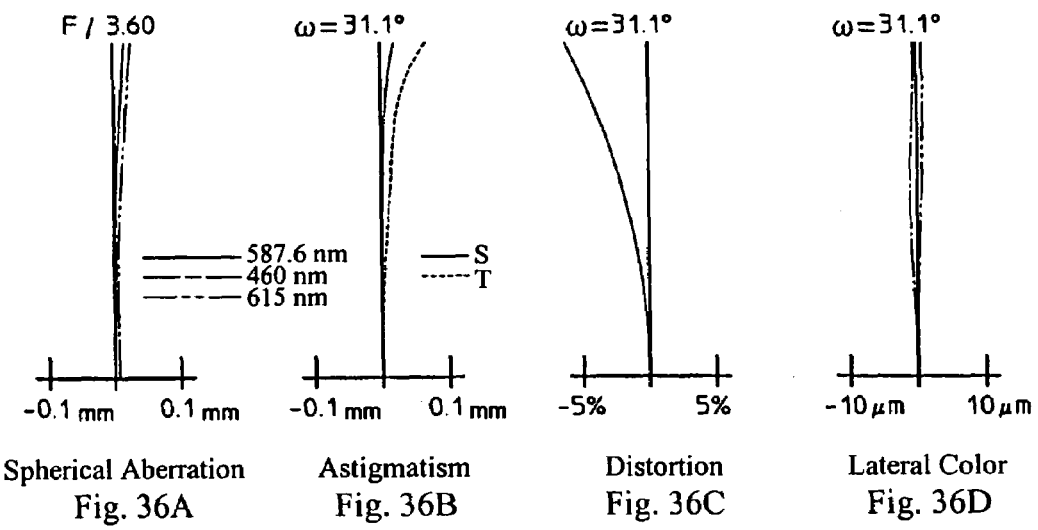
Spherical Aberration
Fig. 36A
Astigmatism
Fig. 36B
Distortion
Fig. 36C
Lateral Color
Fig. 36D
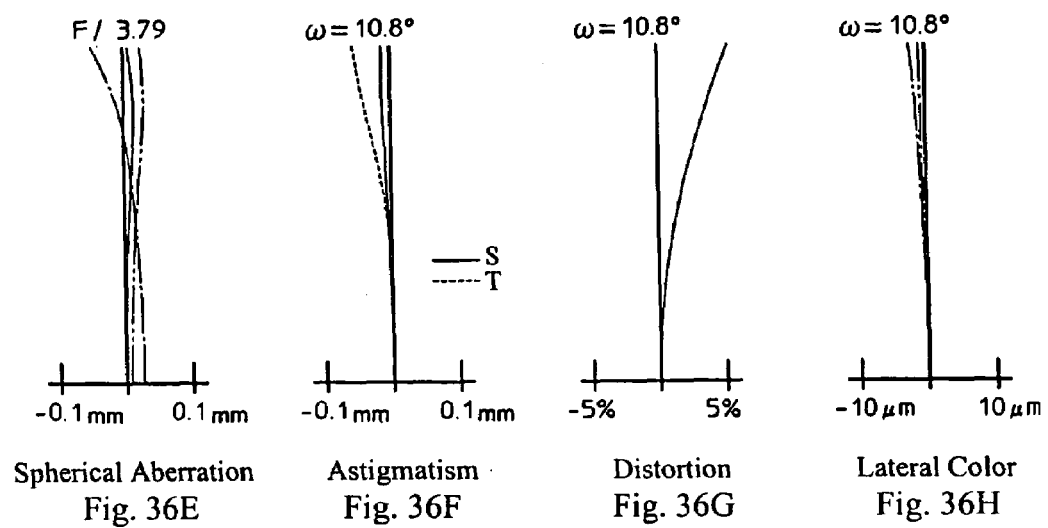
Spherical Aberration
Fig. 36E
Astigmatism
Fig. 36F
Distortion
Fig. 36G
Lateral Color
Fig. 36H

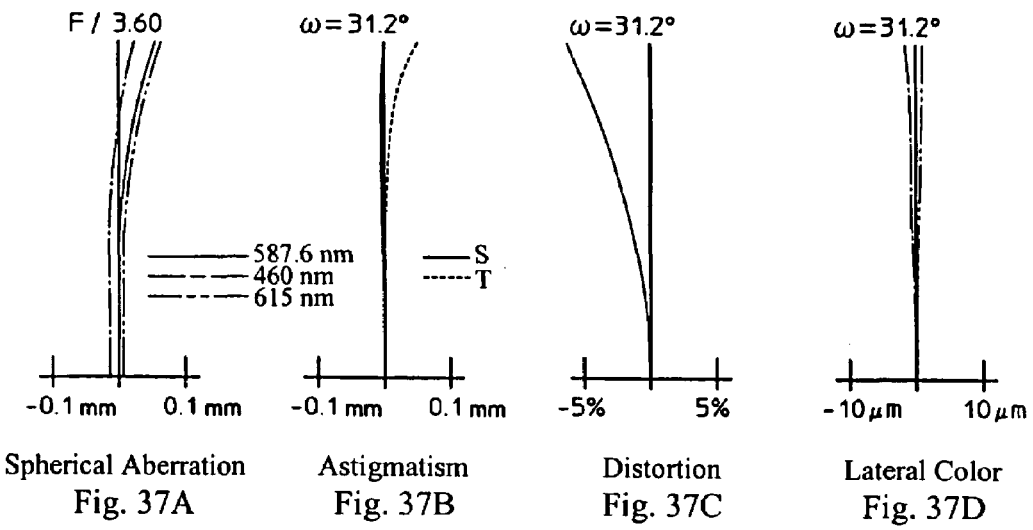
Spherical Aberration
Fig. 37A
Astigmatism
Fig. 37B
Distortion
Fig. 37C
Lateral Color
Fig. 37D
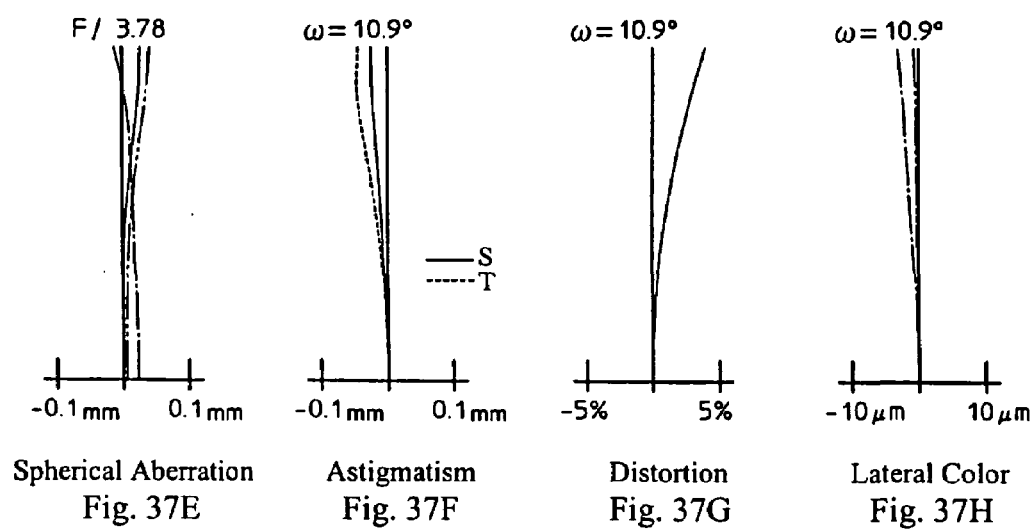
Spherical Aberration
Fig. 37E
Astigmatism
Fig. 37F
Distortion
Fig. 37G
Lateral Color
Fig. 37H

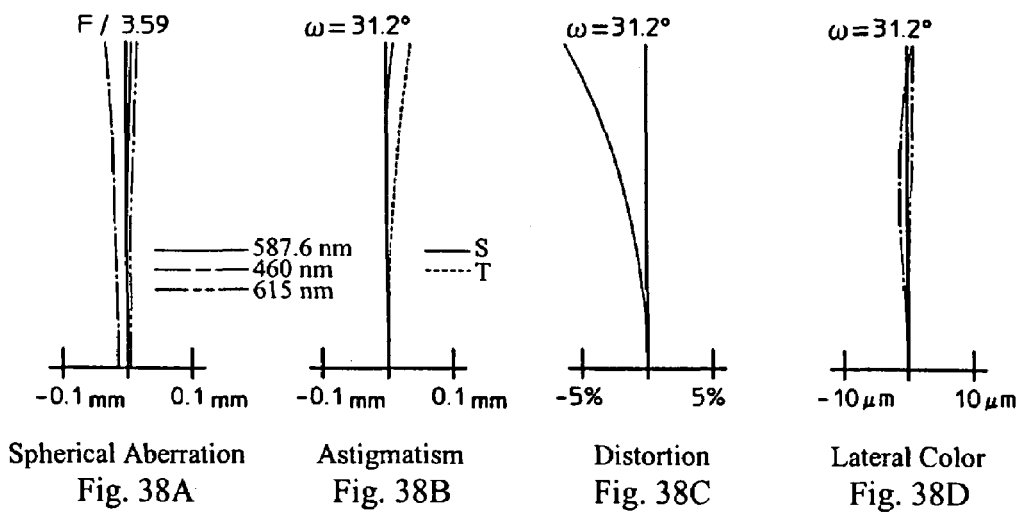
Spherical Aberration
Fig. 38A
Astigmatism
Fig. 38B
Distortion
Fig. 38C
Lateral Color
Fig. 38D
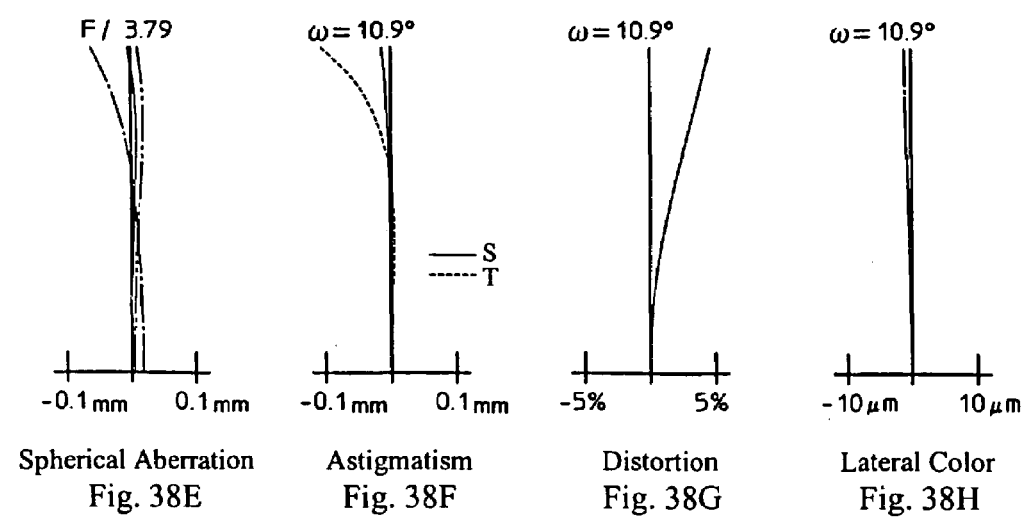
Spherical Aberration
Fig. 38E
Astigmatism
Fig. 38F
Distortion
Fig. 38G
Lateral Color
Fig. 38H

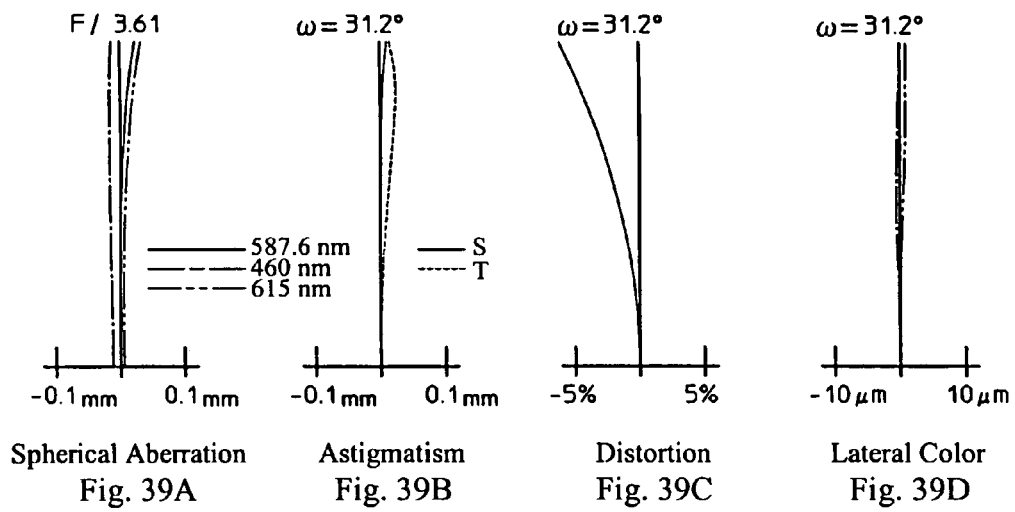
Spherical Aberration
Fig. 39A
Astigmatism
Fig. 39B
Distortion
Fig. 39C
Lateral Color
Fig. 39D
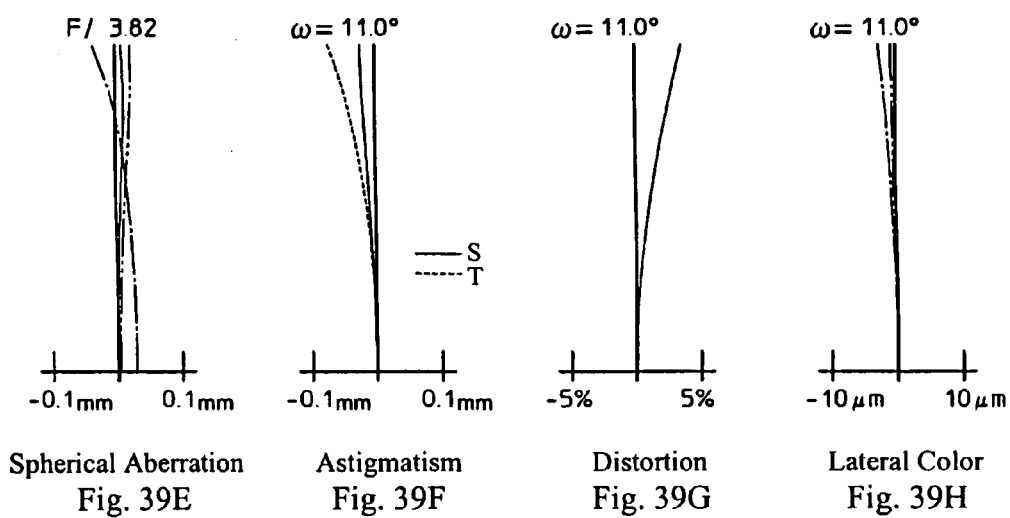
Spherical Aberration
Fig. 39E
Astigmatism
Fig. 39F
Distortion
Fig. 39G
Lateral Color
Fig. 39H

ZOOM OPTICAL SYSTEM WITH A VIBRATION CORRECTION FUNCTION AND IMAGING DEVICE USING THE ZOOM OPTICAL SYSTEM

TECHNICAL FIELD OF THE INVENTION

The present invention relates to a zoom optical system with a vibration correction function and an imaging device using the zoom optical system that may be favorably implemented in imaging devices such as cellular telephones, portable computers, and similar devices.

BACKGROUND OF THE INVENTION

In recent years, cellular telephones, portable computers, and similar devices have included the capability of imaging picture information for viewing and recording with the use of an included imaging device. Furthermore, the imaging optical systems used in such imaging devices must be lightweight and compact for such applications in devices such as cellular telephones and portable computers. Additionally, technology has been developed in order to make such devices thinner in thickness by bending the optical axis of the optical systems by arranging prisms on the optical axis when the objective plane is in the thickness direction of the imaging device.

Moreover, there has also been a demand for higher level functions in the imaging optical systems in such imaging devices, and imaging optical systems having a zoom function have been proposed, for example, in Japanese Laid-Open Patent Application 2004-212737 and Japanese Laid-Open Patent Application 2004-151552.

When the imaging optical system is miniaturized, blurring occurs in the image being recorded when a slow shutter speed is used for recording because vibration caused by movement of a hand or hands holding the imaging device is transmitted to the imaging optical system. For this reason, high quality picture images frequently cannot be obtained due to image blurring.

A particular problem with imaging devices that include a zooming function is that blurring of images due to hand movement is especially significant at the telephoto end of the zoom range.

The technology described in Japanese Laid-Open Patent Application 2004-212737 and Japanese Laid-Open Patent Application 2004-151552 makes use of a first lens group having negative refractive power as a whole and including a prism, causing the diameter of diaphragms or stops used to increase in size and making the device thicker in the thickness direction.

The technology described in Japanese Laid-Open Patent Application 2004-212737 further has a limit to the miniaturization of the prism because the prism is provided at the object-most side of the first lens group.

BRIEF SUMMARY OF THE INVENTION

The present invention relates to a zoom optical system that provides favorable optical performance even when vibration due to hand movement or other causes occurs, with the zoom optical system including technology for making the zoom optical system thinner in the thickness direction by bending the optical axis. The present invention further relates to an imaging device using such a zoom optical system.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 28A–28D show the spherical aberration, astigmatism, distortion, and lateral color, respectively, of the zoom optical system of Embodiment 1 at the wide-angle end, and FIGS. 28E–28H show the spherical aberration, astigmatism, distortion, and lateral color, respectively, of the zoom optical system of Embodiment 1 at the telephoto end;

FIGS. 29A–29D show the spherical aberration, astigmatism, distortion, and lateral color, respectively, of the zoom optical system of Embodiments 2-1, 2-2, and 2-3 at the wide-angle end, and FIGS. 29E–29H show the spherical aberration, astigmatism, distortion, and lateral color, respectively, of the zoom optical system of Embodiments 2-1, 2-2, and 2-3 at the telephoto end;

FIGS. 30A–30D show the spherical aberration, astigmatism, distortion, and lateral color, respectively, of the zoom optical system of Embodiments 3-1, 3-2, and 3-3 at the wide-angle end, and FIGS. 30E–30H show the spherical aberration, astigmatism, distortion, and lateral color, respectively, of the zoom optical system of Embodiments 3-1, 3-2, and 3-3 at the telephoto end;

FIGS. 32A–32D show the spherical aberration, astigmatism, distortion, and lateral color, respectively, of the zoom optical system of Embodiment 5 at the wide-angle end, and FIGS. 32E–32H show the spherical aberration, astigmatism, distortion, and lateral color, respectively, of the zoom optical system of Embodiment 5 at the telephoto end;

FIGS. 33A–33D show the spherical aberration, astigmatism, distortion, and lateral color, respectively, of the zoom optical system of Embodiments 6-1 and 6-2 at the wide-angle end, and FIGS. 33E–33H the show spherical aberration, astigmatism, distortion, and lateral color, respectively, of the zoom optical system of Embodiments 6-1 and 6-2 at the telephoto end;

FIGS. 34A–34D show the spherical aberration, astigmatism, distortion, and lateral color, respectively, of the zoom optical system of Embodiments 7-1 and 7-2 at the wide-angle end, and FIGS. 34E–34H show the spherical aberration, astigmatism, distortion, and lateral color, respectively, of the zoom optical system of Embodiments 7-1 and 7-2 at the telephoto end;

FIGS. 35A–35D show the spherical aberration, astigmatism, distortion, and lateral color, respectively, of the zoom optical system of Embodiments 8-1 and 8-2 at the wide-angle end, and FIGS. 35E–35H show the spherical aberration, astigmatism, distortion, and lateral color, respectively, of the zoom optical system of Embodiments 8-1 and 8-2 at the telephoto end;

FIGS. 36A–36D show the spherical aberration, astigmatism, distortion, and lateral color, respectively, of the zoom optical system of Embodiments 9-1, 9-2, and 9-3 at the wide-angle end, and FIGS. 36E–36H show the spherical aberration, astigmatism, distortion, and lateral color, respectively, of the zoom optical system of Embodiments 9-1, 9-2, and 9-3 at the telephoto end;

FIGS. 37A–37D show the spherical aberration, astigmatism, distortion, and lateral color, respectively, of the zoom optical system of Embodiments 10-1, 10-2, and 10-3 at the wide-angle end, and FIGS. 37E–37H show the spherical aberration, astigmatism, distortion, and lateral color, respectively, of the zoom optical system of Embodiments 10-1, 10-2, and 10-3 at the telephoto end;

FIGS. 38A–38D show the spherical aberration, astigmatism, distortion, and lateral color, respectively, of the zoom optical system of Embodiments 11-1, 11-2, and 11-3 at the wide-angle end, and FIGS. 38E–38H show the spherical aberration, astigmatism, distortion, and lateral color, respectively, of the zoom optical system of Embodiments 11-1, 11-2, and 11-3 at the telephoto end; and FIGS. 39A–39D show the spherical aberration, astigmatism, distortion, and lateral color, respectively, of the zoom optical system of Embodiments 12-1, 12-2, and 12-3 at the wide-angle end, and FIGS. 39E–39H show the spherical aberration, astigmatism, distortion, and lateral color, respectively, of the zoom optical system of Embodiments 12-1, 12-2, and 12-3 at the telephoto end.

DETAILED DESCRIPTION

A brief general description of the zoom optical system with a vibration correction function of the present invention is given below. Specific embodiments of the zoom optical system will be described generally with references to various drawings. The embodiments described below are divided into four groups of embodiments.

FIGS. 1–8 show cross-sectional views of the zoom optical systems of the present invention that are constructed of four lens groups and include a vibration correction function to prevent blurring of an image being viewed or recorded due to vibration of the zoom optical system. The vibration correction function is achieved by moving at least a part of the third lens group from the object side in a direction that intersects the optical axis of the zoom optical system. FIGS. 1–8 relate to the first group of embodiments of the present invention.

Figure 9:
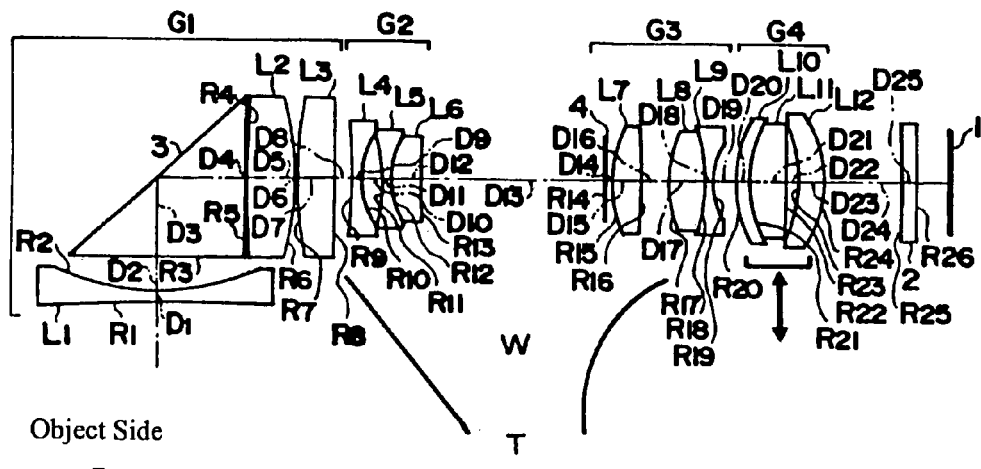
FIG. 9 shows a cross-sectional view of the zoom optical system of Embodiment 5 at the wide-angle end.
Figure 10:
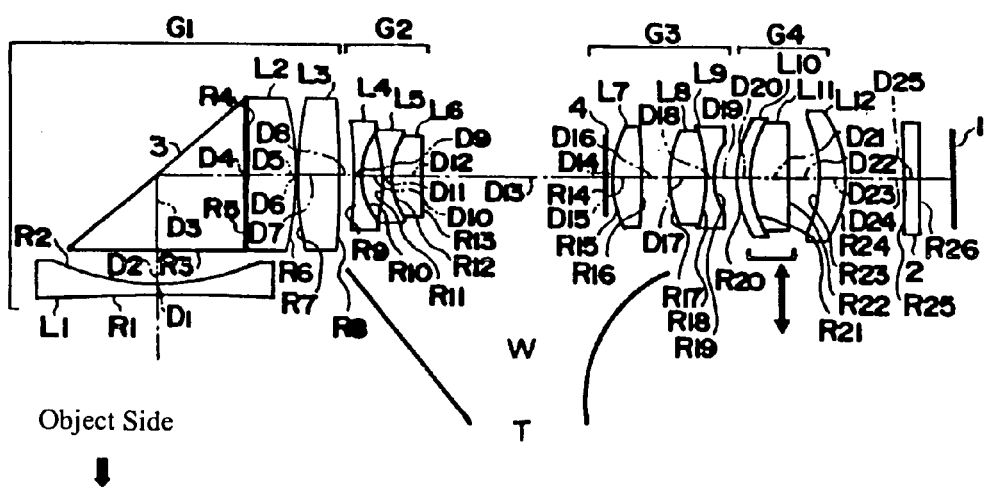
FIG. 10 shows a cross-sectional view of the zoom optical system of Embodiment 6-1 at the wide-angle end.
Figure 11:
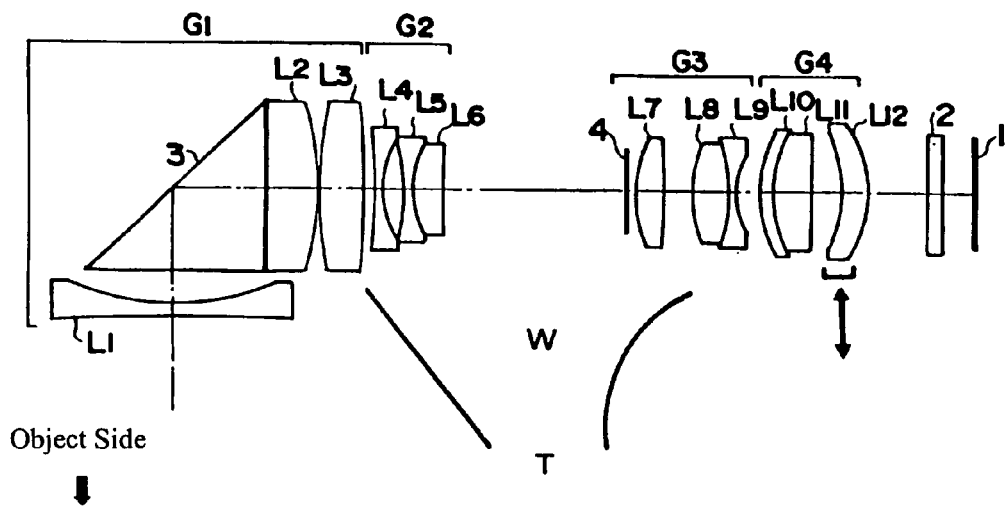
FIG. 11 shows a cross-sectional view of the zoom optical system of Embodiment 6-2 at the wide-angle end.

FIGS. 9–11 also show cross-sectional views of the zoom optical systems of the present invention that are constructed of four lens groups and include a vibration correction function to prevent blurring of an image being viewed or recorded due to vibration of the zoom optical system. However, in this case, the vibration correction function is achieved by moving at least a part of the fourth lens group from the object side in a direction that intersects the optical axis of the zoom optical system. FIGS. 9–11 relate to the second group of embodiments of the present invention.

FIGS. 12–19 show cross-sectional views of the zoom optical systems that are constructed of five lens groups and include a vibration correction function to prevent blurring of an image being viewed or recorded due to vibration of the zoom optical system. The vibration correction function is achieved by moving at least a part of the third lens group from the object side in a direction that intersects the optical axis of the zoom optical system. FIGS. 12–19 relate to the third group of embodiments of the present invention.

FIGS. 20–27 also show cross-sectional views of the zoom optical systems of the present invention that are constructed of five lens groups and include a vibration correction function to prevent blurring of an image being viewed or recorded due to vibration of the zoom optical system. However, in this case, the vibration correction function is achieved by moving at least a part of the fifth lens group from the object side in a direction that intersects the optical axis of the zoom optical system. FIGS. 20–27 relate to the fourth group of embodiments of the present invention.

The zoom optical systems of the present inventions use lens groups that include lens elements and lens components. The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom optical system. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing together two lens elements. The term "lens group" is herein defined as an assembly of one or more lens components in optical series and with no intervening lens components along an optical axis that during zooming is movable as a single unit relative to another lens component or other lens components.

Figure 1:
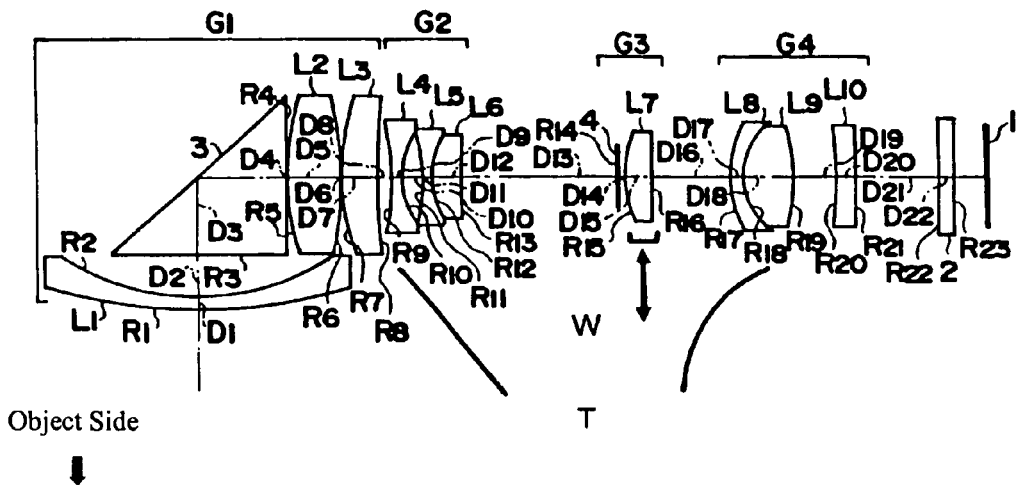
FIG. 1 shows a cross-sectional view of the zoom optical system of Embodiment 1 at the wide-angle end.

The zoom optical system of the present invention will be further described with reference to FIG. 1 that shows Embodiment 1. An arrow at the lower left of FIG. 1 that points downward indicates the object side of the zoom optical system. In FIG. 1, lens elements are referenced by the letter L followed by a number denoting their order from the object side of the lens along the optical axis, from L1 to L10. Similarly, the radii of curvature of the optical surfaces are referenced by the letter R followed by a number denoting their order from the object side of the lens, from R1 to R23 in FIG. 1. The on-axis surface spacings along the optical axis of the various optical surfaces are referenced by the letter D followed by a number denoting their order from the object side of the lens, from D1 to D22 in FIG. 1. Additionally, in FIG. 1, solid line segments below the two lens groups, G2 and G4, indicate the movement of these two lens groups along the optical axis during zooming, with movement from the wide-angle end W to the telephoto end T of the zoom range being indicated by the downward direction in FIG. 1, and a double headed vertical arrow indicates the movement of the third lens group G3 in a direction that intersects the optical axis in order to correct for blurring of an image due to vibration of the zoom optical system. Furthermore, as shown in FIG. 1, a filter unit 2 that includes an infrared filter and/or similar structures, including a cover glass of a solid state image sensor, is provided adjacent the image plane 1 where an image is recorded. As shown in FIG. 1, lens group G4 is on the object side and adjacent the filter unit 2.

The first group of embodiments of the present invention are shown in FIGS. 1–8, which show Embodiments 1, 2-1, 2-2, 2-3, 3-1, 3-2, 3-3, and 4, respectively. These zoom optical systems with a vibration correction function include, arranged along an optical axis in order from the object side, a first lens group G1 having positive refractive power and that is stationary during zooming, a second lens group having negative refractive power and that moves along the optical axis during zooming, a third lens group G3 having positive refractive power that includes a stop or diaphragm 4 and that is stationary during zooming, and a fourth lens group G4 having positive refractive power that moves along the optical axis during zooming.

Furthermore, the straight line segment below the second lens group G2 and the curved line segment below the fourth lens group G4, indicate that the design is such that the fourth lens group G4 moves along the optical axis at a decreasing speed from the wide-angle end W to the telephoto end T when the second lens group G2 moves along the optical axis in a coordinated movement at a constant speed. In addition, the fourth lens group G4 also functions as the lens group for focusing.

In the zoom optical systems of the first group of embodiments of the present invention, the first lens group G1 includes, arranged along the optical axis in order from the object side, a lens element having negative refractive power, a prism 3 for bending the optical axis, and at least one lens element having positive refractive power. Additionally, at least part of the third lens group G3 is movable in a direction that intersects the optical axis in order to correct for blurring of an image at the image plane 1 due to vibration of the zoom optical system. In particular, the third lens group includes only a single lens element or a lens element having positive refractive power and a lens element having negative refractive power, either or both of which may be movable in a direction that intersects the optical axis in order to correct for vibration of the zoom optical system.

The second group of embodiments of the present invention are shown in FIGS. 9–11, which show Embodiments 5, 6-1, and 6-2, respectively. These zoom optical systems with a vibration correction function include, arranged along an optical axis in order from the object side, a first lens group G1 having positive refractive power and that is stationary during zooming, a second lens group G2 having negative refractive power and that moves along the optical axis during zooming, a third lens group G3 having positive refractive power that includes a stop or diaphragm 4 and that moves along the optical axis during zooming, and a fourth lens group G4 that is stationary during zooming.

Furthermore, the straight line segment below the second lens group G2 and the curved line segment below the third lens group G3, indicate that the design is such that the third lens group G3 moves along the optical axis at a decreasing rate from the wide-angle end W to the telephoto end T when the second lens group G2 moves along the optical axis in a coordinated movement at a constant speed. In addition, the fourth lens group G4 also functions as the lens group for focusing.

In the zoom optical systems of the second group of embodiments of the present invention, the first lens group G1 includes, arranged along the optical axis in order from the object side, a lens element having negative refractive power, a prism 3 for bending the optical axis, and at least one lens element having positive refractive power. Additionally, at least part of the fourth lens group G4 is movable in a direction that intersects the optical axis in order to correct for blurring of an image at the image plane 1 due to vibration of the zoom optical system. In particular, the fourth lens group G4 includes at least one lens component formed by cementing together at least two lens elements, and a single lens element that forms a lens component; and at least one of the cemented lens elements and the single lens element is movable in a direction that intersects the optical axis in order to correct for vibration of the zoom optical system.

The third group of embodiments of the present invention are shown in FIGS. 12–19, which show Embodiments 7-1, 8-1, 9-1, 9-2, 9-3, 10-1, 10-2, and 10-3, respectively. These zoom optical systems with a vibration correction function include, arranged along an optical axis in order from the object side, a first lens group G1 having positive refractive power and that is stationary during zooming, a second lens group G2 having negative refractive power and that moves along the optical axis during zooming, a third lens group G3 having positive refractive power that includes a stop or diaphragm 4 and that is stationary during zooming, a fourth lens group G4 having positive refractive power that moves along the optical axis during zooming, and a fifth lens group G5 that is stationary during zooming.

Furthermore, the straight line segment below the second lens group G2 and the curved line segment below the fourth lens group G4, indicate that the design is such that the fourth lens group G4 moves along the optical axis at a decreasing rate from the wide-angle end W to the telephoto end T while the second lens group G2 moves along the optical axis in a coordinated movement at a constant speed. In addition, the fourth lens group G4 also functions as the lens group for focusing.

In the zoom optical systems of the third group of embodiments of the present invention, the first lens group G1 includes, arranged along the optical axis in order from the object side, a lens element having negative refractive power, a prism 3 for bending the optical axis, and at least one lens element having positive refractive power. Additionally, at least part of the third lens group G3 is movable in a direction that intersects the optical axis in order to correct for blurring of an image at the image plane 1 due to vibration of the zoom optical system. In particular, the third lens group includes only a single lens element or a lens element having positive refractive power and a lens element having negative refractive power, either or both of which may be movable in a direction that intersects the optical axis in order to correct for vibration of the zoom optical system.

The fourth group of embodiments of the present invention are shown in FIGS. 20–27, which show Embodiments 7-2, 8-2, 11-1, 11-2, 11-3, 12-1, 12-2, and 12-3, respectively. These zoom optical systems with a vibration correction function include, arranged along an optical axis in order from the object side, a first lens group G1 having positive refractive power and that is stationary during zooming, a second lens group G2 having negative refractive power and that moves along the optical axis during zooming, a third lens group G3 having positive refractive power that includes a stop or diaphragm 4 and that is stationary during zooming, a fourth lens group G4 having positive refractive power that moves along the optical axis during zooming, and a fifth lens group G5 that is stationary during zooming.

Furthermore, the straight line segment below the second lens group G2 and the curved line segment below the fourth lens group G4, indicate that the design is such that the fourth lens group G4 moves along the optical axis at a decreasing rate from the wide-angle end W to the telephoto end T while the second lens group G2 moves along the optical axis in a coordinated movement at a constant speed. In addition, the fourth lens group G4 also functions as the lens group for focusing.

In the zoom optical systems of the fourth group of embodiments of the present invention, the first lens group G1 includes, arranged along the optical axis in order from the object side, a lens element having negative refractive power, a prism 3 for bending the optical axis, and at least one lens element having positive refractive power. Additionally, at least part of the fifth lens group G5 is movable in a direction that intersects the optical axis in order to correct for blurring of an image at the image plane 1 due to vibration of the zoom optical system. In particular, the fifth lens group G5 includes only a single lens element or a lens element having positive refractive power and a lens element having negative refractive power, either or both of which may be movable in a direction that intersects the optical axis in order to correct for vibration of the zoom optical system.

All embodiments of all four groups of embodiments of the present invention described above, and described further below, satisfy the following condition:

$$0.6 < t_d/f_w < 1.8 \qquad \text{Condition (1)}$$

where $t_d$ is the air equivalent optical conversion distance along the optical axis between the most object side lens element of said first lens group having negative refractive power and the most object side lens element of said first lens group having positive refractive power; and $f_w$ is the focal length of the entire zoom optical system at the wide-angle end.

The air equivalent optical conversion distance td is calculated in order to take into account the index of refraction of the prism 3 varying from that of air according to the following equation:

$$t_d = D2 + D4 + (1/N3) \cdot D3$$

where

D2 is the distance, providing an air space, along the optical axis between the lens element L1 having negative refractive power provided at the object most side of the zoom optical system and the prism within the first lens group G1, D3 is the distance along the optical axis of the prism 3 between the entrance and exit faces of the prism 3, D4 is the distance, providing an air space, between the lens element of the first lens group G1 having positive refractive power provided nearest the object side of the zoom optical system and the prism within the first lens group G1, and N3 is the refractive index of the prism 3 within the first lens group G1.

Satisfying Condition (1) above helps achieve miniaturization of the zoom optical system without light rays being excessively shielded from passing through the prism 3 to the image plane 1.

If the lower limit of Condition (1) is not satisfied there is insufficient space for a prism 3 of an appropriate size that appropriately shields and passes light rays to be provided between the lens elements having negative and positive refractive powers. If the upper limit of Condition (1) is not satisfied, the total length of the zoom optical system becomes too long. Furthermore, as the outer diameter of the lens element having negative refractive power within the first lens group G1 becomes larger, miniaturization of the zoom optical system becomes more difficult.

Additionally, in order to improve imaging and reduce aberrations, some of the surfaces of the lens elements in embodiments of the present invention are aspheric. The lens surfaces that are aspheric are defined using the following Equation (A):

$$Z = [(Y^2/R)/\{1 + (1 - K \cdot Y^2/R^2)^{1/2}\}] + \Sigma(A_i \cdot Y^i) \qquad \text{Equation (A)}$$

where
- Z is the length (in mm) of a line drawn from a point on the aspheric lens surface at a distance Y from the optical axis to the tangential plane of the aspheric surface vertex,
- R is the radius of curvature (in mm) of the aspheric lens surface on the optical axis,
- Y is the distance (in mm) from the optical axis,
- K is the eccentricity, and
- $A_i$ is the ith aspheric coefficient, and the summation extends over i.

In embodiments of the invention disclosed below, only aspheric coefficients $A_3$–$A_{12}$ are ever non-zero and sometimes some of these aspheric coefficients are also zero.

Embodiments of the zoom optical system of the present invention will now be individually described with reference to the drawings.

EMBODIMENT 1

FIG. 1 shows a cross-sectional view of the zoom optical system of Embodiment 1 at the wide-angle end. The zoom optical system of Embodiment 1 has a four lens group construction, and the third lens group G3 provides the vibration correction function. In particular, the third lens group G3 includes a stop or diaphragm 4 and a lens element having positive refractive power (i.e., the seventh lens element L7) that prevents blurring of an image formed at the image plane 1 by movement of this lens element L7 having positive refractive power in a direction that intersects the optical axis in order to correct for blurring of the image being recorded or viewed due to vibration of the zoom optical system.

As shown in FIG. 1, the first lens group G1 includes, arranged along the optical axis in order from the object side, a first lens element L1 having negative refractive power and a meniscus shape with its convex surface on the object side, a right-angle prism 3 that bends the optical axis, a biconvex second lens element L2, and a third lens element L3 having positive refractive power and a meniscus shape with a convex surface on the object side. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4 and a biconvex seventh lens element L7. The fourth lens group G4, includes, arranged along the optical axis in order from the object side, an eight lens element L8 having negative refractive power and a meniscus shape with its convex surface on the object side, a biconvex ninth lens element L9 and a tenth lens element L10 having negative refractive power with a convex surface on the image side.

In addition, the fifth lens element L5 and the sixth lens element L6 are cemented together at adjoining lens surfaces, as are also the eighth lens element L8 and the ninth lens element L9.

Also, in Embodiment 1, the filter unit 2 includes an infrared filter and/or similar structures, including a cover glass for a solid state image sensor, provided between the fourth lens group G4 and the image plane 1. An imaging device is represented in FIG. 1 by the combination of lens groups G1–G4, filter unit 2 and image plane 1, which is located where an image sensor can receive an image.

In the zoom optical system of Embodiment 1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 that forms the third lens group G3 in a direction that intersects the optical axis.

Table 1 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 1, except that the on-axis surface spacings that vary with zooming are listed in Table 3 below. Listed in the bottom portion of Table 1 are the focal length f (in mm) and the f-number $F_{NO}$ at the wide-angle and telephoto ends, and the maximum field angle 2ω at the wide-angle end and the telephoto end for Embodiment 1. Tables similar to those for Embodiment 1 below will be used later to describe the other embodiments of the present invention.

TABLE 1

| # | R | D | $N_d$ | $v_d$ |
|---|---|---|---|---|
| 1 | 29.0148 | 0.85 | 1.92286 | 20.9 |
| 2 | 13.0772 | 3.04 | | |
| 3 | ∞ | 11.00 | 1.83481 | 42.7 |
| 4 | ∞ | 0.10 | | |
| 5 | 22.3889 | 3.12 | 1.72916 | 54.7 |
| 6 | −33.8422 | 0.10 | | |
| 7 | 19.5591 | 2.04 | 1.72916 | 54.7 |
| 8 | 34.3361 | $D_8$(variable) | | |
| 9 | −20.6119 | 0.65 | 1.77250 | 49.6 |
| 10 | 7.1771 | 1.20 | | |
| 11 | −18.0172 | 0.61 | 1.51742 | 52.4 |
| 12 | 6.6697 | 1.77 | 1.84666 | 23.8 |
| 13 | 36.3807 | $D_{13}$(variable) | | |
| 14 | ∞ (stop) | 0.50 | | |
| 15* | 8.4868 | 1.70 | 1.50842 | 56.4 |
| 16* | −49.7302 | $D_{16}$(variable) | | |
| 17 | 8.2163 | 0.84 | 1.92286 | 18.9 |
| 18 | 5.0000 | 2.95 | 1.48749 | 70.2 |
| 19 | −15.1293 | 2.63 | | |
| 20* | −22.3944 | 1.10 | 1.56865 | 58.6 |
| 21* | −1077530.8 | $D_{21}$(variable) | | |
| 22 | ∞ | 1.00 | 1.51680 | 64.2 |
| 23 | ∞ | | | |
| f = 6.35–17.95 | $F_{NO}$ = 3.63–3.92 | 2ω = 63.0°–22.2° | | |

The lens surfaces with a * to the right of the surface number in Table 1 are aspheric lens surfaces, and the aspheric surface shapes of these lens surfaces are expressed by Equation (A) above.

Table 2 below lists the values of the constant K and the aspheric coefficients $A_4$, $A_6$, $A_8$, and $A_{10}$ in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_4$ | $A_6$ | $A_8$ | $A_{10}$ |
|---|---|---|---|---|---|
| 15 | 0.8096721 | 6.6954749E-5 | 2.9300223E-6 | 7.4788973E-7 | −5.0481388E-9 |
| 16 | 1.0034934 | 3.7323860E-4 | 9.4279759E-6 | 2.2432608E-7 | 1.1208807E-8 |
| 20 | 1.0707124 | 1.0623578E-4 | −4.7518657E-6 | 1.5313145E-7 | 9.5552489E-9 |
| 21 | 0.5627926 | 4.1474356E-4 | −1.1474039E-5 | 4.8270807E-7 | −1.8943477E-8 |

In the zoom optical system of Embodiment 1, lens groups G2 and G4 move to vary the on-axis surface spacings of the various the optical elements along the optical axis during zooming between the wide-angle end W and the telephoto end T of the zoom range. Therefore, the values of the on-axis surface spacings $D_8$, $D_{13}$, $D_{16}$, and $D_{21}$ vary. Table 3 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{16}$ between the lens surface of the extreme image side of the third lens group G3 and the lens surface of the object-most side of the fourth lens group G4, and the on-axis surface spacing $D_{21}$ between the lens surface of the extreme image side of the fourth lens group G4 and the object side surface of the filter unit 2, at the wide-angle end (focal length f equals 6.35 mm) and the telephoto end (focal length f equals 17.95 mm) in the zoom optical system of Embodiment 1 with the zoom optical system focused at infinity.

TABLE 3

| Focal Length f (mm) | $D_8$ | $D_{13}$ | $D_{16}$ | $D_{21}$ |
|---|---|---|---|---|
| 6.35 | 1.00 | 9.41 | 4.87 | 6.92 |
| 17.95 | 8.34 | 2.07 | 2.39 | 9.40 |

Additionally, the zoom optical system of Embodiment 1 satisfies Condition (1) with a value of $t_d/f_w$ equal to 1.44.

FIGS. 28A–28D show the spherical aberration, astigmatism, distortion, and lateral color, respectively, of the zoom optical system of Embodiment 1 at the wide-angle end, and FIGS. 28E–28H show the spherical aberration, astigmatism, distortion, and lateral color, respectively, of the zoom optical of Embodiment 1 at the telephoto end. In FIGS. 28A and 28E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 28B and 28F, the astigmatism (in mm) is shown for both the sagittal image surface S and the tangential image surface T and is measured at 587.6 nm (the d-line). In FIGS. 28C and 28G, distortion (in percent) is measured at 587.6 nm (the d-line). In FIGS. 28D and 28H, the lateral color (in μm) is shown for the wavelengths 460 nm and 615 nm relative to 587.6 nm (the d-line). Similar figures will be described with reference to the other embodiments of the present invention below.

As is evident from FIGS. 28A–28H, the zoom optical system of Embodiment 1 is a high performance zoom optical system capable of favorably correcting aberrations.

EMBODIMENT 2-1

Figure 2:
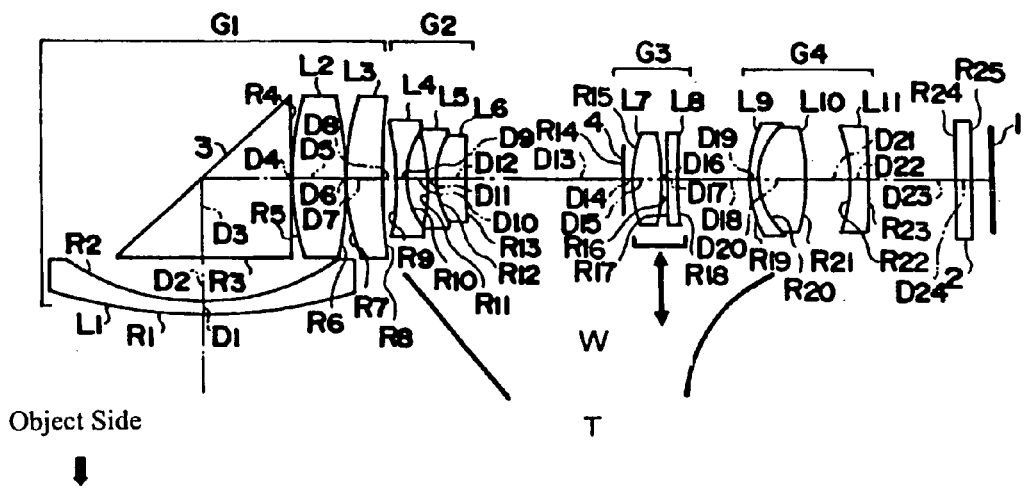
FIG. 2 shows a cross-sectional view of the zoom optical system of Embodiment 2-1 at the wide-angle end.

FIG. 2 shows a cross-sectional view of the zoom optical system of Embodiment 2-1 at the wide-angle end. The zoom optical system of Embodiment 2-1 has a four lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, the seventh lens element L7 having positive refractive power and the eighth lens element L8 having negative refractive power that are included in the third lens group G3.

As shown in FIG. 2, the first lens group G1 includes, arranged along the optical axis in order from the object side, a first lens element L1 having negative refractive power and a meniscus shape with its convex surface on the object side, a right-angle prism 3 that bends the optical axis, a biconvex second lens element L2, and a third lens element L3 having positive refractive power and a meniscus shape with its convex surface on the object side. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4, a biconvex seventh lens element L7, and an eighth lens element L8 having negative refractive power and a meniscus shape with its convex surface on the object side. The fourth lens group G4, includes, arranged along the optical axis in order from the object side, a ninth lens element L9 having negative refractive power and a meniscus shape with its convex surface on the object side, a biconvex tenth lens element L10 and an eleventh lens element L11 having negative refractive power and a meniscus shape with its convex surface on the image side.

In addition, the fifth lens element L5 and the sixth lens element L6 are cemented together at adjoining lens surfaces, as are also the ninth lens element L9 and the tenth lens element L10.

Also, in Embodiment 2-1, the filter unit 2 includes an infrared filter and/or similar structures, including a cover glass for a solid state image sensor, provided between the fourth lens group G4 and the image plane 1.

In the zoom optical system of Embodiment 2-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 and the eight lens element L8 that form the third lens group G3 in a direction that intersects the optical axis.

Specific data regarding the zoom optical system of Embodiment 2-1 are shown below in Tables 4-6. These tables are equally descriptive of Embodiments 2-2 and 2-3 that will be described after Embodiment 2-1.

Table 4 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 2-1, except that the on-axis surface spacings that vary with zooming are listed in Table 6 below. Listed in the bottom portion of Table 4 are the focal length f (in mm) and the f-number $F_{NO}$ at the wide-angle and telephoto ends, and the maximum field angle 2ω at the wide-angle end and the telephoto end for Embodiment 2-1.

TABLE 4

| # | R | D | $N_d$ | $v_d$ |
|---|---|---|---|---|
| 1 | 31.7235 | 0.85 | 1.92286 | 20.9 |
| 2 | 12.8611 | 2.91 | | |
| 3 | ∞ | 11.00 | 1.83481 | 42.7 |
| 4 | ∞ | 0.10 | | |
| 5 | 23.8003 | 3.13 | 1.72916 | 54.7 |
| 6 | −29.4084 | 0.10 | | |
| 7 | 19.1389 | 2.04 | 1.75500 | 54.7 |
| 8 | 34.2845 | $D_8$(variable) | | |
| 9 | −20.2147 | 0.65 | 1.75600 | 52.3 |
| 10 | 8.0477 | 1.20 | | |
| 11 | −18.0172 | 0.61 | 1.51680 | 64.2 |
| 12 | 7.1392 | 1.75 | 1.84666 | 23.8 |
| 13 | 29.7317 | $D_{13}$(variable) | | |
| 14 | ∞ (stop) | 0.50 | | |
| 15* | 7.6152 | 1.85 | 1.50842 | 56.4 |
| 16* | −20.0005 | 0.33 | | |
| 17 | 154.8902 | 0.60 | 1.84666 | 23.8 |
| 18 | 29.0224 | $D_{18}$(variable) | | |
| 19 | 7.4389 | 0.61 | 1.92286 | 18.9 |
| 20 | 5.0000 | 2.95 | 1.48749 | 70.2 |
| 21 | −15.5250 | 2.63 | | |
| 22* | −10.9787 | 1.10 | 1.56865 | 58.6 |
| 23* | −50.1705 | $D_{23}$(variable) | | |
| 24 | ∞ | 1.00 | 1.51680 | 64.2 |
| 25 | ∞ | | | |
| f = 6.34–17.92 | | $F_{NO}$ = 3.60–3.86 | 2ω = 63.0°–22.0° | |

The lens surfaces with a * to the right of the surface number in Table 4 are aspheric lens surfaces, and the aspheric surface shapes of these lens surfaces are expressed by Equation (A) above.

Table 5 below lists the values of the constant K and the aspheric coefficients $A_4$, $A_6$, $A_8$, and $A_{10}$ in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

In the zoom optical system of Embodiment 2-1, lens groups G2 and G4 move to vary the on-axis surface spacings of the various optical elements along the optical axis during zooming between the wide-angle end W and the telephoto end T of the zoom range. Therefore, the values of the on-axis surface spacings $D_8$, $D_{13}$, $D_{18}$, and $D_{23}$ vary. Table 6 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{18}$ between the lens surface of the extreme image side of the third lens group G3 and the lens surface of the object-most side of the fourth lens group G4, and the on-axis surface spacing $D_{23}$ between the lens surface of the extreme image side of the fourth lens group G4 and the object side surface of the filter unit 2, at the wide-angle end (focal length f equals 6.34 mm) and the telephoto end (focal length f equals 17.92 mm) in the zoom optical system of Embodiment 2-1 with the zoom optical system focused at infinity.

TABLE 6

| Focal Length f (mm) | $D_8$ | $D_{13}$ | $D_{18}$ | $D_{23}$ |
|---|---|---|---|---|
| 6.34 | 1.00 | 9.49 | 4.45 | 6.16 |
| 17.92 | 8.42 | 2.07 | 2.39 | 8.22 |

Additionally, the zoom optical system of Embodiment 2-1 satisfies Condition (1) with a value of $t_d/f_w$ equal to 1.42.

FIGS. 29A–29D show the spherical aberration, astigmatism, distortion, and lateral color, respectively, of the zoom optical system of Embodiment 2-1, as well as Embodiments 2-2 and 2-3, at the wide-angle end, and FIGS. 29E–29H show the spherical aberration, astigmatism, distortion, and lateral color, respectively, of the zoom optical system of Embodiment 2-1, as well as Embodiments 2-2 and 2-3, at the telephoto end. In FIGS. 29A and 29E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 29B and 29F, the astigmatism (in mm) is shown for both the sagittal image surface S and the tangential image surface T and is measured at 587.6 nm (the d-line). In FIGS. 29C and 29G, distortion (in percent) is measured at 587.6 nm (the d-line). In FIGS. 29D and 29H, the lateral color (in μm) is shown for the wavelengths 460 nm and 615 nm relative to 587.6 nm (the d-line).

As is evident from FIGS. 29A–29H, the zoom optical system of Embodiment 2-1 is a high performance zoom optical system capable of favorably correcting aberrations.

TABLE 5

| # | K | $A_4$ | $A_6$ | $A_8$ | $A_{10}$ |
|---|---|---|---|---|---|
| 15 | 0.7353000 | −1.3415898E-4 | 4.4553715E-6 | 7.6092782E-7 | −5.0394055E-9 |
| 16 | 1.0087282 | 2.6884682E-4 | 1.1342275E-5 | 1.7017848E-7 | 1.1177968E-8 |
| 22 | 1.1111256 | −1.8831251E-4 | −7.4900491E-6 | 1.8100336E-7 | 9.1690095E-9 |
| 23 | 0.5622224 | 2.7492996E-4 | −8.8154434E-6 | 5.0751243E-7 | −1.9077591E-8 |

EMBODIMENT 2-2

Figure 3:
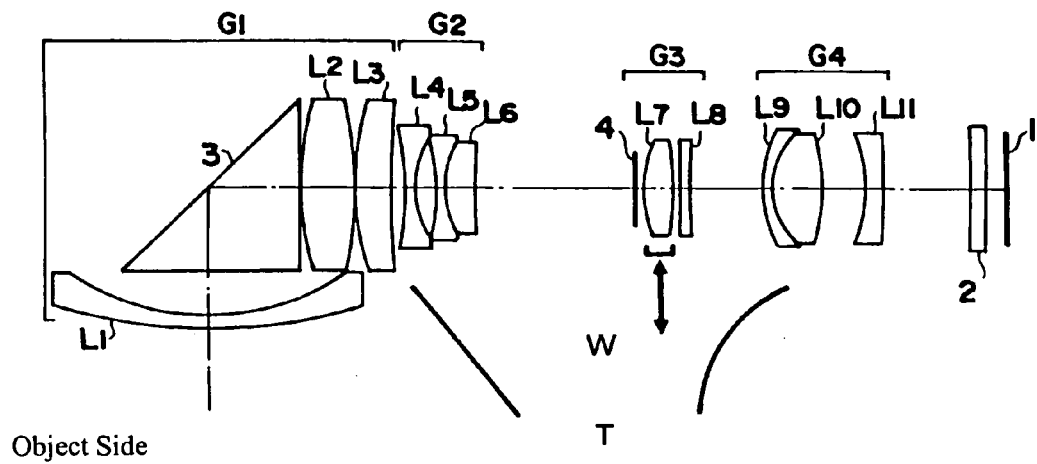
FIG. 3 shows a cross-sectional view of the zoom optical system of Embodiment 2-2 at the wide-angle end.

FIG. 3 shows a cross-sectional view of the zoom optical system of Embodiment 2-2 at the wide-angle end. The zoom optical system of Embodiment 2-2 has a four lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the seventh lens element L7 having positive refractive power in the third lens group G3.

The zoom optical system of Embodiment 2-2 is nearly the same as Embodiment 2-1 above, the only difference being that unlike Embodiment 2-1, in this embodiment the eighth lens element L8 does not move in a direction that intersects the optical axis for vibration correction but rather remains stationary on the optical axis and only the seventh lens element L7 moves for vibration correction.

However, the lens and other optical element data of Tables 4–6 above of Embodiment 2-1 also describe Embodiment 2-2. Accordingly, the various aberrations, including the spherical aberration, astigmatism, distortion, and lateral color, of Embodiment 2-2 for the wide-angle and telephoto ends are the same as those shown in FIGS. 29A–29H.

Additionally, therefore, the zoom optical system of Embodiment 2-2 satisfies Condition (1) with a value of $t_d/f_w$ equal to 1.42, the same value as Embodiment 2-1.

Furthermore, as is evident from FIGS. 29A–29H, the zoom optical system of Embodiment 2-2 is a high performance zoom optical system capable of favorably correcting aberrations.

EMBODIMENT 2-3

Figure 4:
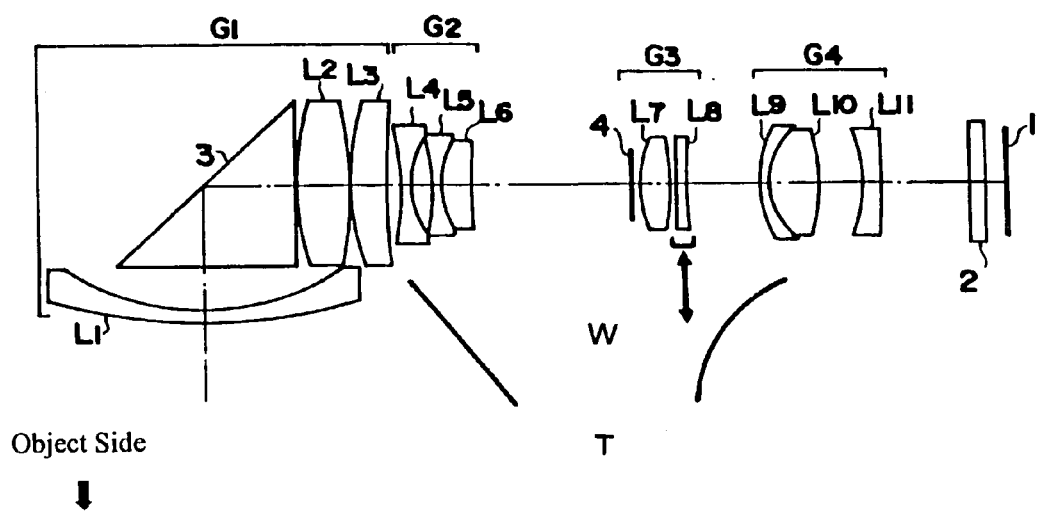
FIG. 4 shows a cross-sectional view of the zoom optical system of Embodiment 2-3 at the wide-angle end.

FIG. 4 shows a cross-sectional view of the zoom optical system of Embodiment 2-3 at the wide-angle end. The zoom optical system of Embodiment 2-3 has a four lens group construction, and the third lens group G3 provides the vibration correction function. In particular, the third lens group G3 prevents blurring of the image at the image plane 1 that would otherwise occur due to vibration of the zoom optical system by moving, in a direction that intersects the optical axis, only the eighth lens element L8 having negative refractive power in the third lens group G3.

The zoom optical system of Embodiment 2-3 is nearly the same as Embodiment 2-1 above, the only difference being that, unlike Embodiment 2-1, in this embodiment the seventh lens element L7 does not move in a direction that intersects the optical axis for vibration correction but rather remains stationary on the optical axis and only the eighth lens element L8 moves for vibration correction.

However, the lens and other optical element data of Tables 4–6 above of Embodiment 2-1 also describe Embodiment 2-3. Accordingly, the various aberrations, including the spherical aberration, astigmatism, distortion, and lateral color of Embodiment 2-3 at the wide-angle and telephoto ends are the same as those shown in FIGS. 29A–20H.

Additionally, therefore, the zoom optical system of Embodiment 2-3 satisfies Condition (1) with a value of $t_d/f_w$ equal to 1.42, the same value as Embodiment 2-1.

Furthermore, as is evident from FIGS. 29A–29H, the zoom optical system of Embodiment 2-3 is a high performance zoom optical system capable of favorably correcting aberrations.

EMBODIMENT 3-1

Figure 5:
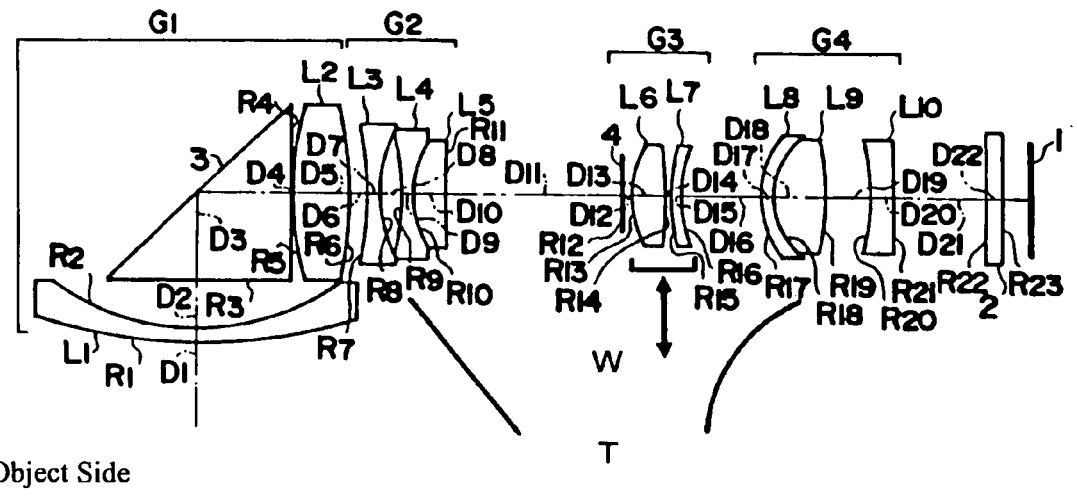
FIG. 5 shows a cross-sectional view of the zoom optical system of Embodiment 3-1 at the wide-angle end.

FIG. 5 shows a cross-sectional view of the zoom optical system of Embodiment 3-1 at the wide-angle end. The zoom optical system of Embodiment 3-1 has a four lens group construction, and the third lens group G3 provides the vibration correction function. In particular, the third lens group G3 includes a lens element having positive refractive power (i.e., the sixth lens element L6) and a lens element having negative refractive power (i.e., the seventh lens element L7) that prevent blurring of an image formed at the image plane 1 by movement of these lens elements L6 and L7 in a direction that intersects the optical axis in order to correct for blurring of the image being recorded or viewed due to vibration of the zoom optical system.

As shown in FIG. 5, the first lens group G1 includes, arranged along the optical axis in order from the object side, a first lens element L1 having negative refractive power and a meniscus shape with its convex surface on the object side, a right-angle prism 3 that bends the optical axis, and a biconvex second lens element L2. The second lens group G2 includes, arranged along the optical axis in order from the object side, a biconcave third lens element L3, a biconcave fourth lens element L4, and a fifth lens element L5 having positive refractive power and a meniscus shape with its convex surface on the object side. The third lens group G3 includes, arranged along the optical axis in order from the object side, a stop or diaphragm 4, a biconvex sixth lens element L6, and a seventh lens element L7 having negative refractive power and a meniscus shape with its convex surface on the object side. The fourth lens group G4 includes, arranged along the optical axis in order from the object side, an eighth lens element L8 having negative refractive power and a meniscus shape with its convex surface on the object side, a biconvex ninth lens element L9, and a tenth lens element L10 having negative refractive power and a meniscus shape with its convex surface on the image side.

In addition, the fourth lens element L4 and the fifth lens element L5 are cemented together at adjoining lens surfaces, as are also the eighth lens element L8 and the ninth lens element L9.

Also, in Embodiment 3-1, the filter unit 2 includes an infrared filter and/or similar structures, including a cover glass for a solid state image sensor, provided between the fourth lens group G4 and the image plane 1.

In the zoom optical system of Embodiment 3-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the sixth lens element L6 and the seventh lens element L7 that form the third lens group G3 in a direction that intersects the optical axis.

Specific data regarding the zoom optical system of Embodiment 3-1 are shown below in Tables 7–9. These tables are equally descriptive of Embodiments 3-2 and 3-3 that will be described after Embodiment 3-1.

Table 7 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 3-1, except that the on-axis surface spacings that vary with zooming are listed in Table 9 below. Listed in the bottom portion of Table 7 are the focal length f (in mm) and the f-number $F_{NO}$ at the wide-angle and telephoto ends, and the maximum field angle 2ω at the wide-angle end and the telephoto end for Embodiment 3-1.

TABLE 7

| # | R | D | $N_d$ | $v_d$ |
|---|---|---|---|---|
| 1 | 46.9285 | 0.82 | 1.92286 | 20.9 |
| 2 | 15.0000 | 2.20 | | |
| 3 | ∞ | 10.3 | 1.83481 | 42.7 |
| 4 | ∞ | 0.10 | | |
| 5* | 15.0413 | 3.26 | 1.69350 | 53.2 |
| 6* | −22.7747 | $D_6$ (variable) | | |
| 7 | −22.7142 | 0.60 | 1.75500 | 52.3 |
| 8 | 7.5266 | 1.29 | | |
| 9 | −18.1072 | 0.61 | 1.51742 | 52.4 |
| 10 | 6.9346 | 1.83 | 1.84666 | 23.8 |
| 11 | 33.3034 | $D_{11}$ (variable) | | |
| 12 | ∞ (stop) | 0.50 | | |
| 13* | 6.4465 | 1.93 | 1.50842 | 56.4 |
| 14* | −30.4906 | 0.30 | | |
| 15 | 13.9329 | 0.60 | 1.84666 | 23.8 |
| 16 | 8.5245 | $D_{16}$ (variable) | | |
| 17 | 6.9674 | 0.65 | 1.92286 | 18.9 |
| 18 | 5.0000 | 2.79 | 1.48749 | 70.2 |
| 19 | −20.8484 | 2.61 | | |
| 20* | −15.4088 | 1.10 | 1.56865 | 58.6 |
| 21* | −11944.2800 | $D_{21}$ (variable) | | |
| 22 | ∞ | 1.00 | 1.51680 | 64.2 |
| 23 | ∞ | | | | f = 6.35–17.95   $F_{NO}$ = 3.60–3.91   2ω = 63.2°–21.8°

The lens surfaces with a * to the right of the surface number in Table 7 are aspheric lens surfaces, and the aspheric surface shapes of these lens surfaces are expressed by Equation (A) above.

Table 8 below lists the values of the constant K and the aspheric coefficients $A_3$–$A_{10}$ in Equation (A) above for each of the aspheric lens surfaces of Table 7. Aspheric coefficients that are not present in Table 8 are zero. An "E" in the data indicates that the number following the "E" is the exponent to the base 10. For example, "1.0E-2" represents the number $1.0 \times 10^{-2}$.

end T of the zoom range. Therefore, the values of the on-axis surface spacings $D_6$, $D_{11}$, $D_{16}$, and $D_{21}$ vary. Table 9 below lists the value of the on-axis surface spacing $D_6$ between the lens surface on the extreme image side of the first lens group G1 and the lens surface of the object-most side of the second lens group G2, the on-axis surface spacing $D_{11}$ between the lens surface on the extreme image side of the second lens group G2 and the stop or diaphragm 4, the on-axis surface spacing $D_{16}$ between the lens surface of the extreme image side of the third lens group G3 and the lens surface of the object-most side of the fourth lens group G4, and the on-axis surface spacing $D_{21}$ between the lens surface of the extreme image side of the fourth lens group G4 and the object side surface of the filter unit 2, at the wide-angle end (focal length f equals 6.35 mm) and the telephoto end (focal length f equals 17.95 mm) in the zoom optical system of Embodiment 3-1 with the zoom optical system focused at infinity.

TABLE 9

| Focal Length f (mm) | $D_6$ | $D_{11}$ | $D_{16}$ | $D_{21}$ |
|---|---|---|---|---|
| 6.35 | 1.00 | 10.01 | 4.53 | 6.48 |
| 17.95 | 8.55 | 2.45 | 2.37 | 8.63 |

Additionally, the zoom optical system of Embodiment 3-1 satisfies Condition (1) with a value of $t_d/f_w$ equal to 1.25.

FIGS. 30A–30D show the spherical aberration, astigmatism, distortion, and lateral color, respectively, of the zoom optical system of Embodiment 3-1, as well as of Embodiments 3-2 and 3-3, at the wide-angle end, and FIGS. 30E–30H show the spherical aberration, astigmatism, distortion, and lateral color, respectively, of the zoom optical of Embodiment 3-1, as well as of Embodiments 3-2 and 3-3, at the telephoto end. In FIGS. 30A and 30E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 30B and 30F, the astigmatism (in mm) is shown for both the sagittal image surface S and the tangential image surface T and is measured at

TABLE 8

| # | K | $A_3$ | $A_4$ | $A_5$ | $A_6$ | $A_7$ |
|---|---|---|---|---|---|---|
| 5 | 0.9704877 | 2.6776290E−4 | −1.0690933E−4 | 6.2047760E−6 | 6.6378182E−7 | −1.8924453E−8 |
| 6 | 1.0007739 | 2.8341350E−4 | −2.0219496E−5 | −1.3818341E−7 | 2.0669726E−6 | −5.3975569E−8 |
| 13 | 0.5999317 | 0 | −2.0141608E−4 | 0 | 1.4908244E−6 | 0 |
| 14 | 1.0062477 | 0 | 2.0930730E−4 | 0 | 6.3658202E−6 | 0 |
| 20 | 1.0686721 | 0 | −5.0558470E−4 | 0 | −1.2829337E−5 | 0 |
| 21 | 0.5591829 | 0 | 2.6374215E−4 | 0 | −4.1889959E−6 | 0 |

| # | $A_8$ | $A_9$ | $A_{10}$ |
|---|---|---|---|
| 5 | −2.2807156E−9 | −1.0642299E−9 | −1.3582263E−10 |
| 6 | 1.6890434E−8 | −2.8092697E−9 | 2.1808485E−10 |
| 13 | 5.5903571E−7 | 0 | −6.1280469E−9 |
| 14 | 2.4545834E−7 | 0 | 1.0759209E−8 |
| 20 | 2.4311622E−8 | 0 | 9.2006557E−9 |
| 21 | 6.9622172E−7 | 0 | −1.8357838E−8 |

In the zoom optical system of Embodiment 3-1, lens groups G2 and G4 move to vary the on-axis surface spacings of various optical elements along the optical axis during zooming between the wide-angle end W and the telephoto 587.6 nm (the d-line). In FIGS. 30C and 30G, distortion (in percent) is measured at 587.6 nm (the d-line). In FIGS. 30D and 30H, the lateral color (in μm) is shown for the wavelengths 460 nm and 615 nm relative to 587.6 nm (the d-line).

As is evident from FIGS. 30A–30H, the zoom optical system of Embodiment 3-1 is a high performance zoom optical system capable of favorably correcting aberrations.

EMBODIMENT 3-2

Figure 6:
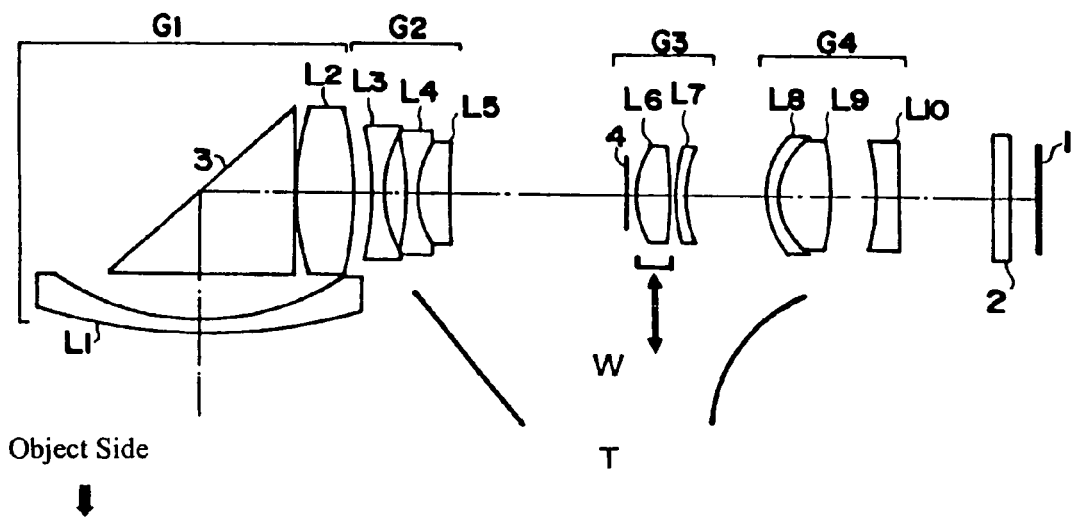
FIG. 6 shows a cross-sectional view of the zoom optical system of Embodiment 3-2 at the wide-angle end.

FIG. 6 shows a cross-sectional view of the zoom optical system of Embodiment 3-2 at the wide-angle end. The zoom optical system of Embodiment 3-2 has a four lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the sixth lens element L6 having positive refractive power in the third lens group G3.

The zoom optical system of Embodiment 3-2 is nearly the same as Embodiment 3-1 above, the only difference being that, unlike Embodiment 3-1, in this embodiment the seventh lens element L7 does not move in a direction that intersects the optical axis for vibration correction but rather remains stationary on the optical axis and only the sixth lens element L6 moves for vibration correction.

However, the lens and other optical element data of Tables 7–9 above of Embodiment 3-1 also describe Embodiment 3-2. Accordingly, the various aberrations, including the spherical aberration, astigmatism, distortion, and lateral color, of Embodiment 3-2 for the wide-angle and telephoto ends are the same as those shown in FIGS. 30A–30H.

Additionally, therefore, the zoom optical system of Embodiment 3-2 satisfies Condition (1) with a value of $t_d/f_w$ equal to 1.25, the same value as Embodiment 3-1.

Furthermore, as is evident from FIGS. 30A–30H, the zoom optical system of Embodiment 3-2 is a high performance zoom optical system capable of favorably correcting aberrations.

EMBODIMENT 3-3

Figure 7:
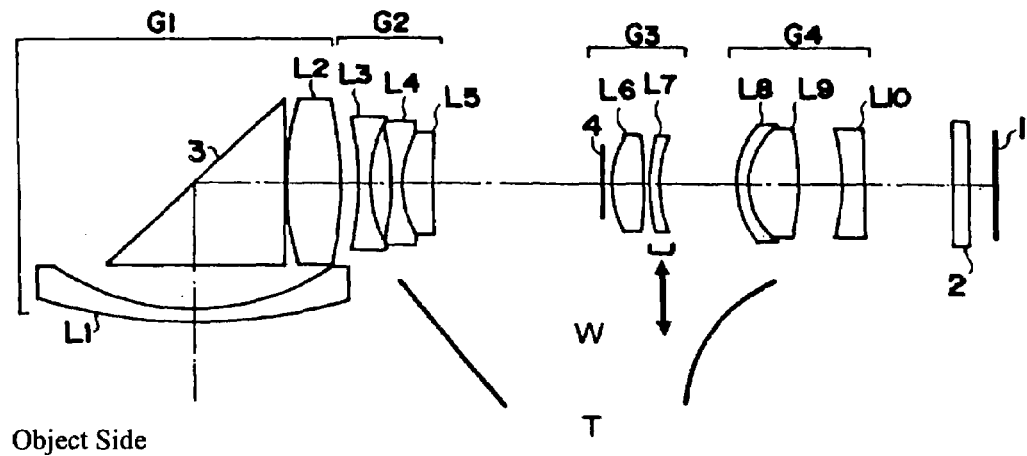
FIG. 7 shows a cross-sectional view of the zoom optical system of Embodment 3-3 at the wide-angle end.

FIG. 7 shows a cross-sectional view of the zoom optical system of Embodiment 3-3 at the wide-angle end. The zoom optical system of Embodiment 3-3 has a four lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the seventh lens element L7 having negative refractive power in the third lens group G3.

The zoom optical system of Embodiment 3-3 is nearly the same as Embodiment 3-1 above, the only difference being that unlike Embodiment 3-1 the sixth lens element L6 does not move in a direction that intersects the optical axis for vibration correction but rather remains stationary on the optical axis. That is, only the seventh lens element L7 moves for vibration correction.

However, the lens and other optical element data of Tables 7–9 above of Embodiment 3-1 also describe Embodiment 3-3. Accordingly, the various aberrations, including the spherical aberration, astigmatism, distortion, and lateral color, of Embodiment 3-3 at the wide-angle and telephoto ends are the same as those shown in FIGS. 30A–30H.

Additionally, therefore, the zoom optical system of Embodiment 3-3 satisfies Condition (1) with a value of $t_d/f_w$ equal to 1.25, the same value as Embodiment 3-1.

Furthermore, as is evident from FIGS. 30A–30H, the zoom optical system of Embodiment 3-3 is a high performance zoom optical system capable of favorably correcting aberrations.

EMBODIMENT 4

Figure 8:
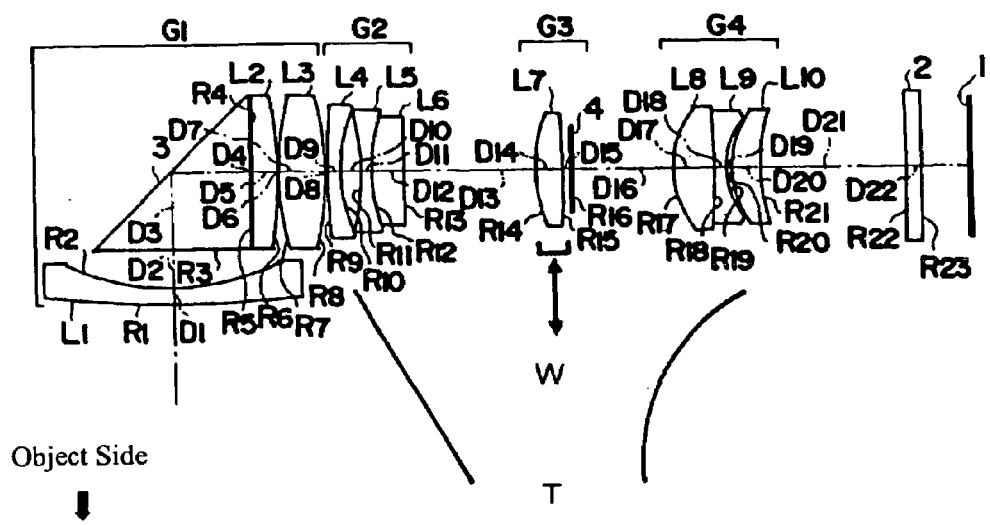
FIG. 8 shows a cross-sectional view of the zoom optical system of Embodiment 4 at the wide-angle end.

FIG. 8 shows a cross-sectional view of the zoom optical system of Embodiment 4 at the wide-angle end. The zoom optical system of Embodiment 4 has a four lens group construction, and the third lens group G3 provides the vibration correction function. In particular, the third lens group G3 includes a lens element having positive refractive power (i.e., the seventh lens element L7) that prevents blurring of an image formed at the image plane 1 by movement of this lens element L7 having positive refractive power in a direction that intersects the optical axis in order to correct for blurring of the image being recorded or viewed due to vibration of the zoom optical system, and also includes the stop or diaphragm 4.

As shown in FIG. 8, the first lens group G1 includes, arranged along the optical axis in order from the object side, a first lens element L1 having negative refractive power and a meniscus shape with its convex surface on the object side, a right-angle prism 3 that bends the optical axis, a plano-convex second lens element L2, and a biconvex third lens element L3. The second lens group G2 includes, arranged along the optical axis in order from the object side, a fourth lens element L4 having negative refractive power and a meniscus shape with a convex surface on the object side, a biconcave fifth lens element L5, and a biconvex sixth lens element L6. The third lens group G3 includes, arranged along the optical axis in order from the object side, a biconvex seventh lens element L7 and the stop or diaphragm 4. The fourth lens group G4 includes, arranged along the optical axis in order from the object side, a biconvex eight lens element L8, a biconcave ninth lens element L9, and a tenth lens element L10 having positive refractive power and a meniscus shape with its convex surface on the object side.

In addition, the fifth lens element L5 and the sixth lens element L6 are cemented together at adjoining lens surfaces, as are also the eighth lens element L8 and the ninth lens element L9.

Also, in Embodiment 4, the filter unit 2 includes an infrared filter and/or similar structures, including a cover glass for a solid state image sensor, provided between the fourth lens group G4 and the image plane 1.

In the zoom optical system of Embodiment 4, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 that forms the third lens group G3 in a direction that intersects the optical axis.

Table 10 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 4, except that the on-axis surface spacings that vary with zooming are listed in Table 12 below. Listed in the bottom portion of Table 10 are the focal length f (in mm) and the f-number $F_{NO}$ at the wide-angle and telephoto ends, and the maximum field angle 2ω at the wide-angle end and the telephoto end for Embodiment 4.

TABLE 10

| # | R | D | $N_d$ | $\nu_d$ |
|---|---|---|---|---|
| 1 | 54.8917 | 0.76 | 1.92286 | 20.9 |
| 2 | 10.9715 | 2.09 | | |
| 3 | ∞ | 8.10 | 1.83481 | 42.7 |
| 4 | ∞ | 0.05 | | |
| 5 | ∞ | 1.25 | 1.75520 | 27.5 |
| 6 | −37.2448 | 0.10 | | |
| 7* | 14.0779 | 2.35 | 1.58809 | 60.4 |
| 8* | −19.1783 | $D_8$ (variable) | | |
| 9 | 58.3809 | 0.58 | 1.72916 | 54.7 |
| 10 | 8.3596 | 1.09 | | |
| 11 | −9.2871 | 0.60 | 1.80400 | 46.6 |
| 12 | 12.9680 | 1.55 | 1.92286 | 18.9 |
| 13 | −168.8569 | $D_{13}$ (variable) | | |
| 14* | 8.6331 | 1.25 | 1.51007 | 56.2 |
| 15* | −76.0640 | 0.50 | | |
| 16 | ∞ (stop) | $D_{16}$ (variable) | | |
| 17 | 5.8907 | 2.01 | 1.83481 | 42.7 |
| 18 | −74.8060 | 0.59 | 1.84666 | 23.8 |
| 19 | 4.5889 | 0.24 | | |
| 20* | 5.6911 | 1.60 | 1.51530 | 62.8 |
| 21* | 26.0680 | $D_{21}$ (variable) | | |
| 22 | ∞ | 0.83 | 1.51680 | 64.2 |
| 23 | ∞ | | | | f = 6.34–17.93   $F_{NO}$ = 3.59–4.27   2ω = 62.6°–22.0°

The lens surfaces with a * to the right of the surface number in Table 10 are aspheric lens surfaces, and the aspheric surface shapes of these lens surfaces are expressed by Equation (A) above.

Table 11 below lists the values of the constant K and the aspheric coefficients $A_3$–$A_{12}$ in Equation (A) above for each of the aspheric lens surfaces of Table 10. Aspheric coefficients that are not present in Table 11 are zero. An "E" in the data indicates that the number following the "E" is the exponent to the base 10. For example, "1.0E-2" represents the number $1.0 \times 10^{-2}$.

lens group G2, the on-axis surface spacing $D_{13}$ between the lens surface on the extreme image side of the second lens group G2 and the lens surface on the object-most side of the third lens group G3, the on-axis surface spacing $D_{16}$ between the diaphragm or stop 4 and the lens surface of the object-most side of the fourth lens group G4, and the on-axis surface spacing $D_{21}$ between the tens surface of the extreme image side of the fourth lens group G4 and the object side surface of the filter unit 2, at the wide-angle end (focal length f equals 6.34 mm) and the telephoto end (focal length f equals 17.93 mm) in the zoom optical system of Embodiment 4 with the zoom optical system focused at infinity.

TABLE 12

| Focal Length f (mm) | $D_8$ | $D_{13}$ | $D_{16}$ | $D_{21}$ |
|---|---|---|---|---|
| 6.34 | 0.23 | 6.79 | 5.29 | 9.80 |
| 17.93 | 6.80 | 0.21 | 1.93 | 13.16 |

Additionally, the zoom optical system of Embodiment 4 satisfies Condition (1) with a value of $t_d/f_w$ equal to 1.03.

Figure 31A:
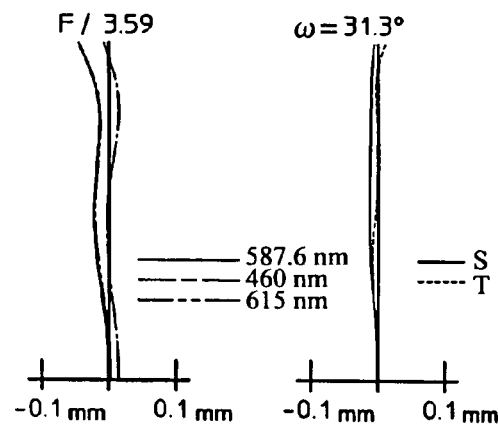
FIGS. 31A–31D show the spherical aberration, astigmatism, distortion, and lateral color, respectively, of the zoom optical system of Embodiment 4 at the wide-angle end.
Figure 31B:
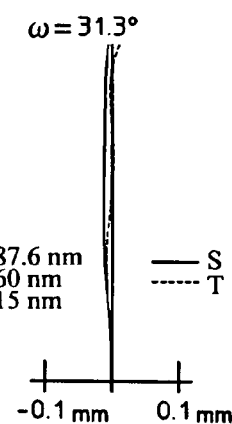
Figure 31C:
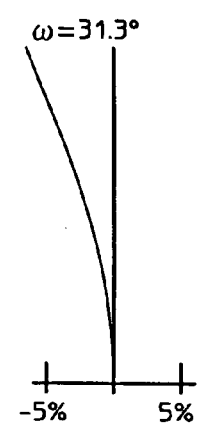
Figure 31D:
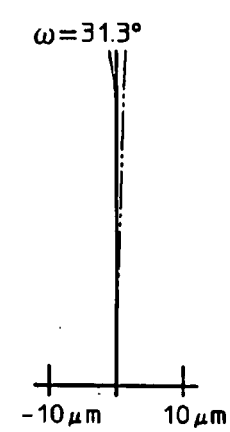
Figure 31E:
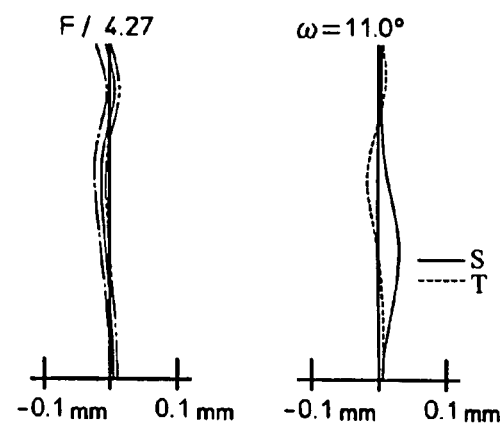
FIGS. 31E–31H show the spherical aberration, astigmatism, distortion, and lateral color, respectively, of the zoom optical system of Embodiment 4 at the telephoto end.
Figure 31F:
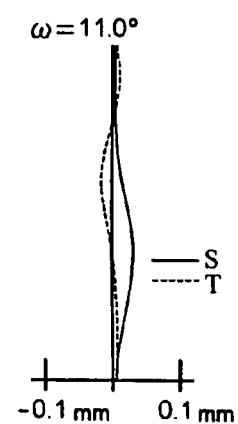
Figure 31G:
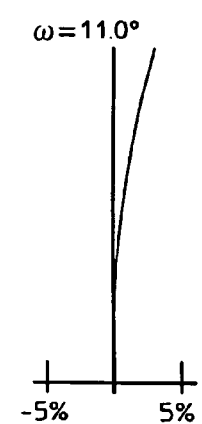
Figure 31H:
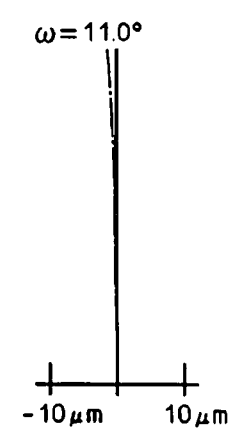

FIGS. 31A–31D show the spherical aberration, astigmatism, distortion, and lateral color, respectively, of the zoom optical system of Embodiment 4 at the wide-angle end, and FIGS. 31E–31H show the spherical aberration, astigmatism, distortion, and lateral color, respectively, of the zoom optical system of Embodiment 4 at the telephoto end. In FIGS. 31A and 31E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 31B and 31F, the astigmatism (in mm) is shown for both the sagittal image surface S and the tangential image surface T and is measured at 587.6 nm (the d-line). In FIGS. 31C and 31G, distortion (in percent) is measured at 587.6 nm (the d-line). In FIGS. 31D and 31H, the lateral color (in

TABLE 11

| # | K | $A_3$ | $A_4$ | $A_5$ | $A_6$ | $A_7$ | $A_8$ |
|---|---|---|---|---|---|---|---|
| 7 | 0.9042386 | 2.4520549E−4 | −7.9692904E−5 | −2.8018362E−5 | 5.0025113E−6 | 9.0331766E−8 | 6.6795346E−8 |
| 8 | 0.9770572 | 4.4513947E−4 | −1.8004757E−4 | 6.2236853E−6 | 4.8378460E−6 | −6.4157530E−8 | 3.0444581E−8 |
| 14 | 1.1329410 | 0 | 6.8550321E−5 | 0 | 3.8417326E−6 | 0 | 2.0596064E−6 |
| 15 | 0.9987394 | 0 | 3.6694963E−4 | 0 | 2.7410339E−5 | 0 | −1.8018674E−6 |
| 20 | 1.7000254 | 2.4261209E−4 | 5.3720100E−4 | 8.8773062E−6 | 3.0577261E−5 | 2.3271041E−7 | 2.6163662E−6 |
| 21 | 1.0333767 | −1.0035360E−4 | 2.7951369E−3 | −7.2485598E−5 | 7.3517201E−5 | −4.8998957E−7 | 1.0875630E−5 |

| # | $A_9$ | $A_{10}$ | $A_{11}$ | $A_{12}$ |
|---|---|---|---|---|
| 7 | −6.6889889E−9 | −1.4118112E−9 | −3.7172727E−10 | −2.5741176E−11 |
| 8 | −1.3776770E−8 | −2.5760713E−9 | −1.0405539E−10 | 7.5729919E−12 |
| 14 | 0 | −1.0909457E−7 | 0 | 0 |
| 15 | 0 | 9.3620748E−8 | 0 | 0 |
| 20 | 3.5827687E−11 | 7.2786675E−8 | −5.1735533E−11 | 1.6894719E−13 |
| 21 | −1.0550646E−9 | 1.8032897E−7 | −1.7358934E−10 | −2.5370451E−11 |

In the zoom optical system of Embodiment 4, lens groups G2 and G4 move to vary the on-axis surface spacings of various optical elements along the optical axis during zooming between the wide-angle end W and the telephoto end T of the zoom range. Therefore, the values of the on-axis surface spacings $D_8$, $D_{13}$, $D_{16}$, and $D_{21}$ vary. Table 12 below lists the value of the on-axis surface spacing $D_8$ between the lens surface on the extreme image side of the first lens group G1 and the lens surface of the object-most side of the second μm) is shown for the wavelengths 460 nm and 615 nm relative to 587.6 nm (the d-line).

As is evident from FIGS. 31A–31H, the zoom optical system of Embodiment 4 is a high performance zoom optical system capable of favorably correcting aberrations.

The efficient operation of embodiments of the present invention described above that belong to the first group of embodiments of the present invention is explained below.

According to zoom optical systems belonging to the first group of embodiments of the present invention, because the third lens group G3 having positive refractive power is stationary during zooming, the exit angles of light rays to the imaging plane side can be reduced in the entire zooming range from the wide-angle end all the way to the telephoto end, and the change of exit angles of light rays when zooming can also be reduced. For this reason, these zoom optical systems are especially suitable for an imaging device using a solid state image sensor such as a CCD or similar device.

Furthermore, because the third lens group G3 that prevents vibration by moving in a direction to intersect the optical axis, is stationary during zooming, the construction of the lens frame of the third lens group G3 can be simplified. Furthermore, because the third lens group G3 is provided in the vicinity of the diaphragm or stop 4 (in fact, by including the diaphragm or stop 4 in the third lens group G3), the outer diameter of the lens elements of the third lens group G3 can be smaller, and therefore the lens frame can be smaller.

Additionally, when, as in Embodiments 1 and 4 above, the third lens group G3 is constructed as a single lens element having positive refractive power, the zoom optical system becomes particularly suitable for miniaturization. Furthermore, by arranging the construction of the third lens group G3 with only, arranged along the optical axis in order from the object side, the diaphragm or stop 4 and a lens element having positive refractive power, as in Embodiment 1 above, the change in the exit angle of light rays to the image plane side during zooming can be reduced. For this reason, this becomes especially suitable for an imaging device using a solid state image sensor such as a CCD or similar device.

Furthermore, when the third lens group G3 includes one lens element having positive refractive power and one lens element having negative refractive power, as in Embodiments 2-1, 2-2, 2-3, 3-1, 3-2, and 3-3 above, the axial chromatic aberration can be reduced, and the field curvature can also be reduced by having the Petzval sum be an appropriate value. In this case, miniaturization of the zooming optical system becomes possible by constructing the third lens group G3 of, arranged along the optical axis in order from the object side, the stop or diaphragm 4, a lens element having positive refractive power, and a lens element having negative refractive power.

Moreover, by preventing blurring of an image being recorded at the image plane 1 (which normally accompanies vibration of the zoom optical system) by moving all the lens elements of the third lens group G3 in a direction that intersects the optical axis, as in Embodiments 1, 2-1, 3-1, and 4, the change of the optical performance of the zoom optical system at the time of vibration correction can be minimized.

Furthermore, by preventing blurring of an image being recorded at the image plane 1, which normally accompanies vibration of the zoom optical system, by moving less than all of the lens elements of the third lens group G3 in the direction to intersect the optical axis, as in Embodiments 2-2, 2-3, 3-2 and 3-3, the weight of the lens elements that are moved in order to correct for vibration is reduced, and the load of the vibration correction mechanism can be reduced.

Furthermore, by preventing blurring of an image being recorded at the image plane 1, which normally accompanies vibration of the zoom optical system, by moving only the lens element having positive refractive power within the third lens group G3 in the direction to intersect the optical axis, as in Embodiments 1, 2-2 and 3-2, the degree of movement of an image on the image plane 1 at the time of vibration correction increases in comparison with the case of correcting vibration by moving the lens element having negative refractive power, thereby enabling vibration correction performance to be sufficient with a small degree of movement.

Furthermore, by preventing blurring of an image being recorded at the image plane 1, which normally accompanies vibration of the zoom optical system, by moving only the lens element having negative refractive power within the third lens group G3 in the direction to intersect the optical axis, as in Embodiments 2-3 and 3-3, the weight of the lens element that is moved at the time of vibration correction becomes smaller in comparison with the case of preventing vibration by moving a lens element having positive refractive power, thereby enabling the load of the vibration correction mechanism to be reduced.

A second group of embodiments of the zoom optical system of the present invention will be described in detail below.

EMBODIMENT 5

FIG. 9 shows a cross-sectional view of the zoom optical system of Embodiment 5 at the wide-angle end. The zoom optical system of Embodiment 9 has a four lens group construction, and the fourth lens group G4 provides the vibration correction function. In particular, the fourth lens group G4 includes the tenth lens element L10, the eleventh lens element L11, and the twelfth lens element L12 that prevent blurring of an image formed at the image plane 1 by movement of these lens elements in a direction that intersects the optical axis in order to correct for blurring of the image being recorded or viewed due to vibration of the zoom optical system.

As shown in FIG. 9, the first lens group G1 includes, arranged along the optical axis in order from the object side, a biconcave first lens element L1, a right-angle prism 3 that bends the optical axis, a biconvex second lens element L2, and a biconvex third lens element L3. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4, a biconvex seventh lens element L7, a biconvex eighth lens element L8, and a biconcave ninth lens element L9. The fourth lens group G4 includes, arranged along the optical axis in order from the object side, a tenth lens element L10 having negative refractive power and a meniscus shape with its convex surface on the object side, a biconvex eleventh lens element L11, and a twelfth lens element L12 having positive refractive power and a meniscus shape with its convex surface on the image side.

In addition, the fifth lens element L5 and the sixth lens element L6 are cemented together at adjoining lens surfaces, as are also the eighth lens element L8 and the ninth lens element L9, as are also the tenth lens element L10 and the eleventh lens element L11.

Also, in Embodiment 5, the filter unit 2 includes an infrared filter and/or similar structures, including a cover glass for a solid state image sensor, and is provided between the fourth lens G4 and the image plant 1

In the zoom optical system of Embodiment 5, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the tenth lens element L10, the eleventh lens element L11, and the twelfth lens element L12, in a direction that intersects the optical axis.

Table 13 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 5, except that the on-axis surface spacings that vary with zooming are listed in Table 15 below. Listed in the bottom portion of Table 13 are the focal length f (in mm) and the f-number $F_{NO}$ at the wide-angle and telephoto ends, and the maximum field angle 2ω at the wide-angle end and the telephoto end for Embodiment 5.

Table 14 below lists the values of the constant K and the aspheric coefficients $A_4$, $A_6$, $A_8$, and $A_{10}$ in Equation (A) above for each of the aspheric lens surfaces of Table 13. Aspheric coefficients that are not present in Table 14 are zero. An "E" in the data indicates that the number following the "E" is the exponent to the base 10. For example, "1.0E-2" represents the number $1.0 \times 10^{-2}$.

TABLE 14

| # | K | $A_4$ | $A_6$ | $A_8$ | $A_{10}$ |
|---|---|---|---|---|---|
| 15 | 0.5298579 | −9.4696061E−6 | 7.7149278E−7 | 5.3742230E−7 | −4.4010710E−9 |
| 16 | 1.0000633 | 1.5265145E−4 | 1.9396765E−6 | 3.0743834E−7 | 1.1636543E−8 |
| 23 | 1.1073370 | −6.6875980E−4 | 4.1585122E−6 | 8.9884313E−9 | 9.1306481E−9 |
| 24 | 0.7404522 | −6.9988517E−5 | −1.9798874E−6 | 7.4423487E−7 | −1.9944328E−8 |

In the zoom optical system of Embodiment 5, lens groups G2 and G3 move to vary the on-axis surface spacings of various optical elements along the optical axis during zooming between the wide-angle end W and the telephoto end T of the zoom range. Therefore, the values of the on-axis surface spacings $D_8$, $D_{13}$, and $D_{19}$ vary. Table 15 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, and the on-axis surface spacing $D_{19}$ between the lens surface of the extreme image side of the third lens group G3 and the lens surface of the object-most side of the fourth lens group G4 at the wide-angle end (focal length f equals 6.33 mm) and the telephoto end (focal length f equals 17.89 mm) in the zoom optical system of Embodiment 5 with the zoom optical system focused at infinity.

TABLE 13

| # | R | D | $N_d$ | $v_d$ |
|---|---|---|---|---|
| 1 | −142.7206 | 0.80 | 1.92286 | 20.9 |
| 2 | 15.0000 | 2.73 | | |
| 3 | ∞ | 9.50 | 1.83481 | 42.7 |
| 4 | ∞ | 0.10 | | |
| 5 | 50.7492 | 3.25 | 1.62041 | 60.3 |
| 6 | −19.0891 | 0.10 | | |
| 7 | 19.8020 | 2.60 | 1.72916 | 54.7 |
| 8 | −200.0468 | $D_8$ (variable) | | |
| 9 | −35.0024 | 0.60 | 1.88300 | 40.8 |
| 10 | 9.1703 | 1.20 | | |
| 11 | −18.0172 | 0.61 | 1.51742 | 52.4 |
| 12 | 9.0446 | 1.81 | 1.84666 | 23.8 |
| 13 | 290.6786 | $D_{13}$ (variable) | | |
| 14 | ∞ (stop) | 0.50 | | |
| 15* | 7.0645 | 1.75 | 1.68893 | 31.1 |
| 16* | −36.7640 | 2.00 | | |
| 17 | 8.6263 | 2.14 | 1.51680 | 64.2 |
| 18 | −11.9525 | 0.60 | 1.92286 | 18.9 |
| 19 | 5.1610 | $D_{19}$ (variable) | | |
| 20 | 8.7388 | 0.60 | 1.92286 | 18.9 |
| 21 | 7.2544 | 2.51 | 1.51823 | 59.0 |
| 22 | −83.3725 | 0.87 | | |
| 23* | −11.7244 | 1.53 | 1.56865 | 58.6 |
| 24* | −7.2262 | 7.04 | | |
| 25 | ∞ | 1.00 | 1.51680 | 64.2 |
| 26 | ∞ | | | |
| f = 6.33–17.89 | $F_{NO}$ = 3.57–3.75 | 2ω = 62.6°–21.6° | | |

The lens surfaces with a * to the right of the surface number in Table 13 are aspheric lens surfaces, and the aspheric surface shapes of these lens surfaces are expressed by Equation (A) above.

TABLE 15

| Focal Length f (mm) | $D_8$ | $D_{13}$ | $D_{19}$ |
|---|---|---|---|
| 6.33 | 1.00 | 12.67 | 1.50 |
| 17.89 | 8.59 | 2.07 | 4.52 |

Additionally, the zoom optical system of Embodiment 5 satisfies Condition (1) with a value of $t_d/f_w$ equal to 1.27.

FIGS. 32A–32D show the spherical aberration, astigmatism, distortion, and lateral color, respectively, of the zoom optical system of Embodiment 5 at the wide-angle end, and FIGS. 32E–32H show the spherical aberration, astigmatism, distortion, and lateral color, respectively, of the zoom optical system of Embodiment 5 at the telephoto end. In FIGS. 32A and 32E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 32B and 32F, the astigmatism (in mm) is shown for both the sagittal image surface S and the tangential image surface T and is measured at 587.6 nm (the d-line). In FIGS. 32C and 32G, distortion (in percent) is measured at 587.6 nm (the d-line). In FIGS. 32D and 32H, the lateral color (in μm) is shown for the wavelengths 460 nm and 615 nm relative to 587.6 nm (the d-line).

As is evident from FIGS. 32A–32H, the zoom optical system of Embodiment 5 is a high performance zoom optical system capable of favorably correcting aberrations.

EMBODIMENT 6-1

FIG. 10 shows a cross-sectional view of the zoom optical system of Embodiment 6-1 at the wide-angle end. The zoom optical system of Embodiment 6-1 has a four lens group construction, and the fourth lens group G4 provides the vibration correction function. In particular, the fourth lens group G4 includes the tenth lens element L10 and the eleventh lens element L11 that prevent blurring of an image formed at the image plane 1 by movement of these lens elements in a direction that intersects the optical axis in order to correct for blurring of the image being recorded or viewed due to vibration of the zoom optical system.

As shown in FIG. 10, the first lens group G1 includes, arranged along the optical axis in order from the object side, a biconcave first lens element L1, a right-angle prism 3 that bends the optical axis, a biconvex second lens element L2, and a biconvex third lens element L3. The second lens group G2 includes, arranged along the optical axis in order from the object side, a biconcave fourth lens element L4, a biconcave fifth lens element L5, and a biconvex sixth lens element L6. The third lens group G3 includes, arranged along the optical axis in order from the object side, a stop or diaphragm 4, a biconvex seventh lens element L7, a biconvex eighth lens element L8, and a biconcave ninth lens element L9. The fourth lens group G4 includes, arranged along the optical axis in order from the object side, a tenth lens element L10 having negative refractive power and a meniscus shape with its convex surface on the object side, a biconvex eleventh lens element L11, and a twelfth lens element L12 having positive refractive power and a meniscus shape with its convex surface on the image side.

In addition, the fifth lens element L5 and the sixth lens element L6 are cemented together at adjoining lens surfaces, as are also the eighth lens element L8 and the ninth lens element L9, as are also the tenth lens element L10 and the eleventh lens element L11.

Also, in Embodiment 6-1, the filter unit 2 includes an infrared filter and/or similar structures, including a cover glass for a solid state image sensor, and is provided between the fourth lens group G4 and the image plane 1.

In the zoom optical system of Embodiment 6-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the tenth lens element L10 and the eleventh lens element L11, that are cemented together, in a direction that intersects the optical axis.

Specific data regarding the zoom optical system of Embodiment 6-1 are shown below in Tables 16–18. These tables are equally descriptive of Embodiment 6-2 that will be described after Embodiment 6-1. Table 16 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 6-1, except that the on-axis surface spacings that vary with zooming are listed in Table 18 below. Listed in the bottom portion of Table 16 are the focal length f (in mm) and the f-number $F_{NO}$ at the wide-angle and telephoto ends, and the maximum field angle 2ω at the wide-angle end and the telephoto end for Embodiment 6-1.

TABLE 16

| # | R | D | $N_d$ | $v_d$ |
| --- | --- | --- | --- | --- |
| 1 | −210.4513 | 0.80 | 1.92286 | 20.9 |
| 2 | 15.0000 | 2.53 | | |
| 3 | ∞ | 9.50 | 1.83481 | 42.7 |
| 4 | ∞ | 0.10 | | |
| 5 | 148.6067 | 3.00 | 1.62041 | 60.3 |
| 6 | −21.0223 | 0.10 | | |
| 7 | 19.6976 | 2.78 | 1.72916 | 54.7 |
| 8 | −56.3549 | $D_8$ (variable) | | |
| 9 | −34.3434 | 0.60 | 1.88300 | 40.8 |
| 10 | 9.1343 | 1.21 | | |
| 11 | −18.0172 | 0.61 | 1.51742 | 52.4 |
| 12 | 9.1052 | 1.84 | 1.84666 | 23.8 |
| 13 | −719.5239 | $D_{13}$ (variable) | | |
| 14 | ∞ (stop) | 0.50 | | |
| 15* | 7.2209 | 1.50 | 1.68893 | 31.1 |
| 16* | −37.2382 | 1.74 | | |
| 17 | 8.6727 | 2.06 | 1.51680 | 64.2 |
| 18 | −19.4659 | 0.60 | 1.92286 | 18.9 |
| 19 | 5.1941 | $D_{19}$ (variable) | | |
| 20 | 9.0407 | 0.60 | 1.92286 | 18.9 |
| 21 | 7.2154 | 2.56 | 1.51823 | 59.0 |
| 22 | −30.8714 | 2.00 | | |
| 23* | −10.2242 | 1.30 | 1.56865 | 58.6 |
| 24* | −8.1092 | 6.51 | | |
| 25 | ∞ | 1.00 | 1.51680 | 64.2 |
| 26 | ∞ | | | | f = 6.34–17.92   $F_{NO}$ = 3.59–3.80   2ω = 61.4°–21.6°

The lens surfaces with a * to the right of the surface number in Table 16 are aspheric lens surfaces, and the aspheric surface shapes of these lens surfaces are expressed by Equation (A) above.

Table 17 below lists the values of the constant K and the aspheric coefficients $A_4$, $A_6$, $A_8$, and $A_{10}$ in Equation (A) above for each of the aspheric lens surfaces of Table 16. Aspheric coefficients that are not present in Table 17 are zero. An "E" in the data indicates that the number following the "E" is the exponent to the base 10. For example, "1.0E-2" represents the number $1.0 \times 10^{-2}$.

TABLE 17

| # | K | $A_4$ | $A_6$ | $A_8$ | $A_{10}$ |
| --- | --- | --- | --- | --- | --- |
| 15 | 0.5133576 | −7.9521034E−6 | 1.7779858E−7 | 5.4449091E−7 | −4.3758959E−9 |
| 16 | 1.0000862 | 1.5422841E−4 | 9.8980302E−7 | 3.0664117E−7 | 1.1749924E−8 |
| 23 | 0.8880047 | 3.1736049E−4 | 8.4828353E−6 | 7.1283707E−8 | 9.7890431E−9 |
| 24 | 0.2836747 | 6.0984466E−4 | 2.1572691E−6 | 7.2392684E−7 | −1.9844671E−8 |

In the zoom optical system of Embodiment 6-1, lens groups G2 and G3 move to vary the on-axis surface spacings of various optical elements along the optical axis during zooming between the wide-angle end W and the telephoto end T of the zoom range. Therefore, the values of the on-axis surface spacings $D_8$, $D_{13}$, and $D_{19}$ vary. Table 18 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, and the on-axis surface spacing $D_{19}$ between the lens surface of the extreme image side of the third lens group G3 and the lens surface of the object-most side of the fourth lens group G4 at the wide-angle end (focal lengths f equals 6.34 mm) and the telephoto end (focal length f equals 17.92 mm) in the zoom optical system of Embodiment 6-1 with the zoom optical system focused at infinity.

TABLE 18

| Focal Length f (mm) | $D_8$ | $D_{13}$ | $D_{19}$ |
|---|---|---|---|
| 6.34 | 1.00 | 13.08 | 1.50 |
| 17.92 | 8.76 | 2.07 | 4.75 |

Additionally, the zoom optical system of Embodiment 6-1 satisfies Condition (1) with a value of $t_d/f_w$ equal to 1.23.

FIGS. 33A–33D show the spherical aberration, astigmatism, distortion, and lateral color, respectively, of the zoom optical system of Embodiment 6-1 at the wide-angle end, and FIGS. 33E–33H show the spherical aberration, astigmatism, distortion, and lateral color, respectively, of the zoom optical of Embodiment 6-1 at the telephoto end. In FIGS. 33A and 33E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 33B and 33F, the astigmatism (in mm) is shown for both the sagittal image surface S and the tangential image surface T and is measured at 587.6 nm (the d-line). In FIGS. 33C and 33G, distortion (in percent) is measured at 587.6 nm (the d-line). In FIGS. 33D and 33H, the lateral color (in μm) is shown for the wavelengths 460 nm and 615 nm relative to 587.6 nm (the d-line).

As is evident from FIGS. 33A–33H, the zoom optical system of Embodiment 6-1 is a high performance zoom optical system capable of favorably correcting aberrations.

EMBODIMENT 6-2

FIG. 11 shows a cross-sectional view of the zoom optical system of Embodiment 6-2 at the wide-angle end. The zoom optical system of Embodiment 6-2 has a four lens group construction, and the fourth lens group G4 provides the vibration correction function. In particular, the fourth lens group G4 prevents blurring of an image at the image plane 1 that would otherwise occur due to vibration of the zoom optical system by moving, in a direction that intersects the optical axis, only the twelfth lens element L12 having positive refractive power in the fourth lens group G4.

The zoom optical system of Embodiment 6-2 is nearly the same as Embodiment 6-1 above, the only difference being that, unlike Embodiment 6-1, in this embodiment the tenth and eleventh lens elements, L10 and L11, do not move in a direction that intersects the optical axis for vibration correction but rather remain stationary on the optical axis, and only the twelfth lens element L12 moves for vibration correction.

However, the lens and other optical element data of Tables 16–18 above of Embodiment 6-1 also describe Embodiment 6-2. Accordingly, the various aberrations, including the spherical aberration, astigmatism, distortion, and lateral color, of Embodiment 6-2 at the wide-angle and telephoto ends are the same as those shown in FIGS. 33A–33H.

Additionally, therefore, the zoom optical system of Embodiment 6-2 satisfies Condition (1) with a value of $t_d/f_w$ equal to 1.23, the same value as Embodiment 6-1.

Furthermore, as is evident from FIGS. 33A–33H, the zoom optical system of Embodiment 6-2 is a high performance zoom optical system capable of favorably correcting aberrations.

The efficient operation of embodiments of the present invention described above that belong to the second group of embodiments of the present invention is explained below.

According to the zoom optical systems belonging to the second group of embodiments of the present invention, by moving the third lens group G3 along the optical axis during zooming, the position of the entrance pupil can be closer to the object side at the telephoto end and the outer diameter of the lens elements of the first lens group G1 can be smaller.

Furthermore, by the fourth lens group G4 being stationary at the extreme image side during zooming, the fear that movement of the extreme image side lens group might generate dust within the lens barrel at the image side of the fourth lens group G4 is reduced. For this reason, this arrangement is especially suitable for an imaging device using a solid-state image sensor such as a CCD or similar device.

Furthermore, by making the fourth lens group G4 to be a lens group having positive refractive power, the exit angles of light rays passing to the image plane 1 can be smaller. For this reason, this arrangement is especially suitable for an imaging device using a solid-state image sensor such as a CCD or similar device.

Moreover, by making the fourth lens group G4 of a pair of cemented lens elements and a separate single lens element, the axial chromatic aberration can be reduced, and also by having the Petzval sum of an appropriate value, the field curvature can be reduced. In this case, by making the separate single lens element to be an aspheric lens element, field curvature and disortion can be corrected much more favorably.

Furthermore, by preventing blurring of an image being recorded at the image plane 1, which normally accompanies vibration of the zoom optical system, by moving the cemented lens elements of the fourth lens group G4 in the direction to intersect the optical axis, as in Embodiment 6-1, the change of the optical performance of the zoom optical system at the time of vibration correction can be minimized.

Furthermore, by preventing blurring of an image being recorded at the image plane 1, which normally accompanies vibration of the zoom optical system, by moving only the separate single lens element of the fourth lens group G4 in the direction to intersect the optical axis, as in Embodiment 6-2, the weight of the lens elements that are moved in order to correct for vibration is reduced, thereby enabling the load on the vibration correction mechanism to be reduced.

A third group of embodiments of the zoom optical system of the present invention will be described in detail below.

EMBODIMENT 7-1

Figure 12:
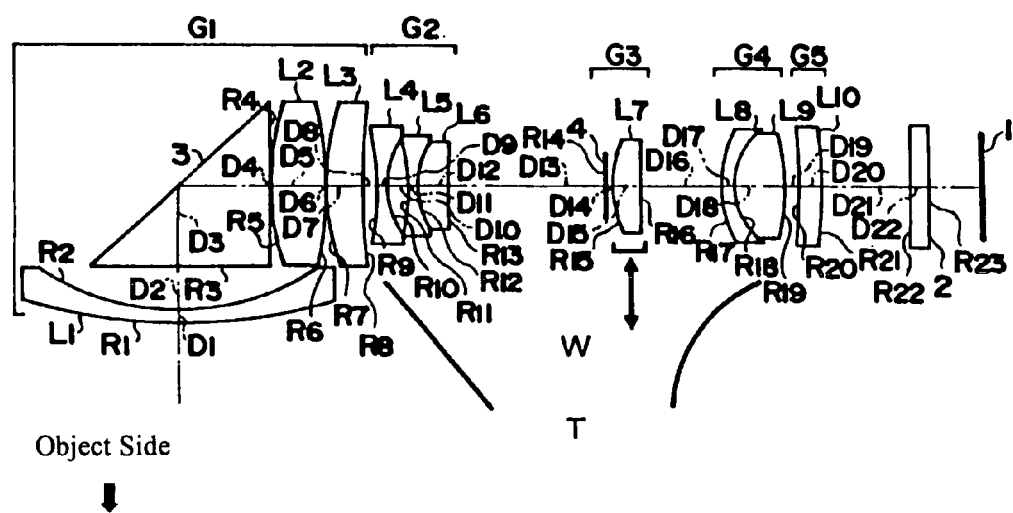
FIG. 12 shows a cross-sectional view of the zoom optical system of Embodiment 7-1 at the wide-angle end.

FIG. 12 shows the basic lens element configuration of the zoom optical system of Embodiment 7-1. The zoom optical system of Embodiment 7-1 has a five lens group construction, and the third lens group G3 provides the vibration correction function. In particular, the third lens group G3 includes the stop or diaphragm 4 and a lens element having positive refractive power (i.e., the seventh lens element L7) that prevents blurring of an image formed at the image plane 1 by movement of this lens element L7 in a direction that intersects the optical axis in order to correct for blurring of the image being recorded or viewed due to vibration of the zoom optical system.

As shown in FIG. 12, the first lens group G1 includes, arranged along the optical axis in order from the object side, a first lens element L1 having negative refractive power and a meniscus shape with its convex surface on the object side, a right-angle prism 3 that bends the optical axis, a biconvex second lens element L2, and a third lens element L3 having positive refractive power and a meniscus shape with its convex surface on the object side. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4 and a biconvex seventh lens element L7. The fourth lens group G4 includes, arranged along the optical axis in order from the object side, an eighth lens element L8 having negative refractive power and a meniscus shape with its convex surface on the object side and a biconvex ninth lens element L9. The fifth lens group G5 includes a tenth lens element L10 having positive refractive power and a meniscus shape with its convex surface on the image side.

In addition, the fifth lens element L5 and the sixth lens element L6 are cemented together at adjoining lens surfaces, as are also the eighth lens element L8 and the ninth lens element L9.

Also, in Embodiment 7-1, the filter unit 2 includes an infrared filter and/or similar structures, including a cover glass for a solid state image sensor, and is provided between the fifth lens group G5 and the image plane 1.

In the zoom optical system of Embodiment 7-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 in the third lens group G3 in a direction that intersects the optical axis.

Specific data regarding the zoom optical system of Embodiment 7-1 are shown below in Tables 19–21. These tables are equally descriptive of Embodiment 7-2 that will be described after Embodiment 7-1. Table 19 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 7-1, except that the on-axis surface spacings that vary with zooming are listed in Table 21 below. Listed in the bottom portion of Table 19 are the focal length f (in mm) and the f-number $F_{NO}$ at the wide-angle and telephoto ends, and the maximum field angle 2ω at the wide-angle end and the telephoto end for Embodiment 7-1.

TABLE 19

| # | R | D | $N_d$ | $v_d$ |
|---|---|---|---|---|
| 1 | 54.7183 | 0.85 | 1.92286 | 20.9 |
| 2 | 15.2505 | 2.50 | | |
| 3 | ∞ | 11.00 | 1.83481 | 42.7 |
| 4 | ∞ | 0.10 | | |
| 5 | 25.1630 | 3.01 | 1.80400 | 46.6 |
| 6 | −40.3452 | 0.10 | | |
| 7 | 19.6031 | 2.11 | 1.72916 | 54.7 |
| 8 | 38.1494 | $D_8$ (variable) | | |
| 9 | −30.4862 | 0.60 | 1.63930 | 44.9 |
| 10 | 6.2305 | 1.43 | | |
| 11 | −18.0172 | 0.61 | 1.51742 | 52.4 |
| 12 | 6.2876 | 1.84 | 1.84666 | 23.8 |
| 13 | 25.1430 | $D_{13}$ (variable) | | |
| 14 | ∞ (stop) | 0.50 | | |
| 15* | 8.3102 | 1.63 | 1.56865 | 58.6 |
| 16* | −168.3031 | $D_{16}$ (variable) | | |
| 17 | 8.7299 | 1.06 | 1.92286 | 18.9 |
| 18 | 5.0000 | 2.70 | 1.48749 | 70.2 |
| 19 | −58.7601 | $D_{19}$ (variable) | | |
| 20* | −247.8095 | 1.26 | 1.50842 | 56.4 |
| 21* | −40.2664 | 8.15 | | |
| 22 | ∞ | 1.00 | 1.51680 | 64.2 |
| 23 | ∞ | | | | f = 6.26–17.69   $F_{NO}$ = 3.60–3.84   2ω = 63.0°–22.4°

The lens surfaces with a * to the right of the surface number in Table 19 are aspheric lens surfaces, and the aspheric surface shapes of these lens surfaces are expressed by Equation (A) above.

Table 20 below lists the values of the constant K and the aspheric coefficients $A_4$, $A_6$, $A_8$, and $A_{10}$ in Equation (A) above for each of the aspheric lens surfaces of Table 19. Aspheric coefficients that are not present in Table 20 are zero. An "E" in the data indicates that the number following the "E" is the exponent to the base 10. For example, "1.0E-2" represents the number $1.0 \times 10^{-2}$.

TABLE 20

| # | K | $A_4$ | $A_6$ | $A_8$ | $A_{10}$ |
|---|---|---|---|---|---|
| 15 | 0.7249804 | −9.9714357E−6 | 2.6765148E−6 | 5.9938045E−7 | −5.4641067E−9 |
| 16 | 1.0006706 | 2.1814041E−4 | 5.9999762E−6 | 2.5575942E−7 | 1.1266030E−8 |
| 20 | 1.0673228 | −2.1556947E−4 | −8.0877758E−6 | −1.5269604E−7 | 8.8271590E−9 |
| 21 | 0.5526641 | 9.3219866E−5 | −1.5259534E−5 | 4.0228307E−7 | −2.0208746E−8 |

In the zoom optical system of Embodiment 7-1, lens groups G2 and G4 move to vary the on-axis surface spacings of various optical elements along the optical axis during zooming between the wide-angle end W and the telephoto end T of the zoom range. Therefore, the values of the on-axis surface spacings $D_8$, $D_{13}$, $D_{16}$, and $D_{19}$ vary. Table 21 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{16}$ between the lens surface of the extreme image side of the third lens group G3 and the lens surface of the object-most side of the fourth lens group G4, and the on-axis surface spacing $D_{19}$ between the lens surface of the extreme image side of the fourth lens group G4 and the object-most side surface of the fifth lens group G5, at the wide-angle end (focal length f equals 6.26 mm) and the telephoto end (focal length f equals 17.69 mm) in the zoom optical system of Embodiment 7-1 with the zoom optical system focused at infinity.

TABLE 21

| Focal Length f (mm) | $D_8$ | $D_{13}$ | $D_{16}$ | $D_{19}$ |
|---|---|---|---|---|
| 6.26 | 1.00 | 10.13 | 5.92 | 1.00 |
| 17.69 | 9.07 | 2.07 | 2.50 | 4.41 |

Additionally, the zoom optical system of Embodiment 7-1 satisfies Condition (1) with a value of $t_d/f_w$ equal to 1.37.

FIGS. 34A–34D show the spherical aberration, astigmatism, distortion, and lateral color, respectively, of the zoom optical system of Embodiment 7-1 at the wide-angle end, and FIGS. 34E–34H show the spherical aberration, astigmatism, distortion, and lateral color, respectively, of the zoom optical system of Embodiment 7-1 at the telephoto end. In FIGS. 34A and 34E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 34B and 34F, the astigmatism (in mm) is shown for both the sagittal image surface S and the tangential image surface T and is measured at 587.6 nm (the d-line). In FIGS. 34C and 34G, distortion (in percent) is measured at 587.6 nm (the d-line). In FIGS. 34D and 34H, the lateral color (in μm) is shown for the wavelengths 460 nm and 615 nm relative to 587.6 nm (the d-line).

As is evident from FIGS. 34A–34H, the zoom optical system of Embodiment 7-1 is a high performance zoom optical system capable of favorably correcting aberrations.

EMBODIMENT 8-1

Figure 13:
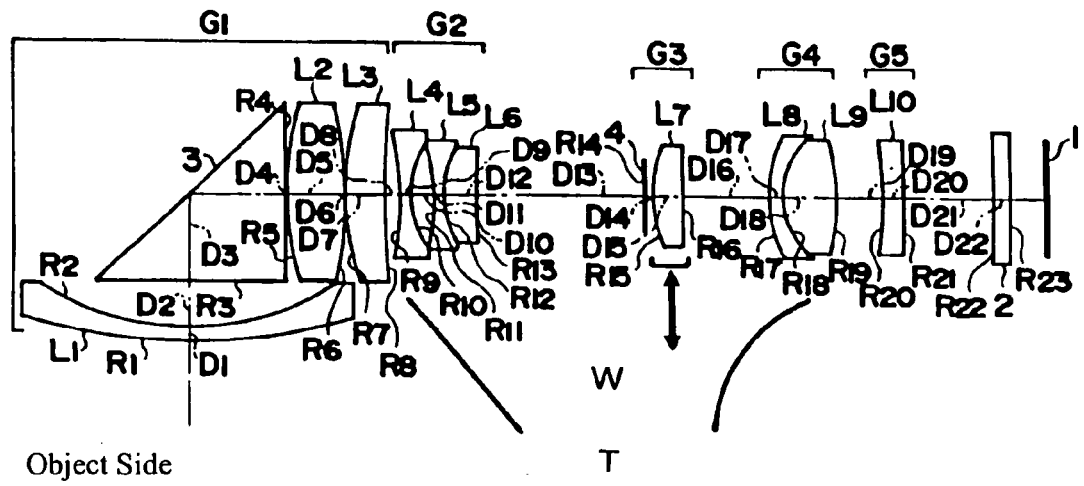
FIG. 13 shows a cross-sectional view of the zoom optical system of Embodiment 8-1 at the wide-angle end.

FIG. 13 shows the basic lens element configuration of the zoom optical system of Embodiment 8-1. The zoom optical system of Embodiment 8-1 has a five lens group construction, and the third lens group G3 provides the vibration correction function. In particular, the third lens group G3 includes the stop or diaphragm 4 and a lens element having positive refractive power (i.e., the seventh lens element L7) that prevents blurring of an image formed at the image plane 1 by movement of this lens element L7 in a direction that intersects the optical axis in order to correct for blurring of the image being recorded or viewed due to vibration of the zoom optical system.

As shown in FIG. 13, the first lens group G1 includes, arranged along the optical axis in order from the object side, a first lens element L1 having negative refractive power and a meniscus shape with its convex surface on the object side, a right-angle prism 3 that bends the optical axis, a biconvex second lens element L2, and a third lens element L3 having positive refractive power and a meniscus shape with its convex surface on the object side. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4 and a biconvex seventh lens element L7. The fourth lens group G4 includes, arranged along the optical axis in order from the object side, an eighth lens element L8 having negative refractive power and a meniscus shape with its convex surface on the object side and a biconvex ninth lens element L9. The fifth lens group G5 includes a biconcave tenth lens element L10.

In addition, the fifth lens element L5 and the sixth lens element L6 are cemented together at adjoining lens surfaces, as are also the eighth lens element L8 and the ninth lens element L9.

Also, in Embodiment 8-1, the filter unit 2 includes an infrared filter and/or similar structures, including a cover glass for a solid state image sensor, and is provided between the fifth lens group G5 and the image plane 1.

In the zoom optical system of Embodiment 8-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 in the third lens group G3 in a direction that intersects the optical axis.

Specific data regarding the zoom optical system of Embodiment 8-1 are shown below in Tables 22–24. These tables are equally descriptive of Embodiment 8-2 that will be described after Embodiment 8-1. Table 22 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 8-1, except that the on-axis surface spacings that vary with zooming are listed in Table 24 below. Listed in the bottom portion of Table 22 are the focal length f (in mm) and the f-number $F_{NO}$ at the wide-angle and telephoto ends, and the maximum field angle 2ω at the wide-angle end and the telephoto end for Embodiment 8-1.

TABLE 22

| # | R | D | $N_d$ | $v_d$ |
|---|---|---|---|---|
| 1 | 43.1355 | 0.85 | 1.92286 | 20.9 |
| 2 | 15.0000 | 2.57 | | |
| 3 | ∞ | 11.00 | 1.83481 | 42.7 |
| 4 | ∞ | 0.10 | | |
| 5 | 24.6808 | 3.00 | 1.75500 | 52.3 |
| 6 | −41.3945 | 0.10 | | |
| 7 | 21.9558 | 2.16 | 1.72916 | 54.7 |
| 8 | 63.5755 | $D_8$(variable) | | |

TABLE 22-continued

| # | R | D | $N_d$ | $v_d$ |
|---|---|---|---|---|
| 9 | −27.8884 | 0.60 | 1.81600 | 46.6 |
| 10 | 7.0788 | 1.26 | | |
| 11 | −18.0172 | 0.61 | 1.48749 | 70.2 |
| 12 | 7.2293 | 1.78 | 1.84666 | 23.8 |
| 13 | 36.1327 | $D_{13}$(variable) | | |
| 14 | ∞ (stop) | 0.50 | | |
| 15* | 7.6985 | 1.81 | 1.50842 | 56.4 |
| 16* | −41.4842 | $D_{16}$(variable) | | |
| 17 | 8.9680 | 0.79 | 1.92286 | 18.9 |
| 18 | 5.1300 | 2.73 | 1.48749 | 70.2 |
| 19 | −18.6249 | $D_{19}$(variable) | | |
| 20* | −29.4777 | 1.10 | 1.56865 | 58.6 |
| 21* | 133.6135 | 7.40 | | |
| 22 | ∞ | 1.00 | 1.51680 | 64.2 |
| 23 | ∞ | | | |
| f = 6.33–17.89 | | $F_{NO}$ = 3.59–3.76 | 2ω = 62.4°–22.0° | |

The lens surfaces with a * to the right of the surface number in Table 22 are aspheric lens surfaces, and the aspheric surface shapes of these lens surfaces are expressed by Equation (A) above.

Table 23 below lists the values of the constant K and the aspheric coefficients $A_4$, $A_6$, $A_8$, and $A_{10}$ in Equation (A) above for each of the aspheric lens surfaces of Table 22. Aspheric coefficients that are not present in Table 23 are zero. An "E" in the data indicates that the number following the "E" is the exponent to the base 10. For example, "1.0E-2" represents the number $1.0 \times 10^{-2}$.

TABLE 23

| # | K | $A_4$ | $A_6$ | $A_8$ | $A_{10}$ |
|---|---|---|---|---|---|
| 15 | 0.7056540 | −3.0695788E−5 | 2.3647524E−6 | 6.0199312E−7 | −5.4910520E−9 |
| 16 | 1.0007030 | 2.8737843E−4 | 6.7846710E−6 | 2.5669079E−7 | 1.1245649E−8 |
| 20 | 1.0674416 | −3.1175357E−4 | −8.5756296E−6 | −1.4590651E−7 | 8.3095512E−9 |
| 21 | 0.5526900 | 1.5628491E−4 | −1.4461873E−5 | 4.4540426E−7 | −2.0065553E−8 |

In the zoom optical system of Embodiment 8-1, lens groups G2 and G4 move to vary the on-axis surface spacings of various optical elements along the optical axis during zooming between the wide-angle end W and the telephoto end T of the zoom range. Therefore, the values of the on-axis surface spacingss $D_8$, $D_{13}$, $D_{16}$, and $D_{19}$ vary. Table 24 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{16}$ between the lens surface of the extreme image side of the third lens group G3 and the lens surface of the object-most side of the fourth lens group G4, and the on-axis surface spacing $D_{19}$ between the lens surface of the extreme image side of the fourth lens group G4 and the object-most side surface of the fifth lens group G5, at the wide-angle end (focal length f equals 6.33 mm) and the telephoto end (focal length f equals 17.89 mm) in the zoom optical system of Embodiment 8-1 with the zoom optical system focused at infinity.

TABLE 24

| Focal Length f (mm) | $D_8$ | $D_{13}$ | $D_{16}$ | $D_{19}$ |
|---|---|---|---|---|
| 6.33 | 1.00 | 9.94 | 4.57 | 2.13 |
| 17.89 | 8.87 | 2.07 | 2.28 | 4.42 |

Additionally, the zoom optical system of Embodiment 8-1 satisfies Condition (1) with a value of $t_d/f_w$ equal to 1.37.

FIGS. 35A–35D show the spherical aberration, astigmatism, distortion, and lateral color, respectively, of the zoom optical system of Embodiment 8-1 at the wide-angle end, and FIGS. 35E–35H show the spherical aberration, astigmatism, distortion, and lateral color, respectively, of the zoom optical system of Embodiment 8-1 at the telephoto end. In FIGS. 35A and 35E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 35B and 35F, the astigmatism (in mm) is shown for both the sagittal image surface S and the tangential image surface T and is measured at 587.6 nm (the d-line). In FIGS. 35C and 35G, distortion (in percent) is measured at 587.6 nm (the d-line). In FIGS. 35D and 35H, the lateral color (in um) is shown for the wavelengths 460 nm and 615 nm relative to 587.6 nm (the d-line).

As is evident from FIGS. 35A–35H, the zoom optical system of Embodiment 8-1 is a high performance zoom optical system capable of favorably correcting aberrations.

EMBODIMENT 9-1

Figure 14:
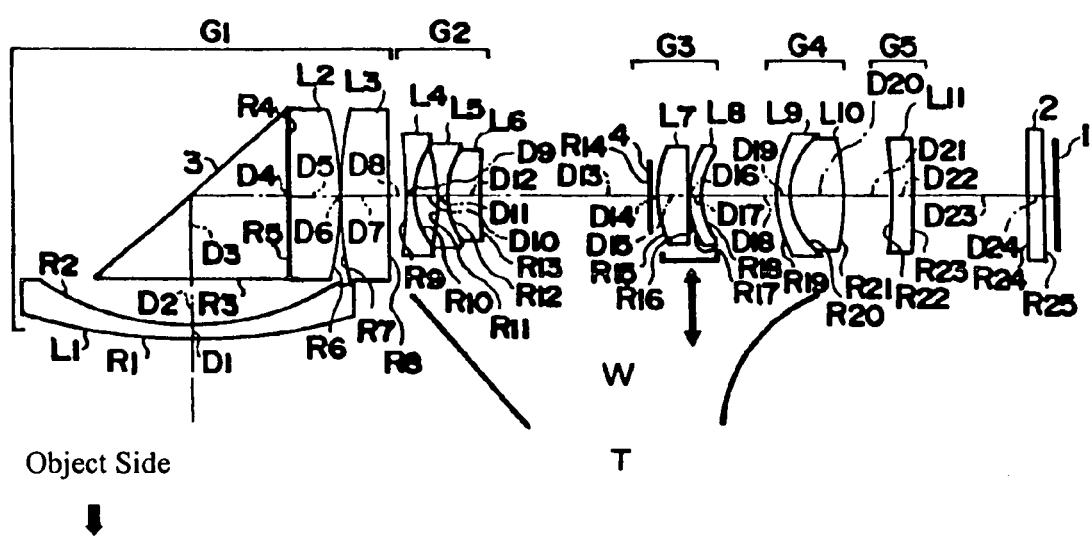
FIG. 14 shows a cross-sectional view of the zoom optical system of Embodiment 9-1 at the wide-angle end.

FIG. 14 shows the basic lens element configuration of the zoom optical system of Embodiment 9-1. The zoom optical system of Embodiment 9-1 has a five lens group construction, and the third lens group G3 provides the vibration correction function. In particular, the third lens group G3 includes a lens element having positive refractive power (i.e., the seventh lens element L7) and a lens element having negative refractive power (i.e., the eighth lens element L8) that prevent blurring of an image formed at the image plane 1 by movement of these lens elements L7 and L8 in a direction that intersects the optical axis in order to correct for blurring of the image being recorded or viewed due to vibration of the zoom optical system.

As shown in FIG. 14, the first lens group G1 includes, arranged along the optical axis in order from the object side, a first lens element L1 having negative refractive power and a meniscus shape with its convex surface on the object side, a right-angle prism 3 that bends the optical axis, a plano-convex second lens element L2, and a third lens element L3 having positive refractive power and a meniscus shape with its convex surface on the object side. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4, a biconvex seventh lens element L7, and an eighth lens element L8 having negative refractive power and a meniscus shape with its convex surface on the object side. The fourth lens group G4 includes, arranged along the optical axis in order from the object side, a ninth lens element L9 having negative refractive power and a meniscus shape with its convex surface on the object side, and a tenth lens element L10 having positive refractive power and a meniscus shape with its convex surface on the object side. The fifth lens group G5 includes an eleventh lens element L11 having positive refractive power and a meniscus shape with its convex surface on the image side.

In addition, the fifth lens element L5 and the sixth lens element L6 are cemented together at adjoining lens surfaces, as are also the ninth lens element L9 and the tenth lens element L10.

Also, in Embodiment 9-1, the filter unit 2 includes an infrared filter and/or similar structures, including a cover glass for a solid state image sensor, and is provided between the fifth lens group G5 and the image plane 1.

In the zoom optical system of Embodiment 9-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 and the eighth lens element L8 that are in the third lens group G3 in a direction that intersects the optical axis.

Specific data regarding the zoom optical system of Embodiment 9-1 are shown below in Tables 25–27. These tables are equally descriptive of Embodiments 9-2 and 9-3 that will be described after Embodiment 9-1. Table 25 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 9-1, except that the on-axis surface spacings that vary with zooming are listed in Table 27 below. Listed in the bottom portion of Table 25 are the focal length f (in mm) and the f-number $F_{NO}$ at the wide-angle and telephoto ends, and the maximum field angle $2\omega$ at the wide-angle end and the telephoto end for Embodiment 9-1.

TABLE 25

| # | R | D | $N_d$ | $v_d$ |
|---|---|---|---|---|
| 1 | 92.5280 | 0.85 | 1.92286 | 20.9 |
| 2 | 19.5718 | 2.06 | | |
| 3 | ∞ | 11.00 | 1.83481 | 42.7 |
| 4 | ∞ | 0.10 | | |
| 5 | ∞ | 2.50 | 1.72916 | 54.7 |
| 6 | −30.0618 | 0.10 | | |
| 7 | 16.0448 | 2.57 | 1.72916 | 54.7 |
| 8 | 9606.2976 | $D_8$(variable) | | |
| 9 | −26.5556 | 0.60 | 1.63930 | 44.9 |
| 10 | 6.0137 | 1.40 | | |
| 11 | −18.0172 | 0.61 | 1.51742 | 52.4 |
| 12 | 6.1246 | 1.85 | 1.84666 | 23.8 |
| 13 | 26.0678 | $D_{13}$(variable) | | |
| 14 | ∞ (stop) | 0.50 | | |
| 15* | 6.3267 | 1.88 | 1.56865 | 58.6 |
| 16* | −28.5865 | 0.30 | | |
| 17 | 7.7735 | 0.60 | 1.84666 | 23.8 |
| 18 | 5.5358 | $D_{18}$(variable) | | |
| 19 | 8.0155 | 0.90 | 1.92286 | 18.9 |
| 20 | 5.0000 | 2.57 | 1.48749 | 70.2 |
| 21 | 206.8109 | $D_{21}$(variable) | | |
| 22* | −1669.2970 | 1.24 | 1.50842 | 56.4 |
| 23* | −48.5474 | 4.96 | | |
| 24 | ∞ | 1.00 | 1.51680 | 64.2 |
| 25 | ∞ | | | | f = 6.35–17.94    $F_{NO}$ = 3.60–3.79    $2\omega$ = 62.2°–21.6°

The lens surfaces with a * to the right of the surface number in Table 25 are aspheric lens surfaces, and the aspheric surface shapes of these lens surfaces are expressed by Equation (A) above.

Table 26 below lists the values of the constant K and the aspheric coefficients $A_4$, $A_6$, $A_8$, and $A_{10}$ in Equation (A) above for each of the aspheric lens surfaces of Table 25. Aspheric coefficients that are not present in Table 26 are zero. An "E" in the data indicates that the number following the "E" is the exponent to the base 10. For example, "1.0E-2" represents the number $1.0 \times 10^{-2}$.

TABLE 26

| # | K | $A_4$ | $A_6$ | $A_8$ | $A_{10}$ |
|---|---|---|---|---|---|
| 15 | 0.5702045 | −2.3539724E-4 | 1.6903292E-6 | 6.1118535E-7 | −5.2310178E-9 |
| 16 | 1.0011593 | 1.5094537E-4 | 6.8862656E-6 | 2.6514713E-7 | 1.0489364E-8 |
| 22 | 1.0661117 | −1.6216354E-5 | −1.0893213E-5 | −3.9669340E-7 | 9.9528493E-9 |
| 23 | 0.5538949 | 5.6572346E-4 | −2.4120213E-5 | 3.5330598E-7 | −1.9060788E-8 |

In the zoom optical system of Embodiment 9-1, lens groups G2 and G4 move to vary the on-axis surface spacings of various optical elements along the optical axis during zooming between the wide-angle end W and the telephoto end T of the zoom range. Therefore, the values of the on-axis surface spacings $D_8$, $D_{13}$, $D_{18}$, and $D_{21}$ vary. Table 27 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{18}$ between the lens surface of the extreme image side of the third lens group G3 and the lens surface of the object-most side of the fourth lens group G4, and the on-axis surface spacing $D_{21}$ between the lens surface of the extreme image side of the fourth lens group G4 and the object-most side surface of the fifth lens group G5, at the wide-angle end (focal length f equals 6.35 mm) and the telephoto end (focal length f equals 17.94 mm) in the zoom optical system of Embodiment 9-1 with the zoom optical system focused at infinity.

TABLE 27

| Focal Length f (mm) | $D_8$ | $D_{13}$ | $D_{18}$ | $D_{21}$ |
|---|---|---|---|---|
| 6.35 | 1.00 | 10.00 | 5.31 | 2.63 |
| 17.94 | 8.82 | 2.18 | 2.53 | 5.41 |

Additionally, the zoom optical system of Embodiment 9-1 satisfies Condition (1) with a value of $t_d/f_w$ equal to 1.28.

FIGS. 36A–36D show the spherical aberration, astigmatism, distortion, and lateral color, respectively, of the zoom optical system of Embodiment 9-1 at the wide-angle end, and FIGS. 36E–36H show the spherical aberration, astigmatism, distortion, and lateral color, respectively, of the zoom optical system of Embodiment 9-1 at the telephoto end. In FIGS. 36A and 36E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 36B and 36F, the astigmatism (in mm) is shown for both the sagittal image surface S and the tangential image surface T and is measured at 587.6 nm (the d-line). In FIGS. 36C and 36G, distortion (in percent) is measured at 587.6 nm (the d-line). In FIGS. 36D and 36H, the lateral color (in μm) is shown for the wavelengths 460 nm and 615 nm relative to 587.6 nm (the d-line).

As is evident from FIGS. 36A–36H, the zoom optical system of Embodiment 9-1 is a high performance zoom optical system capable of favorably correcting aberrations.

EMBODIMENT 9-2

Figure 15:
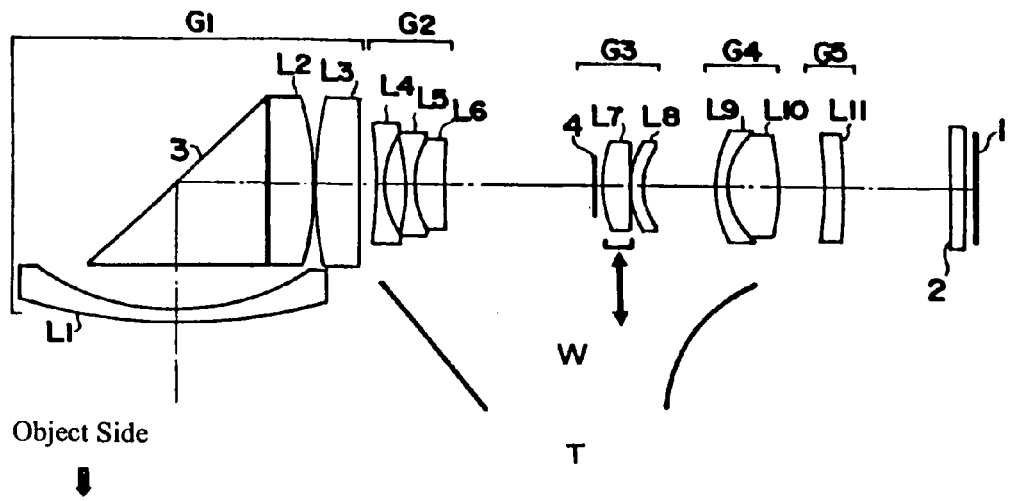
FIG. 15 shows a cross-sectional view of the zoom optical system of Embodiment 9-2 at the wide-angle end.

FIG. 15 shows a cross-sectional view of the zoom optical system of Embodiment 9-2 at the wide-angle end. The zoom optical system of Embodiment 9-2 has a five lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the seventh lens element L7 having positive refractive power in the third lens group G3.

The zoom optical system of Embodiment 9-2 is nearly the same as Embodiment 9-1 above, the only difference being that, unlike Embodiment 9-1, in this embodiment the eighth lens element L8 does not move in a direction that intersects the optical axis for vibration correction but rather remains stationary on the optical axis and only the seventh lens element L7 moves for vibration correction.

However, the lens and other optical element data of Tables 25–27 above of Embodiment 9-1 also describe Embodiment 9-2. Accordingly, the various aberrations, including the spherical aberration, astigmatism, distortion, and lateral color, of Embodiment 9-2 at the wide-angle and telephoto ends are the same as those shown in FIGS. 36A–36H.

Additionally, therefore, the zoom optical system of Embodiment 9-2 satisfies Condition (1) with a value of $t_d/f_w$ equal to 1.28, the same value as Embodiment 9-1.

Furthermore, as is evident from FIGS. 36A–36H, the zoom optical system of Embodiment 9-2 is a high performance zoom optical system capable of favorably correcting aberrations.

EMBODIMENT 9-3

Figure 16:
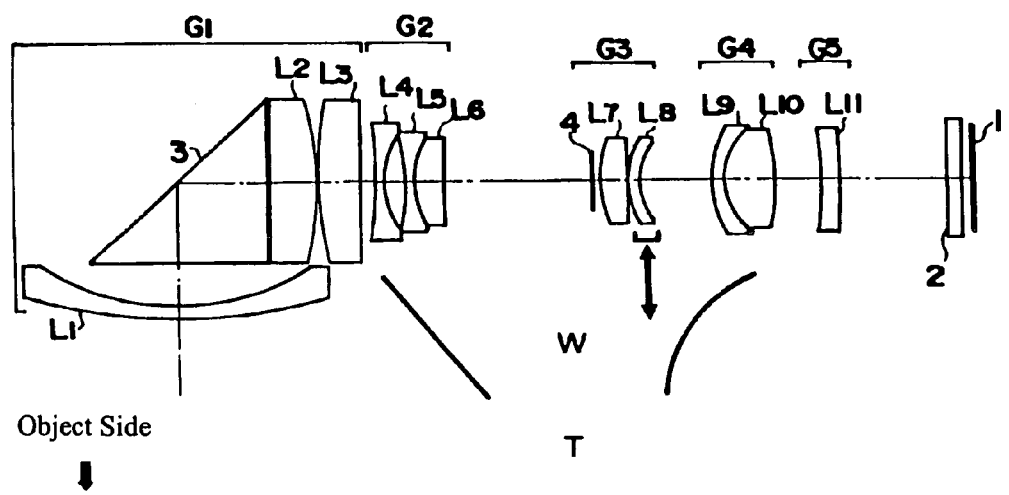
FIG. 16 shows a cross-sectional view of the zoom optical system of Embodiment 9-3 at the wide-angle end.

FIG. 16 shows a cross-sectional view of the zoom optical system of Embodiment 9-3 at the wide-angle end. The zoom optical system of Embodiment 9-3 has a five lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the eighth lens element L8 having negative refractive power in the third lens group G3.

The zoom optical system of Embodiment 9-3 is nearly the same as Embodiment 9-1 above, the only difference being that, unlike Embodiment 9-1, in this embodiment the seventh lens element L7 does not move in a direction that intersects the optical axis for vibration correction but rather remains stationary on the optical axis. That is, only the eighth lens element L8 moves for vibration correction.

However, the lens and other optical element data of Tables 25–27 above of Embodiment 9-1 also describe Embodiment 9-3. Accordingly, the various aberrations, including the spherical aberration, astigmatism, distortion, and lateral color, of Embodiment 9-3 at the wide-angle and telephoto ends are the same as those shown in FIGS. 36A–36H.

Additionally, therefore, the zoom optical system of Embodiment 9-3 satisfies Condition (1) with a value of $t_d/f_w$ equal to 1.28, the same value as Embodiment 9-1.

Furthermore, as is evident from FIGS. 36A–36H, the zoom optical system of Embodiment 9-3 is a high performance zoom optical system capable of favorably correcting aberrations.

EMBODIMENT 10-1

Figure 17:
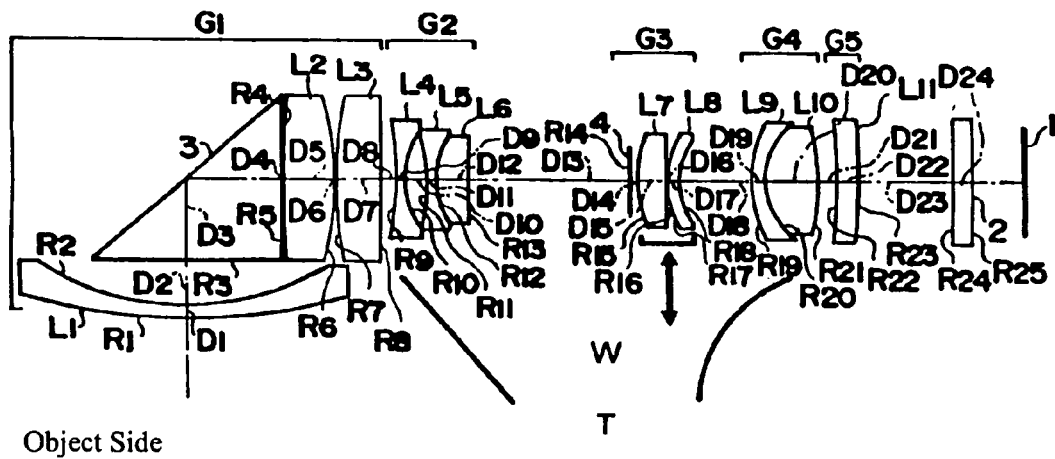
FIG. 17 shows a cross-sectional view of the zoom optical system of Embodiment 10-1 at the wide-angle end.

FIG. 17 shows the basic lens element configuration of the zoom optical system of Embodiment 10-1. The zoom optical system of Embodiment 10-1 has a five lens group construction, and the third lens group G3 provides the vibration correction function. In particular, the third lens group G3 includes a lens element having positive refractive power (i.e., the seventh lens element L7) and a lens element having negative refractive power (i.e., the eighth lens element L8) that prevent blurring of an image formed at the image plane 1 by movement of these lens elements L7 and L8 in a direction that intersects the optical axis in order to correct for blurring of the image being recorded or viewed due to vibration of the zoom optical system.

As shown in FIG. 17, the first lens group G1 includes, arranged along the optical axis in order from the object side, a first lens element L1 having negative refractive power and a meniscus shape with its convex surface on the object side, a right-angle prism 3 that bends the optical axis, a biconvex second lens element L2, and a biconvex third lens element L3. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side.

The third lens group G3 includes, arranged along the optical axis in order from the object side, a stop or diaphragm 4, a biconvex seventh lens element L7, and an eighth lens element L8 having negative refractive power and a meniscus shape with its convex surface on the object side. The fourth lens group G4 includes, arranged along the optical axis in order from the object side, a ninth lens element L9 having negative refractive power and a meniscus shape with its convex surface on the object side, and a biconvex tenth lens element L10. The fifth lens group G5 includes a biconcave eleventh lens element L11.

In addition, the fifth lens element L5 and the sixth lens element L6 are cemented together at adjoining lens surfaces, as are also the ninth lens element L9 and the tenth lens element L10.

Also, in Embodiment 10-1, the filter unit 2 includes an infrared filter and/or similar structures, including a cover glass for a solid state image sensor, and is provided between the fifth lens group G5 and the image plane 1.

In the zoom optical system of Embodiment 10-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the seventh lens element L7 and the eighth lens element L8 that are in the third lens group G3 in a direction that intersects the optical axis.

Specific data regarding the zoom optical system of Embodiment 10-1 are shown below in Tables 28–30. These tables are equally descriptive of Embodiments 10-2 and 10-3 that will be described after Embodiment 10-1. Table 28 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 10-1, except that the on-axis surface spacings that vary with zooming are listed in Table 30 below. Listed in the bottom portion of Table 28 are the focal length f (in mm) and the f-number $F_{NO}$ at the wide-angle and telephoto ends, and the maximum field angle $2\omega$ at the wide-angle end and the telephoto end for Embodiment 10-1.

TABLE 28

| # | R | D | $N_d$ | $v_d$ |
|---|---|---|---|---|
| 1 | 58.4629 | 0.85 | 1.92286 | 20.9 |
| 2 | 17.2696 | 2.18 | | |
| 3 | ∞ | 10.70 | 1.83481 | 42.7 |
| 4 | ∞ | 0.10 | | |
| 5 | 45.7996 | 2.50 | 1.72916 | 54.7 |
| 6 | −46.5770 | 0.10 | | |

TABLE 28-continued

| # | R | D | $N_d$ | $v_d$ |
|---|---|---|---|---|
| 7 | 19.3917 | 2.43 | 1.71300 | 53.9 |
| 8 | −190.7457 | $D_8$(variable) | | |
| 9 | −31.3548 | 0.60 | 1.88300 | 40.8 |
| 10 | 6.8280 | 1.24 | | |
| 11 | −18.0172 | 0.61 | 1.51680 | 64.2 |
| 12 | 6.8686 | 1.79 | 1.84666 | 23.8 |
| 13 | 52.3656 | $D_{13}$(variable) | | |
| 14 | ∞ (stop) | 0.50 | | |
| 15* | 6.1596 | 2.00 | 1.50842 | 56.4 |
| 16* | −34.2194 | 0.30 | | |
| 17 | 6.5854 | 0.60 | 1.84666 | 23.8 |
| 18 | 5.2626 | $D_{18}$(variable) | | |
| 19 | 8.0016 | 0.60 | 1.92286 | 18.9 |
| 20 | 5.0000 | 2.86 | 1.48749 | 70.2 |
| 21 | −16.8251 | $D_{21}$(variable) | | |
| 22* | −19.3552 | 1.00 | 1.56865 | 58.6 |
| 23* | 453.8390 | 7.30 | | |
| 24 | ∞ | 1.00 | 1.51680 | 64.2 |
| 25 | ∞ | | | | f = 6.33–17.90    $F_{NO}$ = 3.60–3.78    $2\omega$ = 62.4°–21.8°

The lens surfaces with a * to the right of the surface number in Table 28 are aspheric lens surfaces, and the aspheric surface shapes of these lens surfaces are expressed by Equation (A) above.

Table 29 below lists the values of the constant K and the aspheric coefficients $A_4$, $A_6$, $A_8$, and $A_{10}$ in Equation (A) above for each of the aspheric lens surfaces of Table 28. Aspheric coefficients that are not present in Table 29 are zero. An "E" in the data indicates that the number following the "E" is the exponent to the base 10. For example, "1.0E-2" represents the number $1.0 \times 10^{-2}$.

TABLE 29

| # | K | $A_4$ | $A_6$ | $A_8$ | $A_{10}$ |
|---|---|---|---|---|---|
| 15 | 0.6453037 | −1.8134249E-4 | 1.4711254E-6 | 6.1446559E-7 | −5.1167734E-9 |
| 16 | 1.0003611 | 2.6156853E-4 | 7.4965288E-6 | 2.6789629E-7 | 1.0390609E-8 |
| 22 | 1.0686725 | −1.5820284E-4 | −1.3808440E-5 | −1.4693717E-7 | 9.5170373E-9 |
| 23 | 0.5560816 | 2.5826125E-4 | −2.2682530E-5 | 4.5503889E-7 | −1.7622664E-8 |

In the zoom optical system of Embodiment 10-1, lens groups G2 and G4 move to vary the on-axis surface spacings of various optical elements along the optical axis during zooming between the wide-angle end W and the telephoto end T of the zoom range. Therefore, the values of the on-axis surface spacings $D_8$, $D_{13}$, $D_{18}$ and $D_{21}$ vary. Table 30 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{18}$ between the lens surface of the extreme image side of the third lens group G3 and the lens surface of the object-most side of the fourth lens group G4, and the on-axis surface spacing $D_{21}$ between the lens surface of the extreme image side of the fourth lens group G4 and the object-most side surface of the fifth lens group G5, at the wide-angle end (focal length f equals 6.33 mm) and the telephoto end (focal length f equals 17.90 mm) in the zoom optical system of Embodiment 10-1 with the zoom optical system focused at infinity.

TABLE 30

| Focal Length f (mm) | $D_8$ | $D_{13}$ | $D_{18}$ | $D_{21}$ |
|---|---|---|---|---|
| 6.33 | 1.00 | 9.69 | 4.58 | 1.48 |
| 17.90 | 8.62 | 2.07 | 2.24 | 3.82 |

Additionally, the zoom optical system of Embodiment 10-1 satisfies Condition (1) with a value of $t_d/f_w$ equal to 1.28.

FIGS. 37A–37D show the spherical aberration, astigmatism, distortion, and lateral color, respectively, of the zoom optical system of Embodiment 10-1 at the wide-angle end, and FIGS. 37E–37H show the spherical aberration, astigmatism, distortion, and lateral color, respectively, of the zoom optical system of Embodiment 10-1 at the telephoto end. In FIGS. 37A and 37E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 37B and 37F, the astigmatism (in mm) is shown for both the sagittal image surface S and the tangential image surface T and is measured at 587.6 nm (the d-line). In FIGS. 37C and 37G, distortion (in percent) is measured at 587.6 nm (the d-line). In FIGS. 37D and 37H, the lateral color (in μm) is shown for the wavelengths 460 nm and 615 nm relative to 587.6 nm (the d-line).

As is evident from FIGS. 37A–37H, the zoom optical system of Embodiment 10-1 is a high performance zoom optical system capable of favorably correcting aberrations.

EMBODIMENT 10-2

Figure 18:
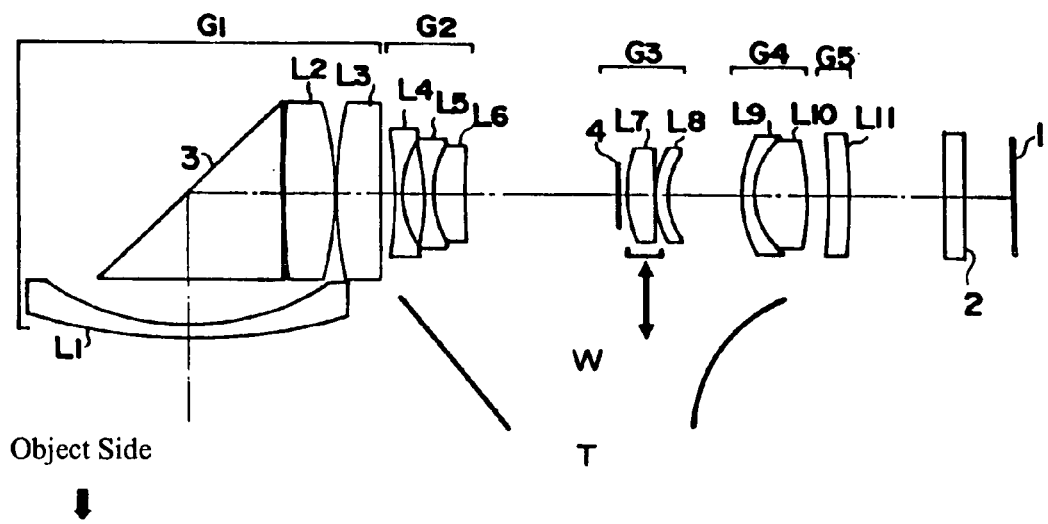
FIG. 18 shows a cross-sectional view of the zoom optical system of Embodiment 10-2 at the wide-angle end.

FIG. 18 shows a cross-sectional view of the zoom optical system of Embodiment 10-2 at the wide-angle end. The zoom optical system of Embodiment 10-2 has a five lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the seventh lens element L7 having positive refractive power in the third lens group G3.

The zoom optical system of Embodiment 10-2 is nearly the same as Embodiment 10-1 above, the only difference being that unlike Embodiment 10-1 the eighth lens element L8 does not move in a direction that intersects the optical axis for vibration correction but rather remains stationary on the optical axis and only the seventh lens element L7 moves for vibration correction.

However, the lens and other optical element data of Tables 28–30 above of Embodiment 10-1 also describe Embodiment 10-2. Accordingly, the various aberrations, including the spherical aberration, astigmatism, distortion, and lateral color, of Embodiment 10-2 at the wide-angle and telephoto ends are the same as those shown in FIGS. 37A–37H.

Additionally, therefore, the zoom optical system of Embodiment 10-2 satisfies Condition (1) with a value of $t_d/f_w$ equal to 1.28, the same value as Embodiment 10-1.

Furthermore, as is evident from FIGS. 37A–37H, the zoom optical system of Embodiment 10-2 is a high performance zoom optical system capable of favorably correcting aberrations.

EMBODIMENT 10-3

Figure 19:
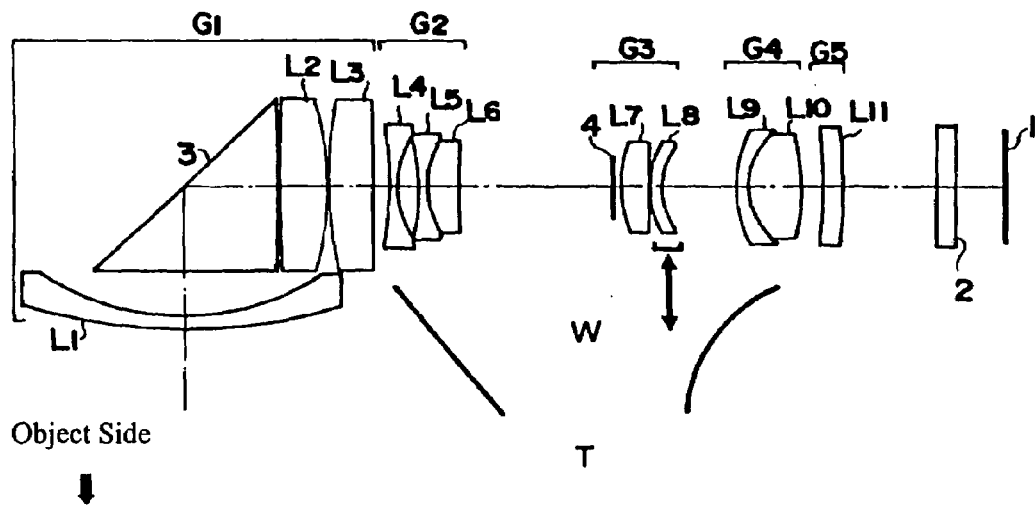
FIG. 19 shows a cross-sectional view of the zoom optical system of Embodiment 10-3 at the wide-angle end.

FIG. 19 shows a cross-sectional view of the zoom optical system of Embodiment 10-3 at the wide-angle end. The zoom optical system of Embodiment 10-3 has a five lens group construction, and the third lens group G3 provides the vibration correction function. In particular, the third lens group G3 prevents blurring of an image at the image plane 1 that would otherwise occur due to vibration of the zoom optical system by moving, in a direction that intersects the optical axis, only the eighth lens element L8 having negative refractive power in the third lens group G3.

The zoom optical system of Embodiment 10-3 is nearly the same as Embodiment 10-1 above, the only difference being that, unlike Embodiment 10-1, in this embodiment the seventh lens element L7 does not move in a direction that intersects the optical axis for vibration correction but rather remains stationary on the optical axis. That is, only the eighth lens element L8 moves for vibration correction.

However, the lens and other optical element data of Tables 28–30 above of Embodiment 10-1 also describe Embodiment 10-3. Accordingly, the various aberrations, including the spherical aberration, astigmatism, distortion, and lateral color, of Embodiment 10-3 at the wide-angle and telephoto ends are the same as those shown in FIGS. 37A–37H.

Additionally, therefore, the zoom optical system of Embodiment 10-3 satisfies Condition (1) with a value of $t_d/f_w$ equal to 1.28, the same value as Embodiment 10-1.

Furthermore, as is evident from FIGS. 37A–37H, the zoom optical system of Embodiment 10-3 is a high performance zoom optical system capable of favorably correcting aberrations.

The efficient operation of embodiments of the present invention described above that belong to the third group of embodiments of the present invention is explained below.

According to zoom optical systems belonging to the third group of embodiments of the present invention, by the fifth lens group G5 being stationary at the extreme image side during zooming, the lens group at the extreme image side is not moved during zooming, and thus the fear that movement of the extreme image side lens group might generate dust within the lens barrel at the image side of the fifth lens group G5 is reduced. For this reason, this arrangement is especially suitable for an imaging device using a solid state image sensor such as a CCD or similar device.

Furthermore, by the fifth lens group G5 being a lens group having positive refractive power, the exit angles of light rays passing to the image plane 1 can be smaller. For this reason also, this arrangement is especially suitable for an imaging device using a solid state image sensor such as a CCD or similar device.

Additionally, by the fifth lens group G5 being a single lens element, the zoom optical system may be miniaturized.

Moreover, because the third lens group G3 that prevents vibration by moving in a direction to intersect the optical axis is provided in the vicinity of the stop or diaphragm 4, in fact the stop or diaphragm 4 is included in the third lens group G3, the outer diameter of the lens elements of the third lens group G3 can be reduced and the lens barrel can be made smaller.

A fourth group of embodiments of the zoom optical system of the present invention will be described in detail below.

EMBODIMENT 7-2

Figure 20:
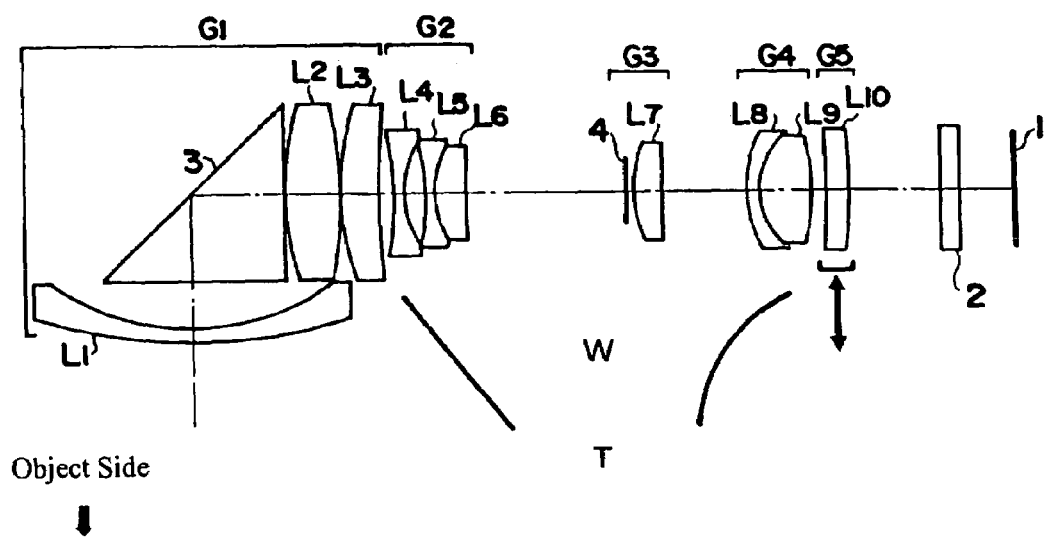
FIG. 20 shows a cross-sectional view of the zoom optical system of Embodiment 7-2 at the wide-angle end.

FIG. 20 shows a cross-sectional view of the zoom optical system of Embodiment 7-2 at the wide-angle end. The zoom optical system of Embodiment 7-2 has a five lens group construction, and the fifth lens group G5 that includes a single tenth lens element L10 having positive refractive power provides the vibration correction function. In particular, the fifth lens group G5 prevents blurring of an image at the image plane 1 that would otherwise occur due to vibration of the zoom optical system by moving, in a direction that intersects the optical axis, only the tenth lens element L10.

The zoom optical system of Embodiment 7-2 is nearly the same as Embodiment 7-1 above, the only difference being that in Embodiment 7-2 the seventh lens element L7 of the third lens group G3 does not move in a direction that intersects the optical axis for vibration correction but rather remains stationary on the optical axis and only the tenth lens element L10 of the fifth lens group G5 moves for vibration correction.

However, the lens and other optical element data of Tables 19–21 above of Embodiment 7-1 also describe Embodiment 7-2. Accordingly, the various aberrations, including the spherical aberration, astigmatism, distortion, and lateral color, of Embodiment 7-2 at the wide-angle and telephoto ends are the same as those shown in FIGS. 34A–34H.

Additionally, therefore, the zoom optical system of Embodiment 7-2 satisfies Condition (1) with a value of $t_d/f_w$ equal to 1.37, the same value as Embodiment 7-1.

Furthermore, as is evident from FIGS. 34A–34H, the zoom optical system of Embodiment 7-2 is a high performance zoom optical system capable of favorably correcting aberrations.

EMBODIMENT 8-2

Figure 21:
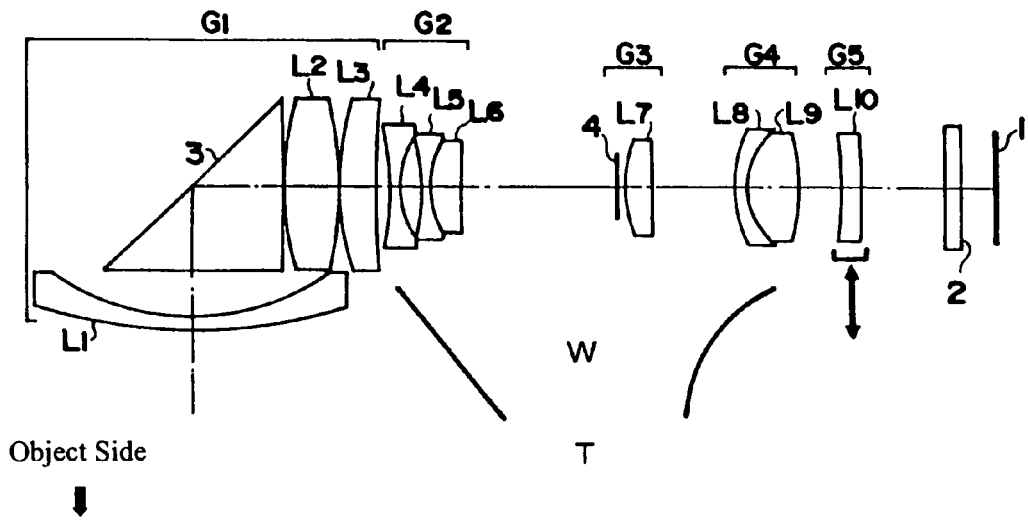
FIG. 21 shows a cross-sectional view of the zoom optical system of Embodiment 8-2 at the wide-angle end.

FIG. 21 shows a cross-sectional view of the zoom optical system of Embodiment 8-2 at the wide-angle end. The zoom optical system of Embodiment 8-2 has a five lens group construction, and the fifth lens group G5 that includes a single tenth lens element L10 having negative refractive power provides the vibration correction function. In particular, the fifth lens group G5 prevents blurring of an image at the image plane 1 that would otherwise occur due to vibration of the zoom optical system by moving, in a direction that intersects the optical axis, only the tenth lens element L10.

The zoom optical system of Embodiment 8-2 is nearly the same as Embodiment 8-1 above, the only difference being that in Embodiment 8-2 the seventh lens element L7 of the third lens group G3 does not move in a direction that intersects the optical axis for vibration correction but rather remains stationary on the optical axis and only the tenth lens element L10 of the fifth lens group G5 moves for vibration correction.

However, the lens and other optical element data of Tables 22–24 above of Embodiment 8-1 also describe Embodiment 8-2. Accordingly, the various aberrations, including the spherical aberration, astigmatism, distortion, and lateral color, of Embodiment 8-2 at the wide-angle and telephoto ends are the same as those shown in FIGS. 35A–35H.

Additionally, therefore, the zoom optical system of Embodiment 8-2 satisfies Condition (1) with a value of $t_d/f_w$ equal to 1.37, the same value as Embodiment 8-1.

Furthermore, as is evident from FIGS. 35A–35H, the zoom optical system of Embodiment 8-2 is a high performance zoom optical system capable of favorably correcting aberrations.

EMBODIMENT 11-1

Figure 22:
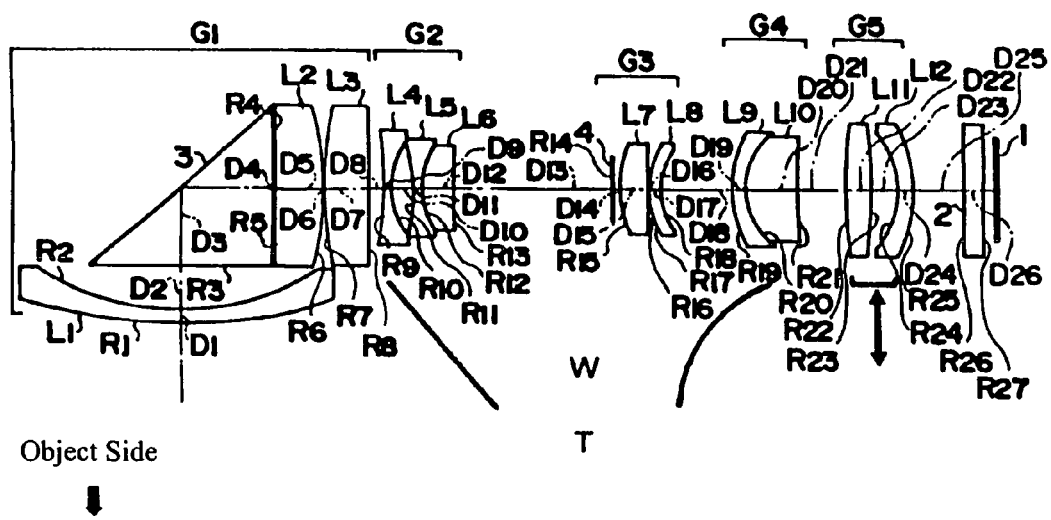
FIG. 22 shows a cross-sectional view of the zoom optical system of Embodiment 11-1 at the wide-angle end.

FIG. 22 shows the basic lens element configuration of the zoom optical system of Embodiment 11-1. The zoom optical system of Embodiment 11-1 has a five len's group construction, and the fifth lens group G5 provides the vibration correction function. In particular, the fifth lens group G5 includes a lens element having positive refractive power (i.e., the eleventh lens element L11) and a lens element having negative refractive power (i.e., the twelfth lens element L12) that prevent blurring of an image formed at the image plane 1 by movement of these lens elements L11 and L12 in a direction that intersects the optical axis in order to correct for blurring of the image being recorded or viewed due to vibration of the zoom optical system.

As shown in FIG. 22, the first lens group G1 includes, arranged along the optical axis in order from the object side, a first lens element L1 having negative refractive power and a meniscus shape with its convex surface on the object side, a right-angle prism 3 that bends the optical axis, a plano-convex second lens element L2, and a biconvex third lens element L3. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4, a biconvex seventh lens element L7, and an eighth lens element L8 having negative refractive power and a meniscus shape with its convex surface on the object side. The fourth lens group G4 includes, arranged along the optical axis in order from the object side, a ninth lens element L9 having negative refractive power and a meniscus shape with its convex surface on the object side, and a tenth lens element L10 having positive refractive power and a meniscus shape with its convex surface on the object side. The fifth lens group G5 includes a biconvex eleventh lens element L11 and a twelfth lens element L12 having negative refractive power and a meniscus shape with its convex surface on the image side.

In addition, the fifth lens element L5 and the sixth lens element L6 are cemented together at adjoining lens surfaces, as are also the ninth lens element L9 and the tenth lens element L10.

Also, in Embodiment 11-1, the filter unit 2 includes an infrared filter and/or similar structures, including a cover glass for a solid state image sensor, and is provided between the fifth lens group G5 and the image plane 1.

In the zoom optical system of Embodiment 11-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the eleventh lens element L11 and the twelfth lens element L12 that are in the fifth lens group G5 in a direction that intersects the optical axis.

Specific data regarding the zoom optical system of Embodiment 11-1 are shown below in Tables 31–33. These tables are equally descriptive of Embodiments 11-2 and 11-3 that will be described after Embodiment 11-1. Table 31 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 11-1, except that the on-axis surface spacings that vary with zooming are listed in Table 33 below. Listed in the bottom portion of Table 31 are the focal length f (in mm) and the f-number $F_{NO}$ at the wide-angle and telephoto ends, and the maximum field angle 2ω at the wide-angle end and the telephoto end for Embodiment 11-1.

TABLE 31

| # | R | D | $N_d$ | $v_d$ |
|---|---|---|---|---|
| 1 | 65.6507 | 0.85 | 1.92286 | 20.9 |
| 2 | 17.8286 | 2.18 | | |
| 3 | ∞ | 11.00 | 1.83481 | 42.7 |
| 4 | ∞ | 0.10 | | |
| 5 | ∞ | 2.50 | 1.72916 | 54.7 |
| 6 | −33.2606 | 0.10 | | |
| 7 | 16.9131 | 2.59 | 1.72916 | 54.7 |
| 8 | −175.0817 | $D_8$(variable) | | |
| 9 | −29.5927 | 0.65 | 1.72000 | 42.0 |
| 10 | 6.6302 | 1.30 | | |
| 11 | −18.0172 | 0.61 | 1.51742 | 52.4 |
| 12 | 6.6040 | 1.83 | 1.84666 | 23.8 |
| 13 | 39.3823 | $D_{13}$(variable) | | |
| 14 | ∞ (stop) | 0.50 | | |
| 15* | 5.9414 | 1.98 | 1.50842 | 56.4 |
| 16* | −20.0056 | 0.30 | | |
| 17 | 8.7845 | 0.60 | 1.84666 | 23.8 |
| 18 | 6.0300 | $D_{18}$(variable) | | |
| 19 | 6.7866 | 1.20 | 1.92286 | 18.9 |
| 20 | 4.1816 | 2.56 | 1.48749 | 70.2 |
| 21 | 23.7796 | $D_{21}$(variable) | | |
| 22 | 25.7877 | 1.51 | 1.48749 | 70.2 |
| 23 | −24.7394 | 1.50 | | |
| 24* | −5.7231 | 0.80 | 1.56865 | 58.6 |
| 25* | −8.7162 | 2.56 | | |
| 26 | ∞ | 1.00 | 1.51680 | 64.2 |
| 27 | ∞ | | | |
| f = 6.35–17.93 | | $F_{NO}$ = 3.59–3.79 | | 2ω = 62.4°–21.8° |

The lens surfaces with a * to the right of the surface number in Table 31 are aspheric lens surfaces, and the aspheric surface shapes of these lens surfaces are expressed by Equation (A) above.

Table 32 below lists the values of the constant K and the aspheric coefficients $A_4$, $A_6$, $A_8$, and $A_{10}$ in Equation (A) above for each of the aspheric lens surfaces of Table 31. Aspheric coefficients that are not present in Table 32 are zero. An "E" in the data indicates that the number following the "E" is the exponent to the base 10. For example, "1.0E-2" represents the number $1.0 \times 10^{-2}$.

TABLE 32

| # | K | $A_4$ | $A_6$ | $A_8$ | $A_{10}$ |
|---|---|---|---|---|---|
| 15 | 0.5639400 | −2.9137452E-4 | 2.8388070E-6 | 6.0390580E-7 | −5.0067059E-9 |
| 16 | 0.9985138 | 2.4237883E-4 | 7.5950315E-6 | 2.7867242E-7 | 1.0361911E-8 |
| 24 | 0.6475888 | −8.3957568E-5 | −1.5515470E-6 | −1.3059649E-7 | 9.7079390E-9 |
| 25 | 0.5664797 | 2.5267799E-4 | −2.9037997E-5 | 2.8311357E-7 | −2.4026743E-8 |

In the zoom optical system of Embodiment 11-1, lens groups G2 and G4 move to vary the on-axis surface spacings of various optical elements along the optical axis during zooming between the wide-angle end W and the telephoto end T of the zoom range. Therefore, the values of the on-axis surface spacings $D_8$, $D_{13}$, $D_{18}$ and $D_{21}$ vary. Table 33 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{18}$ between the lens surface of the extreme image side of the third lens group G3 and the lens surface of the object-most side of the fourth lens group G4, and the on-axis surface spacing $D_{21}$ between the lens surface of the extreme image side of the fourth lens group G4 and the object-most side surface of the fifth lens group G5, at the wide-angle end (focal length f equals 6.35 mm) and the telephoto end (focal length f equals 17.93 mm) in the zoom optical system of Embodiment 11-1 with the zoom optical system focused at infinity.

TABLE 33

| Focal Length f (mm) | $D_8$ | $D_{13}$ | $D_{18}$ | $D_{21}$ |
|---|---|---|---|---|
| 6.35 | 1.00 | 10.16 | 5.31 | 1.80 |
| 17.93 | 9.09 | 2.07 | 2.61 | 4.49 |

Additionally, the zoom optical system of Embodiment 11-1 satisfies Condition (1) with a value of $t_d/f_w$ equal to 1.30.

FIGS. 38A–38D show the spherical aberration, astigmatism, distortion, and lateral color, respectively, of the zoom optical system of Embodiment 11-1 at the wide-angle end, and FIGS. 38E–38H show the spherical aberration, astigmatism, distortion, and lateral color, respectively, of the zoom optical system of Embodiment 11-1 at the telephoto end. In FIGS. 38A and 38E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 38B and 38F, the astigmatism (in mm) is shown for both the sagittal image surface S and the tangential image surface T and is measured at 587.6 nm (the d-line). In FIGS. 38C and 38G, distortion (in percent) is measured at 587.6 nm (the d-line). In FIGS. 38D and 38H, the lateral color (in μm) is shown for the wavelengths 460 nm and 615 nm relative to 587.6 nm (the d-line).

As is evident from FIGS. 38A–38H, the zoom optical system of Embodiment 11-1 is a high performance zoom optical system capable of favorably correcting aberrations.

EMBODIMENT 11-2

Figure 23:
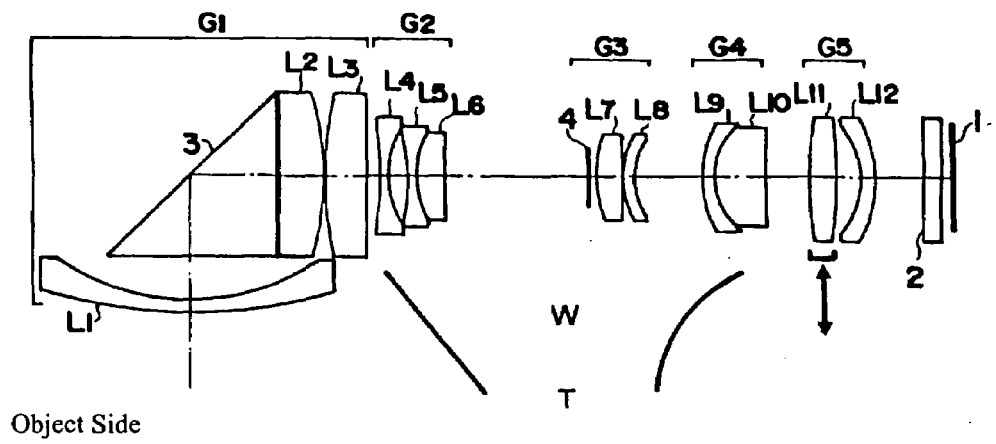
FIG. 23 shows a cross-sectional view of the zoom optical system of Embodiment 11-2 at the wide-angle end.

FIG. 23 shows a cross-sectional view of the zoom optical system of Embodiment 11-2 at the wide-angle end. The zoom optical system of Embodiment 11-2 has a five lens group construction, and the fifth lens group G5 provides the vibration correction function. In particular, the fifth lens group G5 prevents blurring of an image at the image plane 1 that would otherwise occur due to vibration of the zoom optical system by moving, in a direction that intersects the optical axis, only the eleventh lens element L11 having positive refractive power in the fifth lens group G5.

The zoom optical system of Embodiment 11-2 is nearly the same as Embodiment 11-1 above, the only difference being that unlike Embodiment 11-1 the twelfth lens element L12 does not move in a direction that intersects the optical axis for vibration correction but rather remains stationary on the optical axis and only the eleventh lens element L11 moves for vibration correction.

However, the lens and other optical element data of Tables 31–33 above for Embodiment 11-1 also describe Embodiment 11-2. Accordingly, the various aberrations, including the spherical aberration, astigmatism, distortion, and lateral color, of Embodiment 11-2 at the wide-angle and telephoto ends are the same as those shown in FIGS. 38A–38H.

Additionally, therefore, the zoom optical system of Embodiment 11-2 satisfies Condition (1) with a value of $t_d/f_w$ equal to 1.30, the same value as Embodiment 11-1.

Furthermore, as is evident from FIGS. 38A–38H, the zoom optical system of Embodiment 11-2 is a high performance zoom optical system capable of favorably correcting aberrations.

EMBODIMENT 11-3

Figure 24:
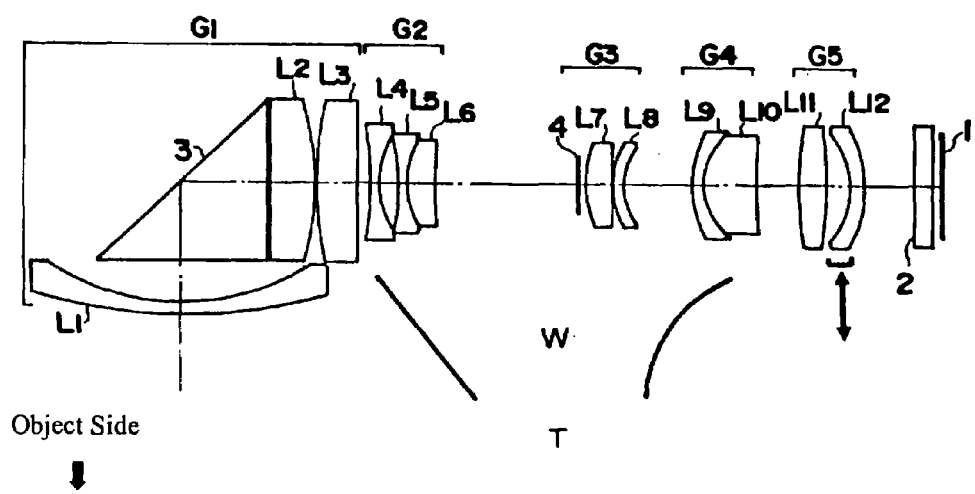
FIG. 24 shows a cross-sectional view of the zoom optical system of Embodiment 11-3 at the wide-angle end.

FIG. 24 shows a cross-sectional view of the zoom optical system of Embodiment 11-3 at the wide-angle end. The zoom optical system of Embodiment 11-3 has a five lens group construction, and the fifth lens group G5 provides the vibration correction function. In particular, the fifth lens group G5 prevents blurring of an image at the image plane 1 that would otherwise occur due to vibration of the zoom optical system by moving, in a direction that intersects the optical axis, only the twelfth lens element L12 that has negative refractive power in the fifth lens group G5.

The zoom optical system of Embodiment 11-3 is nearly the same as Embodiment 11-1 above, the only difference being that, unlike Embodiment 11-1, in this embodiment the eleventh lens element L11 does not move in a direction that intersects the optical axis for vibration correction but rather remains stationary on the optical axis. That is, only the twelfth lens element L12 moves for vibration correction.

However, the lens and other optical element data of Tables 31–33 above for Embodiment 11-1 also describe Embodiment 11-3. Accordingly, the various aberrations, including the spherical aberration, astigmatism, distortion, and lateral color, of Embodiment 11-3 at the wide-angle and telephoto ends are the same as those shown in FIGS. 38A–38H.

Additionally, therefore, the zoom optical system of Embodiment 11-3 satisfies Condition (1) with a value of $t_d/f_w$ equal to 1.30, the same value as Embodiment 11-1.

Furthermore, as is evident from FIGS. 38A–38H, the zoom optical system of Embodiment 11-3 is a high performance zoom optical system capable of favorably correcting aberrations.

EMBODIMENT 12-1

Figure 25:
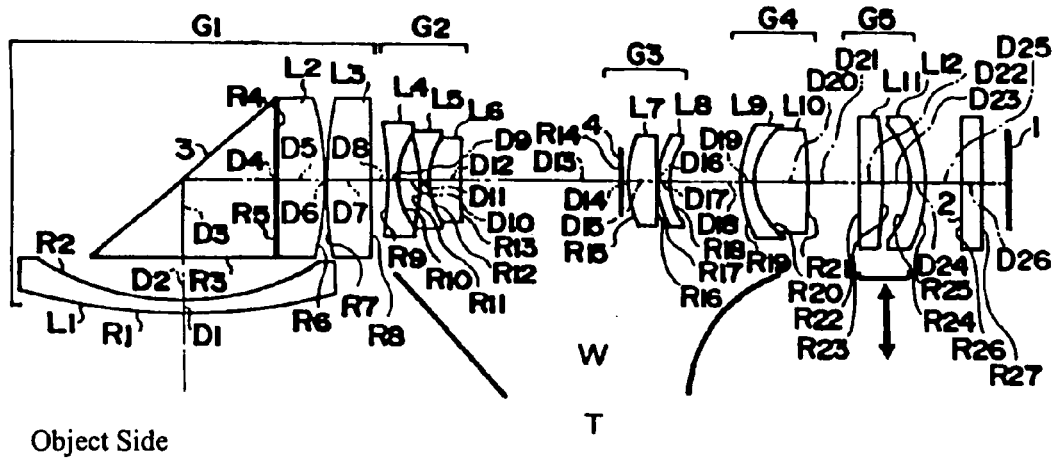
FIG. 25 shows a cross-sectional view of the zoom optical system of Embodiment 12-1 at the wide-angle end.

FIG. 25 shows the basic lens element configuration of the zoom optical system of Embodiment 12-1. The zoom optical system of Embodiment 12-1 has a five lens group construction, and the fifth lens group G5 provides the vibration correction function. In particular, the fifth lens group G5 includes a lens element having positive refractive power (i.e., the eleventh lens element L11) and a lens element having negative refractive power (i.e., the twelfth lens element L12) that prevent blurring of an image formed at the image plane 1 by movement of these lens elements L11 and L12 in the direction that intersects the optical axis in order to correct for blurring of the image being recorded or viewed due to vibration of the zoom optical system. In addition, the fifth lens group G5 has negative refractive power.

As shown in FIG. 25, the first lens group G1 includes, arranged along the optical axis in order from the object side, a first lens element L1 having negative refractive power and a meniscus shape with its convex surface on the object side, a right-angle prism 3 that bends the optical axis, a planoconvex second lens element L2, and a biconvex third lens element L3. The second lens group G2 includes, arranged along the optical axis in order from the object side, a biconcave fourth lens element L4, a biconcave fifth lens element L5, and a sixth lens element L6 having positive refractive power and a meniscus shape with its convex surface on the object side. The third lens group G3 includes, arranged along the optical axis in order from the object side, a stop or diaphragm 4, a biconvex seventh lens element L7, and an eighth lens element L8 having negative refractive power and a meniscus shape with its convex surface on the object side. The fourth lens group G4, includes, arranged along the optical axis in order from the object side, a ninth lens element L9 having negative refractive power and a meniscus shape with its convex surface on the object side, and a biconvex tenth lens element L10. The fifth lens group G5 includes a biconvex eleventh lens element L11 and a twelfth lens element L12 having negative refractive power and a meniscus shape with its convex surface on the image side.

In addition, the fifth lens element L5 and the sixth lens element L6 are cemented together at adjoining lens surfaces, as are also the ninth lens element L9 and the tenth lens element L10.

Also, in Embodiment 12-1, the filter unit 2 includes an infrared filter and/or similar structures, including a cover glass for a solid state image sensor, and is provided between the fifth lens group G5 and the image plane 1.

In the zoom optical system of Embodiment 12-1, the luminous flux that enters along the optical axis from the object side forms an image at the image formation position on the image plane 1, where a solid state image sensor (such as a CCD image sensor) is situated. Furthermore, the vibration correction function is activated when vibrations or movements, such as hand movements of the zoom optical system that may cause blurring of an image, occur. Such blurring of an image is corrected by moving the eleventh lens element L11 and the twelfth lens element L12 that are in the fifth lens group G5 in a direction that intersects the optical axis.

Specific data regarding the zoom optical system of Embodiment 12-1 are shown below in Tables 34–36. These tables are equally descriptive of Embodiments 12-2 and 12-3 that will be described after Embodiment 12-1. Table 34 below lists the surface number #, in order from the object side, the radius of curvature R (in mm) of each surface on the optical axis, the on-axis surface spacing D (in mm), as well as the refractive index $N_d$ and the Abbe number $v_d$ (at the d-line) of each optical component for Embodiment 12-1, except that the on-axis surface spacings that vary with zooming are listed in Table 36 below. Listed in the bottom portion of Table 34 are the focal length f (in mm) and the f-number $F_{NO}$ at the wide-angle and telephoto ends, and the maximum field angle 2ω at the wide-angle end and the telephoto end for Embodiment 12-1.

The lens surfaces with a * to the right of the surface number in Table 34 are aspheric lens surfaces, and the aspheric surface shapes of these lens surfaces are expressed by Equation (A) above.

Table 35 below lists the values of the constant K and the aspheric coefficients $A_4$, $A_6$, $A_8$, and $A_{10}$ in Equation (A) above for each of the aspheric lens surfaces of Table 34. Aspheric coefficients that are not present in Table 35 are zero. An "E" in the data indicates that the number following the "E" is the exponent to the base 10. For example, "1.0E-2" represents the number $1.0 \times 10^{-2}$.

TABLE 35

| # | K | $A_4$ | $A_6$ | $A_8$ | $A_{10}$ |
|---|---|---|---|---|---|
| 15 | 0.6197234 | −2.7553991E-4 | 3.3240069E-6 | 5.5701538E-7 | −5.0446837E-9 |
| 16 | 0.9998769 | 2.4724718E-4 | 9.0326726E-6 | 3.0573193E-7 | 1.0336901E-8 |
| 24 | 1.2181633 | −1.0160244E-4 | −5.6011557E-6 | 5.2695311E-8 | 9.2709251E-9 |
| 25 | 0.5883470 | −9.1744522E-5 | −2.0826097E-5 | 3.0080938E-7 | −2.3342253E-8 |

In the zoom optical system of Embodiment 12-1, lens groups G2 and G4 move to vary the on-axis surface spacings of various optical elements along the optical axis during zooming between the wide-angle end W and the telephoto end T of the zoom range. Therefore, the values of the on-axis surface spacings $D_8$, $D_{13}$, $D_{18}$, and $D_{21}$ vary. Table 36 below lists the value of the on-axis surface spacing $D_8$ between the lens surface on the extreme image side of the first lens group G1 and the lens surface of the object-most side of the second lens group G2, the on-axis surface spacing $D_{13}$ between the lens surface on the extreme image side of the second lens group G2 and the stop or diaphragm 4, the on-axis surface spacing $D_{18}$ between the lens surface of the extreme image side of the third lens group G3 and the lens surface of the object-most side of the fourth lens group G4, and the on-axis surface spacing $D_{21}$ between the lens surface of the extreme image side of the fourth lens group G4 and the object-most side surface of the fifth lens group G5, at the wide-angle end (focal length f equals 6.33 mm) and the telephoto end (focal length f equals=17.89 mm) in the zoom optical system of Embodiment 12-1 with the zoom optical system focused at infinity.

TABLE 34

| # | R | D | $N_d$ | $v_d$ |
|---|---|---|---|---|
| 1 | 43.5440 | 0.85 | 1.92286 | 20.9 |
| 2 | 16.0813 | 2.39 | | |
| 3 | ∞ | 11.00 | 1.83481 | 42.7 |
| 4 | ∞ | 0.10 | | |
| 5 | ∞ | 2.50 | 1.72916 | 54.7 |
| 6 | −29.9463 | 0.10 | | |
| 7 | 15.5242 | 2.60 | 1.65160 | 58.5 |
| 8 | −146.4572 | $D_8$(variable) | | |
| 9 | −27.8128 | 0.65 | 1.80400 | 46.6 |
| 10 | 6.8198 | 1.22 | | |
| 11 | −18.0172 | 0.61 | 1.51742 | 52.4 |
| 12 | 6.5415 | 1.78 | 1.84666 | 23.8 |
| 13 | 34.7274 | $D_{13}$(variable) | | |
| 14 | ∞ (stop) | 0.50 | | |
| 15* | 5.7286 | 2.02 | 1.50842 | 56.4 |
| 16* | −28.4053 | 0.30 | | |
| 17 | 6.7366 | 0.60 | 1.84666 | 23.8 |
| 18 | 5.0413 | $D_{18}$(variable) | | |
| 19 | 7.7654 | 0.60 | 1.92286 | 18.9 |
| 20 | 4.9912 | 2.68 | 1.48749 | 70.2 |
| 21 | −53.1342 | $D_{21}$(variable) | | |
| 22 | 329.6810 | 1.35 | 1.48749 | 70.2 |
| 23 | −27.6498 | 1.50 | | |
| 24* | −7.0002 | 0.80 | 1.56865 | 58.6 |
| 25* | −11.8557 | 3.92 | | |
| 26 | ∞ | 1.00 | 1.51680 | 64.2 |
| 27 | ∞ | | | |
| f = 6.33–17.89 | | $F_{NO}$ = 3.61–3.82 | 2ω = 62.4°–22.0° | |

TABLE 36

| Focal Length f (mm) | $D_8$ | $D_{13}$ | $D_{18}$ | $D_{21}$ |
|---|---|---|---|---|
| 6.33 | 1.00 | 9.51 | 5.12 | 1.80 |
| 17.89 | 8.45 | 2.07 | 2.37 | 4.55 |

Additionally, the zoom optical system of Embodiment 12-1 satisfies Condition (1) with a value of $t_d/f_w$ equal to 1.34.

FIGS. 39A–39D show the spherical aberration, astigmatism, distortion, and lateral color, respectively, of the zoom optical system of Embodiment 12-1 at the wide-angle end, and FIGS. 39E–39H show the spherical aberration, astigmatism, distortion, and lateral color, respectively, of the zoom optical system of Embodiment 12-1 at the telephoto end. In FIGS. 39A and 39E, the spherical aberration (in mm) is shown for the wavelengths 587.6 nm (the d-line and indicated by a solid line), 460 nm (indicated by a dashed line), and 615 nm (indicated by a double dashed line), and the f-number is shown. In the remaining figures, ω is the half-field angle. In FIGS. 39B and 39F, the astigmatism (in mm) is shown for both the sagittal image surface S and the tangential image surface T and is measured at 587.6 nm (the d-line). In FIGS. 39C and 39G, distortion (in percent) is measured at 587.6 nm (the d-line). In FIGS. 39D and 39H, the lateral color (in μm) is shown for the wavelengths 460 nm and 615 nm relative to 587.6 nm (the d-line).

As is evident from FIGS. 39A–39H, the zoom optical system of Embodiment 12-1 is a high performance zoom optical system capable of favorably correcting aberrations.

EMBODIMENT 12-2

Figure 26:
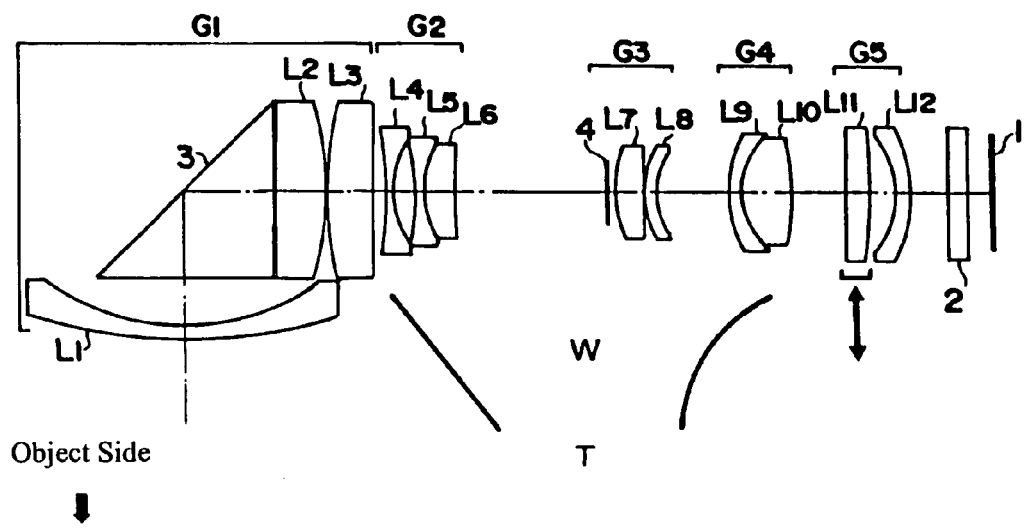
FIG. 26 shows a cross-sectional view of the zoom optical system of Embodiment 12-2 at the wide-angle end.

FIG. 26 shows a cross-sectional view of the zoom optical system of Embodiment 12-2 at the wide-angle end. The zoom optical system of Embodiment 12-2 has a five lens group construction, and the fifth lens group G5 provides the vibration correction function. In particular, the fifth lens group G5 prevents blurring of an image at the image plane 1 that would otherwise occur due to vibration of the zoom optical system by moving in a direction that intersects the optical axis only the eleventh lens element L11 having positive refractive power in the fifth lens group G5.

The zoom optical system of Embodiment 12-2 is nearly the same as Embodiment 12-1 above, the only difference being that, unlike Embodiment 12-1, in this embodiment the twelfth lens element L12 does not move in a direction that intersects the optical axis for vibration correction but rather remains stationary on the optical axis and only the eleventh lens element L11 moves for vibration correction.

However, the lens and other optical element data of Tables 34–36 above of Embodiment 12-1 also describe Embodiment 12-2. Accordingly, the various aberrations, including the spherical aberration, astigmatism, distortion, and lateral color, of Embodiment 12-2 are the same as those shown in FIGS. 39A–39H.

Additionally, therefore, the zoom optical system of Embodiment 12-2 satisfies Condition (1) with a value of $t_d/f_w$ equal to 1.34, the same value as Embodiment 12-1.

Furthermore, as is evident from FIGS. 39A–39H, the zoom optical system of Embodiment 12-2 is a high performance zoom optical system capable of favorably correcting aberrations.

EMBODIMENT 12-3

Figure 27:
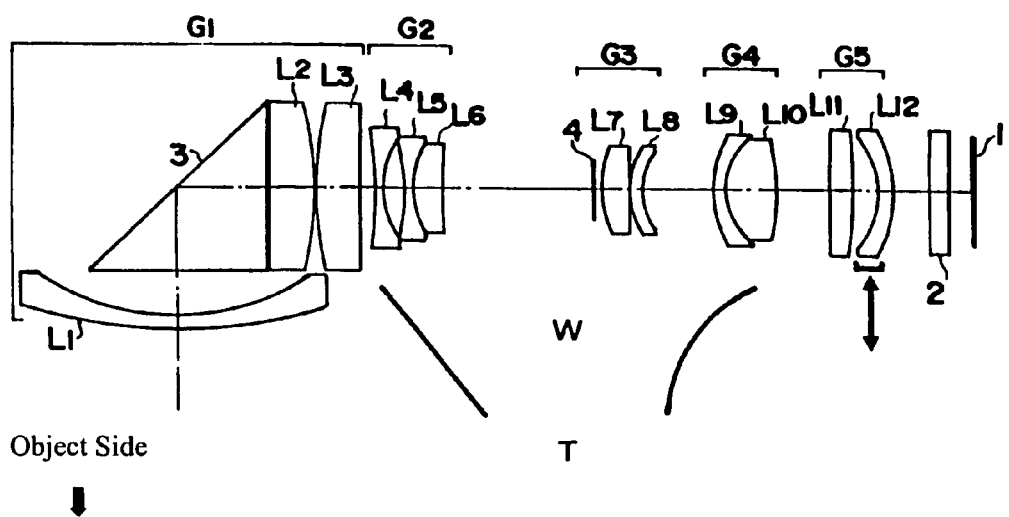
FIG. 27 shows a cross-sectional view of the zoom optical system of Embodiment 12-3 at the wide-angle end.

FIG. 27 shows a cross-sectional view of the zoom optical system of Embodiment 12-3 at the wide-angle end. The zoom optical system of Embodiment 12-3 has a five lens group construction, and the fifth lens group G5 provides the vibration correction function. In particular, the fifth lens group G5 prevents blurring of an image at the image plane 1 that would otherwise occur due to vibration of the zoom optical system by moving in a direction that intersects the optical axis only the twelfth lens element L12 having negative refractive power in the fifth lens group G5.

The zoom optical system of Embodiment 12-3 is nearly the same as Embodiment 12-1 above, the only difference being that, unlike Embodiment 12-1, in this embodiment the eleventh lens element L11 does not move in a direction that intersects the optical axis for vibration correction but rather remains stationary on the optical axis. That is, only the twelfth lens element L12 moves for vibration correction.

However, the lens and other optical element data of Tables 34–36 above of Embodiment 12-1 also describe Embodiment 12-3. Accordingly, the various aberrations, including the spherical aberration, astigmatism, distortion, and lateral color, of Embodiment 12-3 are the same as those shown in FIGS. 39A–39H.

Additionally, therefore, the zoom optical system of Embodiment 12-3 satisfies Condition (1) with a value of $t_d/f_w$ equal to 1.34, the same value as Embodiment 12-1.

Furthermore, as is evident from FIGS. 39A–39H, the zoom optical system of Embodiment 12-3 is a high performance zoom optical system capable of favorably correcting aberrations.

The efficient operation of embodiments of the present invention described above that belong to the fourth group of embodiments of the present invention is explained below.

According to zoom optical systems belonging to the fourth group of embodiments of the present invention, by the fifth lens group G5 being stationary at the extreme image side during zooming, the lens group at the extreme image side is not moved during zooming, and the fear that movement of the extreme image side lens group might generate dust within the lens barrel at the image side of the fifth lens group G5 is reduced. For this reason, this arrangement is especially suitable for an imaging device using a solid-state image sensor such as a CCD or similar device.

Furthermore, by the fifth lens group G5 being a lens group having positive refractive power, the exit angles of light rays passing to the image plane 1 can be smaller. For this reason also, this arrangement is especially suitable for an imaging device using a solid-state image sensor such as a CCD or similar device. Also, by making the fifth lens group G5 to be a lens group having negative refractive power, the zoom optical system can be miniaturized. Additionally, by the fifth lens group G5 being a single lens element, the zoom optical system may be miniaturized.

Furthermore, by forming the fifth lens group G5 of one lens element having positive refractive power and one lens element having negative refractive power, as in Embodiments 11-1, 11-2, 11-3, 12-1, 12-2, and 12-3 above, the axial chromatic aberration can be reduced, and the field curvature can also be reduced by having the Petzval sum to be an appropriate value.

Furthermore, the change in the optical performance of the zoom optical system at the time of vibration correction can be minimized by preventing blurring of an image formed at the image plane 1 that normally occurs with such vibration by moving at least a part of the fifth lens group G5, which has a small load in aberration correction, in a direction that intersects the optical axis.

Moreover, by preventing blurring of an image formed at the image plane 1, which accompanies vibration of the zoom optical system, by moving only the lens element having positive refractive power of the fifth lens group G5 in the direction to intersect the optical axis, as in Examples 11-2 and 12-2, the degree of movement of an image on the imaging plane 1 at the time of vibration correction increases in comparison with the case of preventing vibration by moving a negative lens element, thereby enabling vibration correction performance to be sufficiently achieved with a small degree of movement.

Furthermore, by preventing blurring of an image formed at the image plane 1, which accompanies vibration of the zoom optical system, by moving only the lens element having negative refractive power within the fifth lens group G5 in the direction to intersect the optical axis, as in Examples 11-3 and 12-3, in comparison with the case of preventing vibration by moving the positive lens element, the weight of the lens that is moved at the time of vibration correction becomes lighter, and the load of the vibration correction mechanism can be reduced.

Additionally, when blurring of an image that is formed at the image plane 1 due to vibration of the zoom optical system is to be corrected, the vibration correction mechanism must move the appropriate lens element not only in a direction that intersects the optical axis, but also an appropriate amount. The required shifting amount of the lens that performs correction, for various angular velocities of the zoom optical system due to hand movements, can be stored in a storage device that is integrated into a camera or similar device that contains the zoom optical system. Furthermore, the angular velocity of the zoom optical system can be detected by using an angular velocity sensor. In this manner, an appropriate lens element can be moved the proper amount in a direction that intersects the optical axis by using an actuator provided in the zoom optical system so that the hand movements do not result in blurring of the image.

As illustrated in each of the embodiments described above, blurring of an image formed at the image plane 1 for recording or viewing due to vibration of the zoom optical system may be corrected by moving at least a part of one of the third, fourth, or fifth lens groups in a straight line direction that is perpendicular to the optical axis. However, the direction of movement may deviate from being perpendicular, and thus may intersect the optical axis at an angle other than 90 degrees. Moreover, the direction of movement may define a curve such as an arc that intersects the optical axis.

Furthermore, the zoom optical system of the present invention can be used to great advantage in imaging devices that include a solid state image sensor, such as a CCD, as found in cellular telephones, portable computers, digital cameras and similar devices, as miniaturization advances from the perspective of having a vibration correction mechanism along with bending the optical path by providing a prism in the optical path. However, the zoom optical system of the present invention may also be used in many other imaging devices.

According to the zoom optical system with a vibration correction function of the present invention, the zoom optical system enables thinning in the thickness direction of a device mounting the zoom optical system of a four or five lens group construction by providing a prism which bends the optical axis within the first lens group, which is the most effective for miniaturization of such a first lens group that is stationary during zooming.

Further, the zoom optical system constructed in this manner can obtain a favorable optical performance even when vibrations occur due to hand movements or other causes that tend to cause blurring of an image at an image plane that is being recorded or viewed. The vibrations transmitted to the zoom optical system are corrected in the present invention by moving at least a part of a lens group that does not move along the optical axis during zooming in the direction to intersect the optical axis.

Furthermore, an imaging device can be thinner in the thickness direction because the diameter of the stop or diaphragm can be reduced by the first lens group having positive refractive power.

Additionally, miniaturization of the prism can be achieved by making the optical paths of the light rays that pass through the prism be on or near the optical axis of the prism. This can be achieved by making the part of the first lens group on the object side of the prism have negative refractive power and by making the part of the first lens group on the image side of the prism have positive refractive power.

In addition, a large zoom ratio can be achieved for lens groups which are arranged more to the image side than the first lens group by a construction that includes at least a second lens group moving along the optical axis when zooming, a third lens group that includes a stop or diaphragm and has positive refractive power, and a fourth lens group having positive refractive power. Further, favorable optical performance can be obtained by using this kind of zoom optical system in an imaging device that includes a solid state image sensor such as a CCD or similar device, and this kind of zoom optical system avoids the need to lower the quantity of light at the periphery of the angle of view in relation to light rays that enter into the solid state image sensor.

Furthermore, miniaturization of the zoom optical system can be improved in a zoom optical system with a vibration correction function as described above by satisfying Condition (1) above.

Additionally, each of these desirable results can be achieved in an imaging device using a zoom optical system with a vibration correction function of the present invention as described above.

The present invention is not limited to the aforementioned embodiments, as it will be obvious that various alternative implementations are possible. For instance, the number of lens elements and lens components in each lens group may be varied. Additionally, values such as the radius of curvature R of each surface on the optical axis, the on-axis surface spacings D, the refractive index $N_d$, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom optical system with a vibration correction function comprising, arranged along an optical axis in order from the object side as follows:
   a first lens group having positive refractive power and that is stationary during zooming;
   a second lens group having negative refractive power and that moves along the optical axis during zooming;
   a third lens group having positive refractive power that includes a stop and that is stationary during zooming; and
   a fourth lens group having positive refractive power that moves along the optical axis during zooming;
   wherein
   said first lens group includes, arranged along the optical axis in order from the object side, a lens element having negative refractive power, a prism for bending the optical axis, and at least one lens element having positive refractive power; and
   at least part of said third lens group is movable in a direction that intersects the optical axis in order to correct for blurring of an image due to vibration of the zoom optical system.

2. The zoom optical system of claim 1, wherein:
   said third lens group includes at least one lens element having positive refractive power and at least one lens element having negative refractive power; and
   at least one of said at least one lens element having positive refractive power of said third lens group or said at least one lens element having negative refractive power of said third lens group is movable in a direction that intersects the optical axis in order to correct for said blurring of an image due to vibration of the zoom optical system.

3. The zoom optical system of claim 1, wherein said third lens group includes only a single lens element, and said single lens element is movable in a direction that intersects the optical axis in order to correct for said blurring of an image due to vibration of the zoom optical system.

4. A zoom optical system with a vibration correction function comprising, arranged along an optical axis in order from the object side as follows:
   a first lens group having positive refractive power and that is stationary during zooming;
   a second lens group having negative refractive power and that moves along the optical axis during zooming;
   a third lens group having positive refractive power that includes a stop and that moves along the optical axis during zooming; and
   a fourth lens group that is stationary during zooming; wherein
      said first lens group includes, arranged along the optical axis in order from the object side, a lens element having negative refractive power, a prism for bending the optical axis, and at least one lens element having positive refractive power; and
      at least part of said fourth lens group is movable in a direction that intersects the optical axis in order to correct for blurring of an image due to vibration of the zoom optical system.

5. The zoom optical system of claim 4, wherein:
   said fourth lens group includes at least one lens component formed by cementing together at least two lens elements and a separate single lens element that forms a lens component; and
   at least one of said one lens component and said separate single lens element is movable in a direction that intersects the optical axis in order to correct for said blurring of an image due to vibration of the zoom optical system.

6. A zoom optical system with a vibration correction function comprising, arranged along an optical axis in order from the object side as follows:
   a first lens group having positive refractive power and that is stationary during zooming;
   a second lens group having negative refractive power and that moves along the optical axis during zooming;
   a third lens group having positive refractive power that includes a stop and that is stationary during zooming;
   a fourth lens group having positive refractive power that moves along the optical axis during zooming; and
   a fifth lens group that is stationary during zooming; wherein
      said first lens group includes, arranged along the optical axis in order from the object side, a lens element having negative refractive power, a prism for bending the optical axis, and at least one lens element having positive refractive power; and
      at least part of said third lens group is movable in a direction that intersects the optical axis in order to correct for blurring of an image due to vibration of the zoom optical system.

7. The zoom optical system of claim 6, wherein:
   said third lens group includes at least one lens element having positive refractive power and at least one lens element having negative refractive power; and
   at least one of said at least one lens element having positive refractive power of said third lens group and said at least one lens element having negative refractive power of said third lens group is movable in a direction that intersects the optical axis in order to correct for said blurring of an image due to vibration of the zoom optical system.

8. The zoom optical system of claim 6, wherein said third lens group includes only a single lens element, and said single lens element is movable in a direction that intersects the optical axis in order to correct for said blurring of an image due to vibration of the zoom optical system.

9. A zoom optical system with a vibration correction function comprising, arranged along an optical axis in order from the object side as follows:
   a first lens group having positive refractive power and that is stationary during zooming;
   a second lens group having negative refractive power and that moves along the optical axis during zooming;
   a third lens group having positive refractive power that includes a stop and that is stationary during zooming;
   a fourth lens group having positive refractive power that moves along the optical axis during zooming; and
   a fifth lens group that does not move along the optical axis during zooming;
wherein
   said first lens group includes, arranged along the optical axis in order from the object side, a lens element having negative refractive power, a prism for bending the optical axis, and at least one lens element having positive refractive power; and
   at least part of said fifth lens group is movable in a direction that intersects the optical axis in order to correct for blurring of an image due to vibration of the zoom optical system.

10. The zoom optical system of claim 9, wherein:
   said fifth lens group includes at least one lens element having positive refractive power and at least one lens element having negative refractive power; and
   at least one of said at least one lens element having positive refractive power of said fifth lens group and said at least one lens element having negative refractive power of said fifth lens group is movable in a direction that intersects the optical axis in order to correct for said blurring of an image due to vibration of the zoom optical system.

11. The zoom optical system of claim 9, wherein said fifth lens group includes only a single lens element, and said single lens element is movable in a direction that intersects the optical axis in order to correct for said blurring of an image due to vibration of the zoom optical system.

12. The zoom optical system of claim 1, wherein:
   said prism is between the most object side lens element of said first lens group having negative refractive power and the most object side lens element of said first lens group having positive refractive power; and
   the following condition is satisfied:

$$0.6 < t_d/f_w < 1.8$$

where
   $t_d$ is the air equivalent optical conversion distance along the optical axis between said most object side lens element of said first lens group having negative refractive power and the said most object side lens element of said first lens group having positive refractive power; and $f_w$ is the focal length of the entire zoom optical system at the wide-angle end.

13. The zoom optical system of claim 4, wherein:

said prism is between the most object side lens element of said first lens group having negative refractive power and the most object side lens element of said first lens group having positive refractive power; and the following condition is satisfied:

$$0.6 < t_d/f_w < 1.8$$

where $t_d$ is the air equivalent optical conversion distance along the optical axis between said most object side lens element of said first lens group having negative refractive power and the said most object side lens element of said first lens group having positive refractive power; and $f_w$ is the focal length of the entire zoom optical system at the wide-angle end.

14. The zoom optical system of claim 6, wherein:

said prism is between the most object side lens element of said first lens group having negative refractive power and the most object side lens element of said first lens group having positive refractive power; and the following condition is satisfied:

$$0.6 < t_d/f_w < 1.8$$

where $t_d$ is the air equivalent optical conversion distance along the optical axis between said most object side lens element of said first lens group having negative refractive power and the said most object side lens element of said first lens group having positive refractive power; and $f_w$ is the focal length of the entire zoom optical system at the wide-angle end.

15. The zoom optical system of claim 9, wherein:

said prism is between the most object side lens element of said first lens group having negative refractive power and the most object side lens element of said first lens group having positive refractive power; and the following condition is satisfied:

$$0.6 < t_d/f_w < 1.8$$

where $t_d$ is the air equivalent optical conversion distance along the optical axis between said most object side lens element of said first lens group having negative refractive power and the said most object side lens element of said first lens group having positive refractive power; and $f_w$ is the focal length of the entire zoom optical system at the wide-angle end.

16. An imaging device including the zoom optical system of claim 1.

17. An imaging device including the zoom optical system of claim 4.

18. An imaging device including the zoom optical system of claim 6.

19. An imaging device including the zoom optical system of claim 9.

20. An imaging device including the zoom optical system of claim 12.

* * * * *

UNITED STATES PATENT AND TRADEMARK OFFICE
CERTIFICATE OF CORRECTION

PATENT NO. : 7,068,429 B1
APPLICATION NO. : 11/329138
DATED : June 27, 2006
INVENTOR(S) : Ori It is certified that error appears in the above-identified patent and that said Letters Patent is hereby corrected as shown below:

On Title Page (item 56)

References Cited
Change "6,473,231 B1" to --6,473,231 B2--;
Change "6,771,432 B1" to --6,771,432 B2--;
Change "6,781,755 B1" to --6,781,755 B2--;
Change "6,999,240 B1" to --6,999,240 B2--;

Col. 11, line 13
Change "various the" to --various-- ; and

Col. 17, line 58
In Table 8, change the value "1.6890434E-8" to -- -1.6890434E-8--.

Signed and Sealed this

Nineteenth Day of September, 2006

JON W. DUDAS
*Director of the United States Patent and Trademark Office*